United States Patent
Ishii et al.

(10) Patent No.: US 7,049,559 B2
(45) Date of Patent: May 23, 2006

(54) FLEXIBLE PTC HEATING ELEMENT AND METHOD OF MANUFACTURING THE HEATING ELEMENT

(75) Inventors: Takahito Ishii, Soraku-gun (JP); Keiko Yasui, Yamatokoriyama (JP); Seishi Terakado, Nara (JP); Kazuyuki Kohara, Soraku-gun (JP); Mitsuru Yoneyama, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 7 days.

(21) Appl. No.: 10/517,188

(22) PCT Filed: Jun. 16, 2003

(86) PCT No.: PCT/JP03/07600

§ 371 (c)(1),
(2), (4) Date: Dec. 7, 2004

(87) PCT Pub. No.: WO04/001775

PCT Pub. Date: Dec. 31, 2003

(65) Prior Publication Data

US 2005/0173414 A1     Aug. 11, 2005

(30) Foreign Application Priority Data

| Jun. 19, 2002 | (JP) | ............................ 2002-178090 |
| Jun. 19, 2002 | (JP) | ............................ 2002-178091 |
| Jul. 17, 2002 | (JP) | ............................ 2002-208396 |
| Jul. 17, 2002 | (JP) | ............................ 2002-208397 |
| Jan. 9, 2003 | (JP) | ............................ 2003-003026 |
| Feb. 4, 2003 | (JP) | ............................ 2003-026733 |
| Mar. 26, 2003 | (JP) | ............................ 2003-085033 |

(51) Int. Cl.
*H05B 3/34* (2006.01)

(52) U.S. Cl. ..................................... 219/549; 219/545
(58) Field of Classification Search ................ 219/549, 219/505, 529, 542–546, 548; 338/210–211, 338/306–309, 314
See application file for complete search history.

(56) References Cited

U.S. PATENT DOCUMENTS

| 4,761,541 | A | * | 8/1988 | Batliwalla et al. .......... 219/528 |
| 4,833,305 | A | * | 5/1989 | Mashimo et al. ........... 219/549 |
| 4,983,814 | A | * | 1/1991 | Ohgushi et al. ............ 219/545 |

(Continued)

FOREIGN PATENT DOCUMENTS

JP      56-13689      2/1981

(Continued)

OTHER PUBLICATIONS

English translation of International Search Report for PCT/JP2003/007600, dated Sep. 24, 2003.

*Primary Examiner*—Robin O. Evans
*Assistant Examiner*—Vinod Patel
(74) *Attorney, Agent, or Firm*—RatnerPrestia

(57) ABSTRACT

The flexible PTC heating element according to the invention has one of the following constitutions. A portion of an electrodes and a PTC resistor is impregnated into a flexible substrate. A flexible substrate is made of resin foam or rubber material having a concave/convex shape formed on the surface. The flexible PTC heating element has an elongation deformation portion disposed to at least one of an electrode and a PTC resistor. A flexible substrate has adhesiveness and either a flexible substrate or a flexible cover material has an elongation control portion. Therefore, the flexible PTC heating element is highly flexible and excellent in vibration durability.

8 Claims, 34 Drawing Sheets

U.S. PATENT DOCUMENTS

| | | | |
|---|---|---|---|
| 5,197,595 A * | 3/1993 | Coultas ....................... | 206/0.6 |
| 6,093,910 A | 7/2000 | McClintock et al. | |
| 6,563,094 B1 * | 5/2003 | Kochman et al. ........... | 219/549 |
| 6,884,965 B1 | 4/2005 | Nelson et al. | |
| 2004/0238516 A1 * | 12/2004 | Bulgajewski ............... | 219/217 |

FOREIGN PATENT DOCUMENTS

| | | |
|---|---|---|
| JP | 06-096843 | 4/1994 |
| JP | 08-120182 | 5/1996 |
| JP | 2001-237104 A | 8/2001 |
| JP | 2001-326105 A | 11/2001 |
| JP | 2002-050459 | 2/2002 |
| JP | 2002-050460 | 2/2002 |
| JP | 2002-270403 A | 9/2002 |
| JP | 2003-109803 | 4/2003 |
| JP | 2003-109804 A | 4/2003 |
| JP | 2003-217902 A | 7/2003 |
| JP | 2003-217904 A | 7/2003 |
| WO | WO 00/10177 | 2/2000 |

* cited by examiner

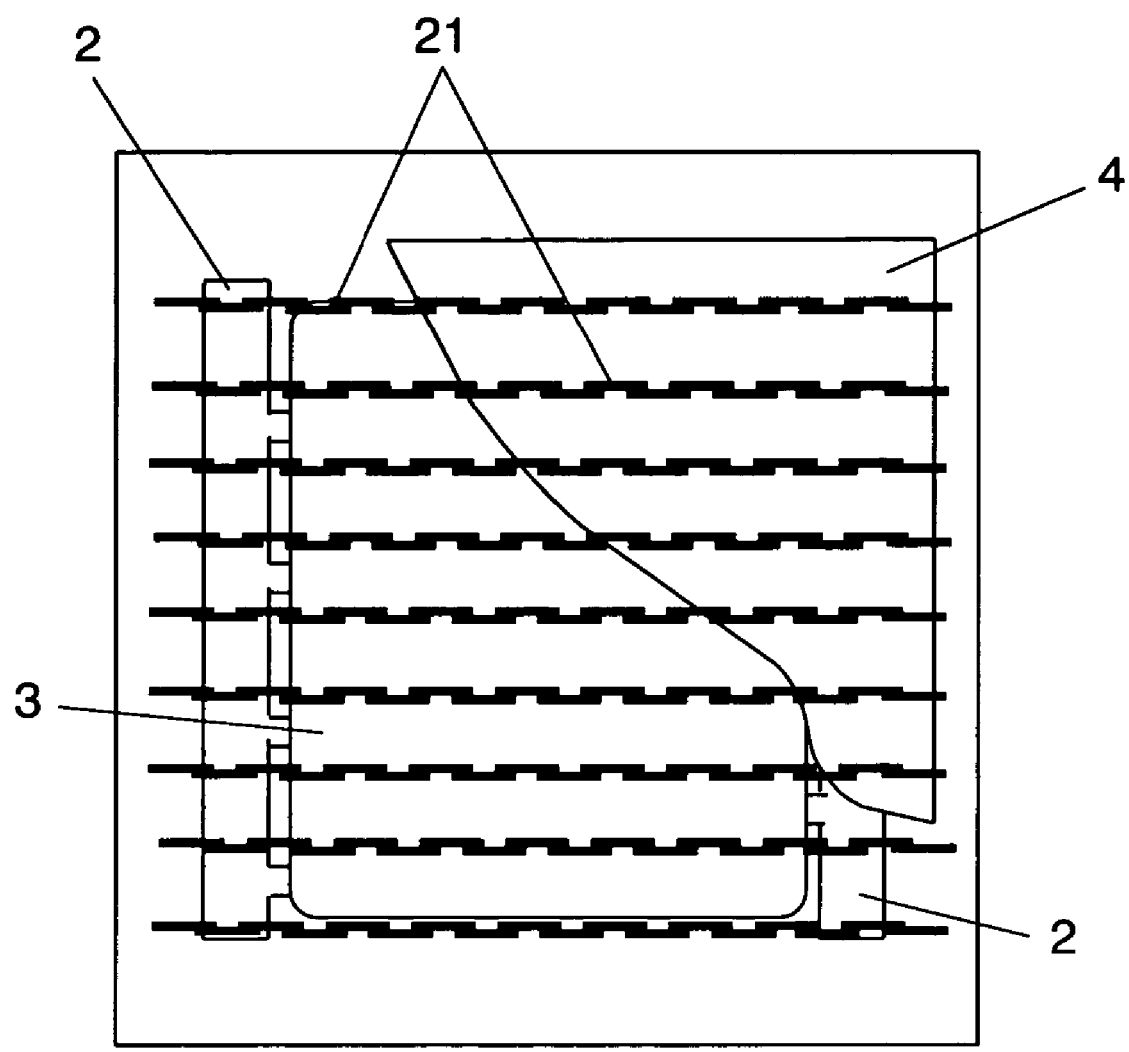

Elongation by deformation

FLEXIBLE PTC HEATING ELEMENT AND METHOD OF MANUFACTURING THE HEATING ELEMENT

THIS APPLICATION IS A U.S. NATIONAL PHASE APPLICATION OF PCT INTERNATIONAL APPLICATION PCT/JP2003/007600.

TECHNICAL FIELD

The present invention relates to a flexible PTC heating element that is used, for example, for a car seat heater and a handle heater, having flexibility and attachable to an optional curved surface and having a self-temperature control function, as well as a manufacturing method thereof.

BACKGROUND ART

FIGS. 42A and B show a structure of a conventional PTC heating element. The conventional PTC heating element includes a pair of comb-like electrodes (hereinafter as electrodes) 201, 202 and PTC resistor (hereinafter as resistor) 203 at a position where electric power is supplied therefrom on substrate 200. Substrate 200 is composed of a material having no flexibility at all or poor in the flexibility such as ceramics, insulated metal plate or polyester film. Electrodes 201, 202 are obtained by printing and drying a conductive paste. Resistor 203 is obtained by printing and drying a PTC composition ink (hereinafter as PTC ink). Substrate 200 and cover material 204 made of the same material as that of the substrate 200 cover and protect electrodes 201, 202 and PTC 203. FIG. 42A shows resistor 203 and cover material 204 while being partially cut-away.

In a case of using a polyester film as substrate 200 and cover material 204, a polyethylene hot melting resin, for example, is previously adhered to cover material 204. Substrate 200, electrodes 201, 202, resistor 203 and cover material 204 are bonded by way of the resin. The PTC resistor has been used as an over current protective device or a heating element small in the size and of a special shape while being fixed so as not to undergo mechanical stress such as bending for use in removing dews and frosts of automobile door mirrors and the like. With the practical point of view, terminals for power supply are necessary but are not illustrated.

As the PTC ink forming resistor 203, a base polymer including a crystalline polymer material, and a conductive material such as a carbon black, a metal powder or graphite are dispersed in a solvent. Such an ink is disclosed, for example, in Japanese Patent Unexamined Publication Nos. 56-13689, 6-96843 and 8-120182.

Resistor 203 has a characteristic that the resistance value increases along with temperature elevation and the resistance value increases abruptly when reaching a certain temperature to conduct self temperature control. Such a resistance-temperature characteristic is referred to as PTC (Positive Temperature Coefficient) characteristic and a resistor having such PTC characteristic is referred to as a PTC resistor. It is considered that the characteristic is developed by disconnection of a conductive path of the conductive material caused by cubical expansion of the crystalline polymer due to temperature elevation, which entails the increase of the resistance.

Since the conventional PTC heating element is formed on substrate 200 of poor flexibility as described above, it can not be used for application use as assembled in a car seat and fit to a human body, or can not be attached to an object of a curved surface such as a handle.

When a flexible resin film such as a resin or an elastomer is used for substrate 200, a PTC heating element having a temporal flexibility may be formed. When mechanical stress such as elongation exerts, however, disconnection or cracking may be caused to electrodes 201, 202 or resistor 203. Development of the PTC characteristics is caused by the change of the chained state of the conductive material caused by the thermal change in volume of the crystalline polymer. Accordingly, it may be considered easily that physical or mechanical change in dimension of the substrate gives a significant effect on the characteristic of the PTC resistor. Therefore, a PTC heating element capable of enduring the use under a practical circumstance where repetitive bending load is applied has not yet been developed.

DISCLOSURE OF THE INVENTION

A flexible PTC heating element according to the present invention includes printed electrodes and a PTC resistor supplied with electric power therefrom and has one of the following constitutions.
(1) A portion of the electrodes and the PTC resistor is impregnated in a flexible substrate.
(2) A flexible substrate is composed of a resin foam material or a rubber material having concave/convex shape on the surface.
(3) At least one of the electrodes or the PTC resistor is provided with an elongation deformation portion.
(4) A flexible substrate has adhesiveness and either the flexible substrate or a flexible cover material has an elongation control portion.

BRIEF DESCRIPTION OF THE DRAWINGS

FIG. 10 is a partially cut-away plan view of a PTC heating element according to a twelfth exemplary embodiment of the present invention.

DETAILED DESCRIPTION OF THE EXEMPLARY EMBODIMENTS

Exemplary embodiments of the present invention are to be described. Those of the same constitutions are described with reference to identical references, for which detailed descriptions are to be omitted.

First Exemplary Embodiment

Figure 1A:
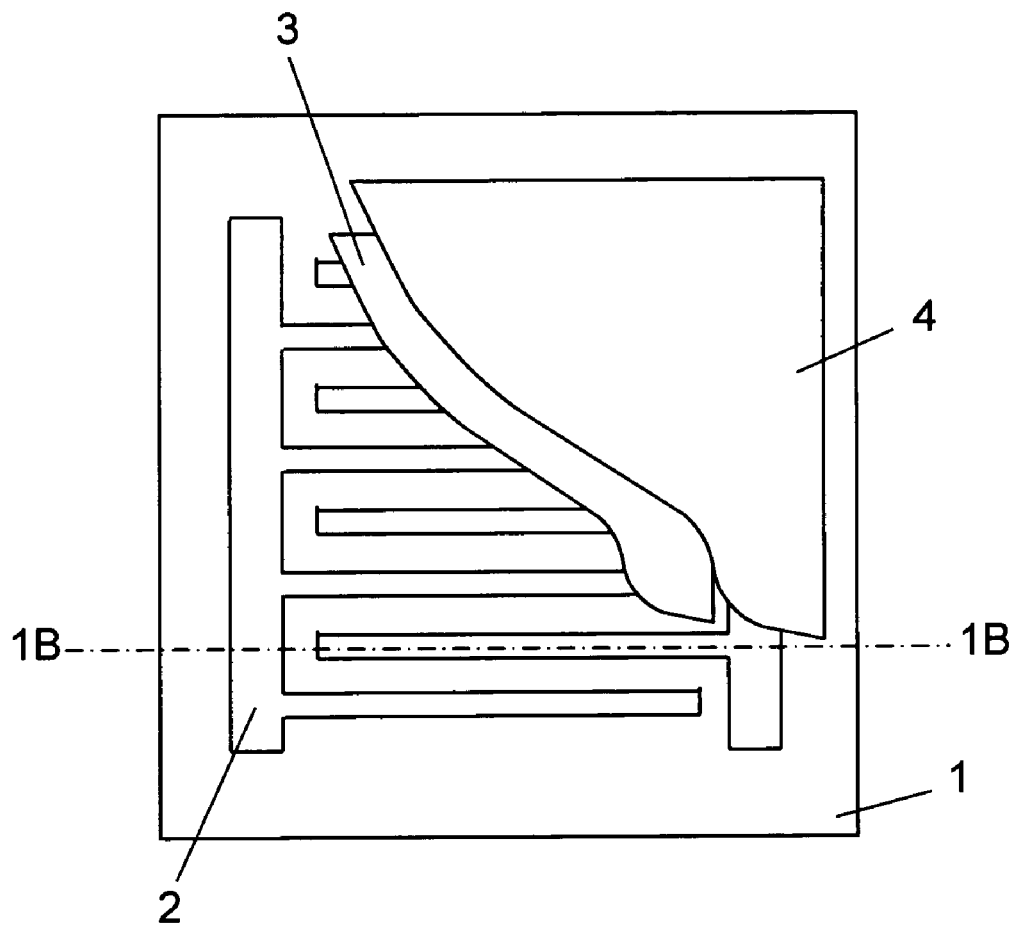
FIG. 1A is a partially cut-away plan view showing the constitution of a PTC heating element according to a first exemplary embodiment of the present invention.
Figure 1B:
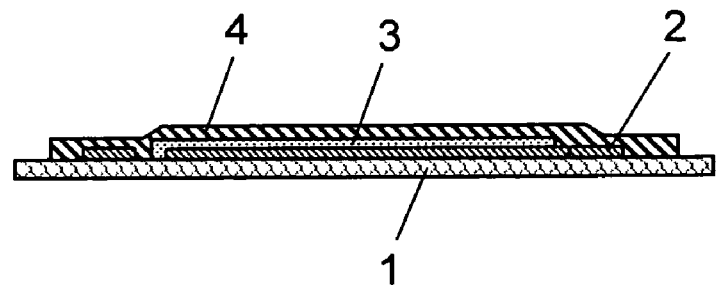
FIG. 1B is a cross sectional view at position 1B—1B of the PTC heating element in FIG. 1A.

FIG. 1A is a partially cut-away plan view showing a PTC heating element of this embodiment and FIG. 1B is a cross sectional view at position 1B—1B. Flexible substrate (hereinafter as substrate) 1 has a gas barrier property and waterproof property, in which a liquid such as an ink is impregnated. For example, it is constituted by bonding a polyurethane hot melting film to the surface of a polyester non-woven fabric including long fibers. Comb-shape electrodes (hereinafter as electrodes) 2 are obtained by screen printing and drying a conductive paste in which conductive particles such as silver or carbon black is dispersed in a resin solution. PTC resistor (hereinafter as resistor) 3 is obtained by screen printing and drying a PTC ink. Since both the conductive paste and the PTC ink contain a flexible resin binder, the printed matters formed after drying keep flexibility to some extent. Flexible cover material (hereinafter as cover material) 4 has a gas barrier property and waterproof property, covers entire substrate 1 to protect electrodes 2 and resistor 3. Cover material 4 is constituted by bonding a polyester hot melting film to the surface of a polyester non-woven fabric including long fibers and bonded on the surface of the polyester hot melting film with substrate 1.

The PTC ink is prepared, for example, by the following procedures. An ethylene vinyl acetate copolymer and a crystalline resin such as polyethylene resin, a carbon black, a chemical cross linker and an affinity providing agent such as a coupling agent are kneaded each by a predetermined amount. Then, heat treatment is applied to obtain a kneaded product. Successively, the product is pulverized and the pulverized product and a flexible binder such as an acrylonitrile-butadiene rubber adhesive are kneaded and crushed by three rolls. The kneaded one is diluted with a solvent. The PTC ink is obtained as described above.

In this embodiment, electrodes 2 are constituted as a comb type. This can effectively supply electric power to resistor 3.

With the constitution as described above, a portion of the material constituting electrodes 2 and resistor 3 is impregnated into substrate 1. The more improved a vibration durability of the PTC heating element is, the more the extent of impregnation is. The vibration durability is one of evaluation means for the flexibility as a car seat heater, for which a semi-spherical ball of 165 mm diameter assuming a man's knee is pressed downward by 50 mm repetitively from the surface of the car seat. It is required for this evaluation that the change of the resistance value is 10% or less even after 1,000,000 cycles of vibrations in view of practical use.

When a PTC heating element is prepared in the same manner as in this embodiment by using a polyester film with no liquid impregnating property and subjected to the evaluation as described above, the resistance value increases due to disconnection of the comb type electrode at about 300,000 cycles. On the contrary, the PTC heating element of this embodiment using substrate 1 having the liquid impregnating property can satisfy the aimed specification. Number of vibration cycles till the change of the resistance value reaches 10% is 1,300,000 cycles. A PTC heating element using a substrate including short fibers further improved with impregnation retainability is intact till 3,000,000 cycles of vibrations. As described above, a substrate to which the conductive paste and the PTC ink are impregnated more easily has more excellent vibration durability.

The polyurethane hot melting film constituting substrate 1 has a melting point lower than the drying temperature of the conductive paste forming electrode 2 and the PTC ink forming resistor 3. Specifically, the drying temperature of the conductive paste or the PTC ink is 150° C., while the melting point of the hot melting film is about 120° C. The conductive paste and the PTC ink have fluidity at a bonding temperature of the hot melting film and can be impregnated into substrate 1.

Electrodes 2 and resistor 3 are covered at the entire periphery thereof with substrate 1 and cover material 4 having the gas barrier property and waterproof property. Therefore, contact with external atmosphere as deteriorating factors such as oxygen, steam or moistures can be prevented reliably to provide a PTC heating element of high reliability.

Second Exemplary Embodiment

Figure 2:
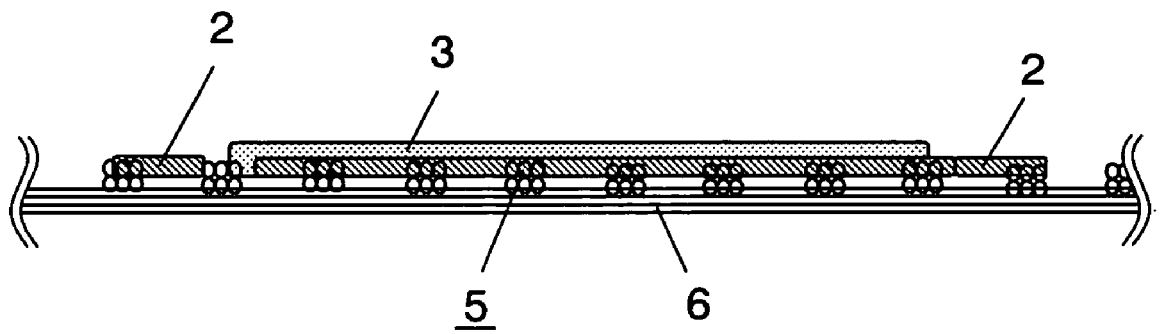
FIG. 2 is a cross sectional view of a PTC heating element according to a second exemplary embodiment of the present invention.

FIG. 2 is a cross sectional view showing a PTC heating element according to a second exemplary embodiment. Other constitution than the substrate is identical with that in the first exemplary embodiment. A flexible cover material is not illustrated. A substrate includes impregnation controlling non-woven fabric (hereinafter as non-woven fabric) 5. Non-woven fabric 5 is obtained by impregnating a resin coating material by an appropriate amount to heat resistant fiber non-woven fabric (hereinafter as non-woven fabric) 6 and drying the same. Non-woven fabric 6 is a polyester non-woven fabric including orthogonal fibers. Electrodes 2 formed by printing and drying a conductive paste are constituted on non-woven fabric 5 and, resistor 3 formed by printing and drying a PTC ink is constituted further thereon.

Since the substrate is composed of non-woven fabric 5, penetration of the conductive paste and the PTC resistor ink through the substrate can be prevented during preparation to conduct satisfactory screen printing. This can control the coating amount and the resistance value reliably. The coating amount for printing depends on the mesh of a printing plate and printing conditions such as ink viscosity. It significantly undergoes the effect of the surface property of substrate 1, that is, the surface smoothness, the impregnating property or the like. Accordingly, the conductive paste and the PTC ink are printed and coated after impregnating a coating material by an appropriate amount to condition the surface. This can always ensure a stable coating amount to provide a PTC heating element of an appropriate quality. Since the flexible resin is used for the coating material, the flexibility of the PTC heating element is not spoiled.

Electrodes 2 and resistor 3 on non-woven fabric 5 are partially impregnated to the polyester non-woven fabric as a base substrate in this constitution. This can maintain the vibration durability.

As described above for the first exemplary embodiment, the more easily a conductive paste or PTC ink can be impregnated to a substrate, the more excellent the vibration durability is. As the impregnation amount increases, however, the coating amount of the conductive paste or the PTC ink increases to increase the cost. The coating varies more to make it difficult to develop reproducible PTC characteristics. Accordingly, it is preferred to control the impregnation amount in order to ensure an appropriate amount of coating. In this embodiment, the substrate is constituted with impregnation controlling non-woven fabric 5 thereby controlling the coating amount of the conductive paste and the PTC ink.

In this embodiment, non-woven fabric 6 as the base substrate for non-woven fabric 5 is made of a polyester non-woven fabric including long fibers but this is not limitative. Synthetic fibers such as polypropylene or nylon, or natural fibers such as cotton may also be used.

As the coating material, latex, for example, of acrylic resin, urethane resin, amide resin, ester resin, ester urethane resin and silicon resin are preferred. The resins described above have flexibility and the latexes thereof are formed by emulsifying and dispersing a resin component into water or an organic solvent. They have good adhesion with the polyester non-woven fabric and heat resistant when dried, and give no undesired effects on the PTC ink. Particularly, urethane, ester or silicone type resins are further preferred because they improve the PTC characteristic.

Third Exemplary Embodiment

Figure 3:
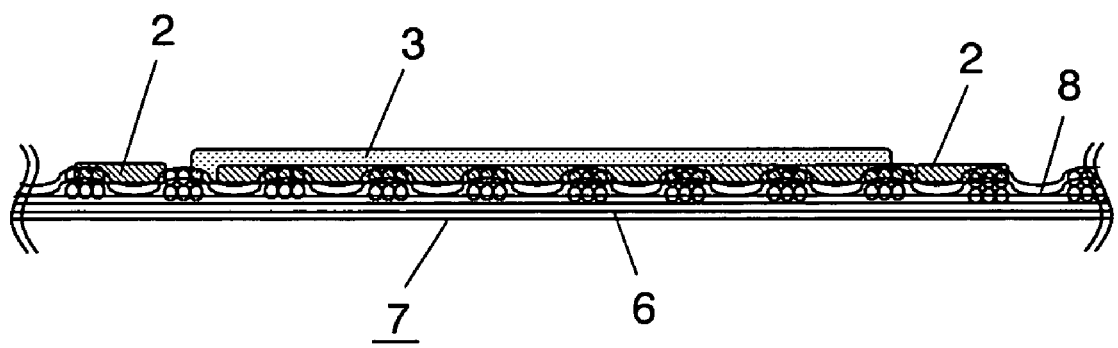
FIG. 3 is a cross sectional view of a PTC heating element according to a third exemplary embodiment of the present invention.

FIG. 3 is a cross sectional view showing a PTC heating element according to a third exemplary embodiment. A flexible cover material is not illustrated. This is different from the second exemplary embodiment in that impregnation controlling non-woven fabric (hereinafter as non-woven fabric) 7 is used instead of non-woven fabric 5. Non-woven fabric 7 has a constitution in which hot melting film (hereinafter as a film) 8 is bonded on heat resistant fiber non-woven fabric (hereinafter as non-woven fabric) 6, for example, made of polyester.

With the constitution as described above, hot melting film 8 controls the impregnation and the coating amount of the conductive paste and the PTC ink into non-woven fabric 6. Accordingly, a stable and flexible PTC heating element with less variation of quality can be obtained. Thermal properties of film 8 are added to the PTC resistor. Accordingly, the PTC characteristics are improved depending on the kind of film 8. Since electrodes 2 and PTC resistor 3 are shielded from the external atmosphere by film 8, a flexible PTC heating element of high long lasting reliability can be provided.

In this embodiment, the hot melting film is used with an aim of controlling impregnation. However, when a hot melting film is merely bonded and used in the form of a film, impregnation of the conductive paste or the PTC ink to non-woven fabric 6 as a substrate is lowered and, as a result, the vibration durability is deteriorated. Accordingly, after attaching film 8 to non-woven fabric 6, a heat treatment is applied with a temperature of the melting point of film 8 or higher, which is used after sufficiently fitting film 8 to the surface shape of non-woven fabric 6 and impregnating it partially into non-woven fabric 6. This provides a structure in which the conductive past and the PTC ink printed thereon are also partially impregnated into non-woven fabric 6 to maintain vibration durability.

For film 8, it is preferred to use ethylene-vinyl acetate resin, urethane resin, ester resin, and ester urethane resin. Film 8 has flexibility and gives no undesired effect on the PTC ink like the resin coating material as described for the second exemplary embodiment. It is particularly preferred to use urethane or ester urethane type resin, since the PTC characteristic is improved.

Fourth Exemplary Embodiment

Figure 4:
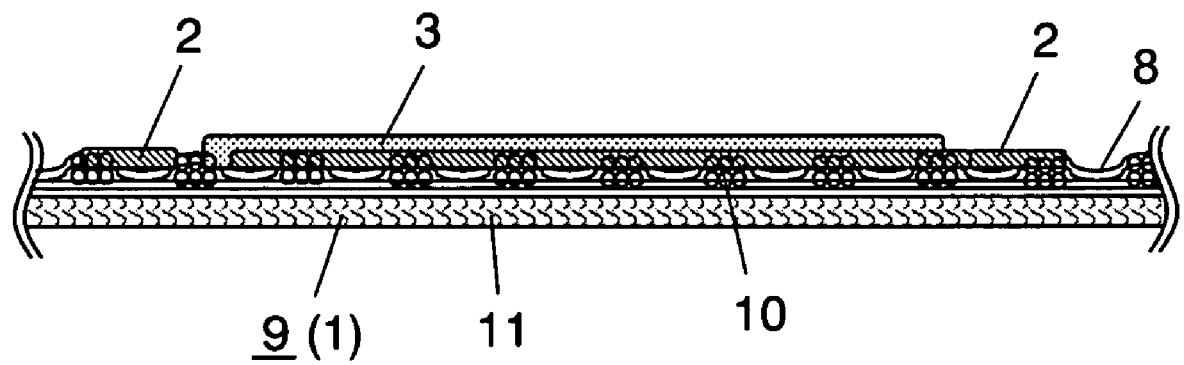
FIG. 4 is a cross sectional view of a PTC heating element according to a fourth exemplary embodiment of the present invention.

FIG. 4 is a cross sectional view showing a PTC heating element according to a fourth exemplary embodiment. A flexible cover material is not illustrated. This embodiment is different from the third exemplary embodiment in that a heat resistant fiber non-woven fabric as a base for impregnation controlling non-woven fabric 9 has a laminate structure of bonding spun bond 10 and spun lace 11 to each other.

While use of spun bond 10 alone may sometimes generate sounds at deformation, this can be prevented by bonding with spun lace 11. This provides the PTC heating element with voluminous feeling and improves skin touch.

The spun bond and the spun lace denote the type of non-woven fabric manufacturing methods. In the spun bond, after spinning, the fibers are directly joined by fusing them at dots to each other by a heat roll (embossing). In the spun lace, fibers are entangled to each other by a high pressure water jet stream. Since spun lace 11 is flexible and bulky, it prevents generation of sounds.

Instead of spun lace 11, needle punching of entangling fibers by needling with a needle may also be used.

In this embodiment, a laminate structure of bonding the spun bond and the spun lace or needle punching is applied as the heat resistant fiber non-woven fabric in the third exemplary embodiment. Similar effects can also be obtained by applying such heat resistant fiber non-woven fabric to the second exemplary embodiment.

Fifth Exemplary Embodiment

This embodiment is different from the fourth exemplary embodiment in that bonding with spun lace or needle punch 11 is further conducted by using adhesive dots as chemical bond instead of the spun bond. The chemical bond is one of non-woven fabric manufacturing methods of bonding fibers to each other by an adhesive (resin).

In the spun bond, since the resin is melted and bonded by heating, the thickness is increased or crystallization is promoted naturally in the bonded portions. Accordingly, the flexibility of the material per se may sometimes be lowered. On the other hand, in the chemical bond using the adhesive dots, the flexibility of the material per se is not lost by selection of flexible adhesives. Accordingly, a flexible substrate can be obtained. In this embodiment, all of the types of non-woven fabrics are joined by the adhesive dots to obtain a further flexible impregnation controlling non-woven fabric. As the adhesive, it is preferred to use urethane resin or acryl resin.

Sixth Exemplary Embodiment

Figure 5:
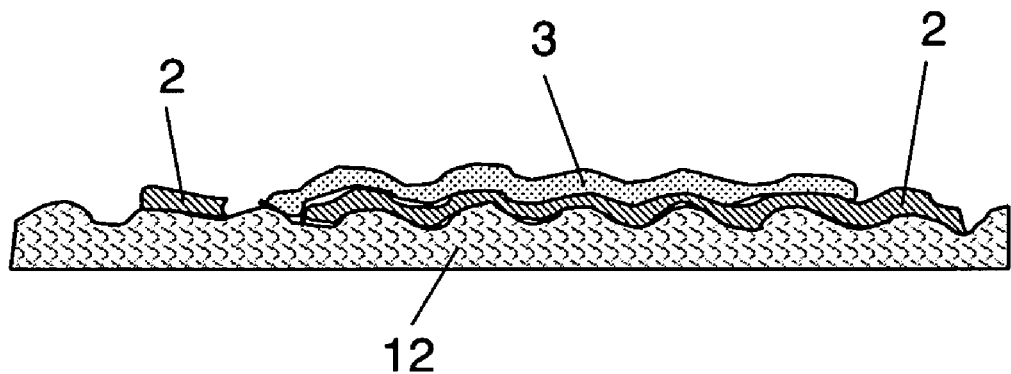
FIG. 5 is a cross sectional view of a PTC heating element according to a sixth exemplary embodiment of the present invention.

FIG. 5 shows a cross sectional view of a PTC heating element according to a sixth exemplary embodiment. In this embodiment, resin foam or a rubber sheet applied at the surface with a concave/convex shape is used as flexible substrate (hereinafter as substrate) 12. Electrodes 2 and resistor 3 are formed by printing on the surface. A flexible cover material formed over them is not illustrated. The resin foam includes those of closed-cell and open-cell. In the closed-cell foams, since the cut face is naturally a surface having a concave/convex shape, the foam material can be used as it is. The open-cell foams are used by coating a coating material or the like to the surface thereby conditioning the surface. The resin foams include, for example, urethane or olefin thermoplastic elastomer foams. In the case of the rubber sheet, a concave/convex shape is formed to the surface, for example, by applying a cloth pattern during molding.

With any of the constitutions as described above, each of electrodes 2 and resistor 3 formed by printing and drying on the surface has a cross section of a concave/convex shape to take a state as if they are shrunk. Accordingly, electrodes 2 and the PTC resistor have margin for elongation stress. Thus, a stress applied to electrodes 2 and resistor 3 is reduced even in a case where substrate 12 elongates. In this embodiment, substrate 12 has no restriction for elongation. It is preferred to provide a flexible cover material not illustrated with an effect of controlling elongation.

Seventh Exemplary Embodiment

Figure 6A:
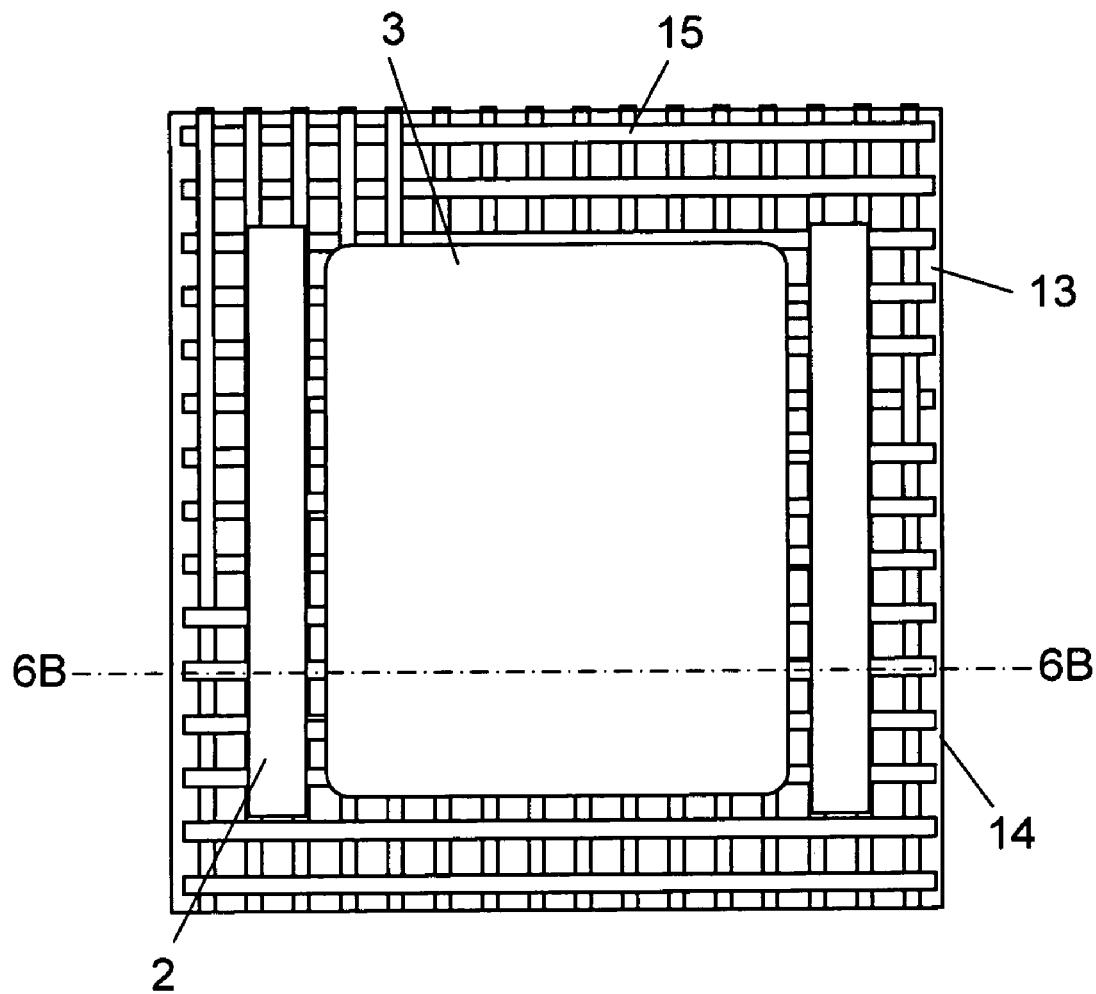
FIG. 6A is a partially cut-away plan view of a PTC heating element according to a seventh exemplary embodiment of the present invention.
Figure 6B:
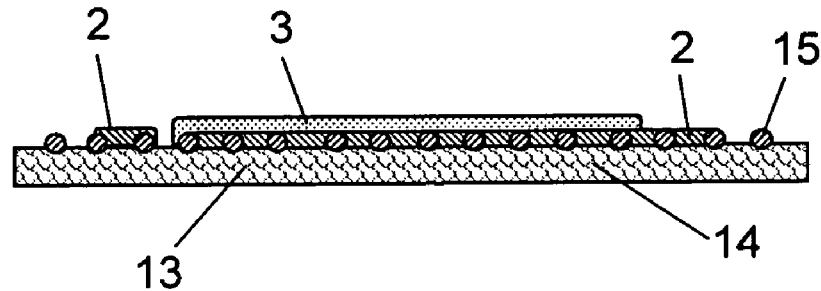
FIG. 6B is a cross sectional view at position 6B—6B of the PTC heating element in FIG. 6A.

FIGS. 6A, B are, respectively, a partially cut-away plan view and a cross sectional view of a seventh exemplary embodiment in which a flexible cover material is not illustrated. Flexible substrate 13 has resin foam 14 bonded at the surface thereof with resin net 15. Resin net 15 includes fibers, for example, of polyester, polypropylene and polyamide.

With the constitution as described above, electrodes 2 and resistor 3 formed by printing on the surface are provided with a concave/convex cross sectional shape and have margin to elongation stress. Resin net 15 restricts elongation. This protects electrodes 2 and resistor 3. By the selection of the material of resin net 15, a structure impregnated with electrodes 2 and resistor 3 formed by printing is provided, to obtain a flexible PTC heating element having high vibration durability.

Similar effects can be obtained also by using a rubber sheet instead of resin foam 14.

Eighth Exemplary Embodiment

Figure 7:
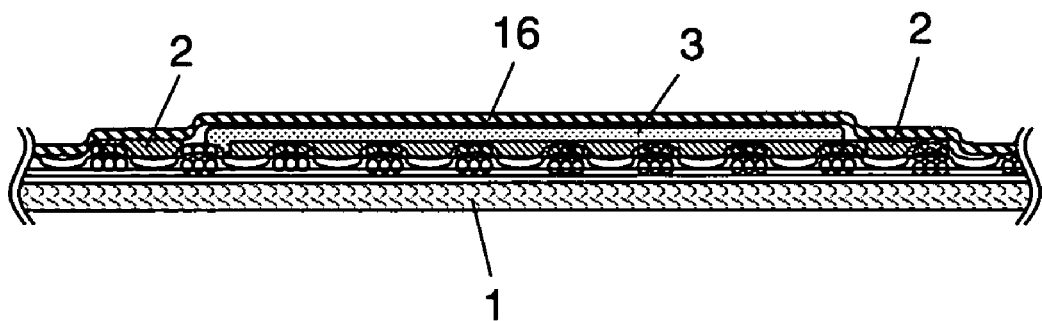
FIG. 7 is a cross sectional view of a PTC heating element according to an eighth exemplary embodiment of the present invention.

FIG. 7 is a cross sectional view of a PTC heating element according to an eighth exemplary embodiment. Flexible cover material (hereinafter as cover material) 16 is constituted by coating polyester resin type latex. Cover material 16 has adhesion with flexible substrate 1. Other constructions are identical with those in the fourth exemplary embodiment. Alternatively, this may be applied to the first to third embodiments.

In this embodiment, electrodes 2 and resistor 3 are shielded from external atmosphere by coating the resin latex. As a solvent for the resin latex, water is often used and the resin latex can be dried at 100° C. or lower. Accordingly, the thus prepared PTC resistor scarcely causes change of the resistance value and has a stable PTC characteristic to provide a flexible PTC heating element having good vibration resistance.

Ninth Exemplary Embodiment

Figure 8:
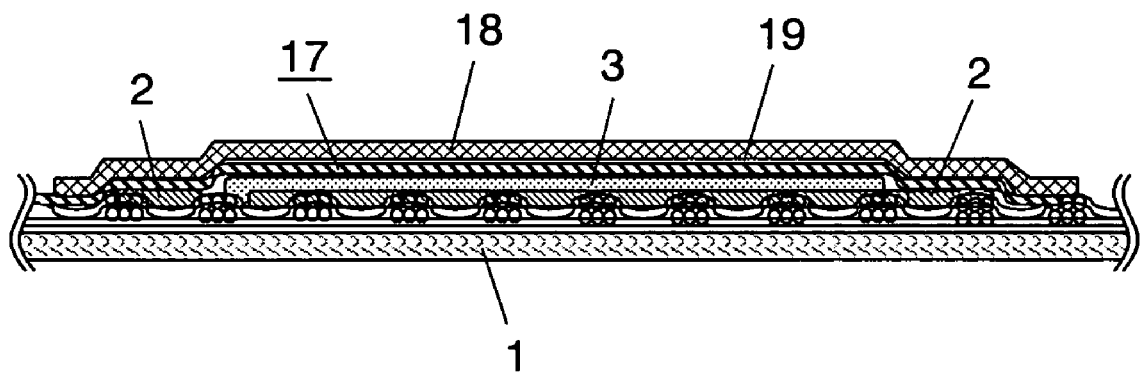
FIG. 8 is a cross sectional view of a PTC heating element according to a ninth exemplary embodiment of the present invention.

FIG. 8 is a cross sectional view of a PTC heating element according to a ninth exemplary embodiment. Flexible cover material 17 is constituted by bonding polyester non-woven fabric (hereinafter as non-woven fabric) 18 with a hot melting film (hereinafter as film) 19. Non-woven fabric 18 is composed, for example, of a spun lace. Film 19 is composed, for example, of a polyester type hot melting film. Flexible substrate 1, electrodes 2, resistor 3, and non-woven fabric 18 are adhered by way of film 19. The constitution of substrate 1 is identical with that of the fourth exemplary embodiment and it may also have a constitution like that in the first to third exemplary embodiments.

With the constitution as described above, good vibration resistance can be obtained, electrodes 2 and resistor 3 are shielded from external atmosphere by film 19, and the mechanical strength of non-woven fabric 18 is provided to the PTC heating element.

Tenth Exemplary Embodiment

The cross sectional structure of a PTC heating element according to a tenth exemplary embodiment is identical with that of the ninth exemplary embodiment. In this embodiment, the resin foam described as the substrate in the seventh exemplary embodiment, or a rubber sheet applied with an adhesive is used instead of cover material 17. Explanations for other constitutions are identical with those in the ninth exemplary embodiment.

With the constitution as described above, good vibration resistance can be obtained, electrodes 2 and resistor 3 are shielded from external atmosphere and the PTC heating element is applied with flexible and soft feelings of the resin foam or the rubber sheet. Particularly, in a case of using the resin foam, the PTC resistor is put to a highly heat insulative state. Accordingly, it is possible to suppress the sense of warming of a human body to an appropriate range and increase the heat generating temperature of the PTC resistor to suppress the consumption power during a stable saturated state.

Eleventh Exemplary Embodiment

Figure 9A:
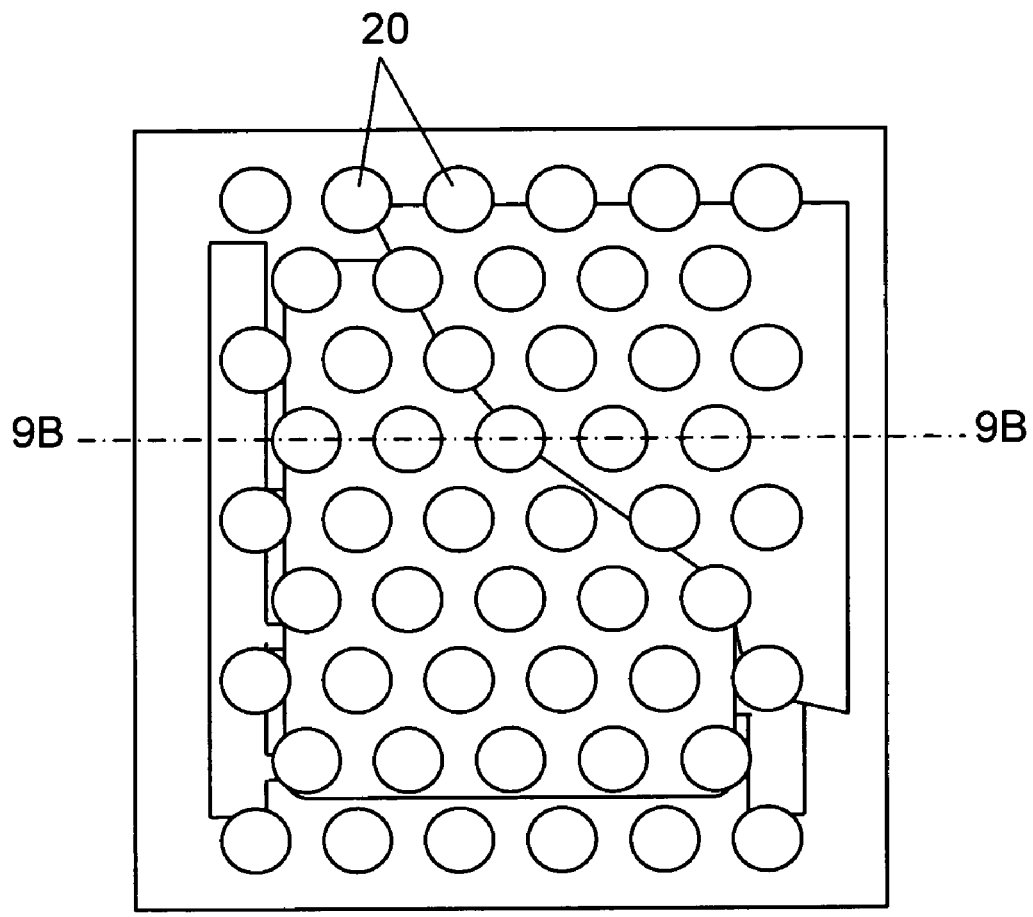
FIG. 9A is a partially cut-away plan view of a PTC heating element according to an eleventh exemplary embodiment of the present invention.
Figure 9B:
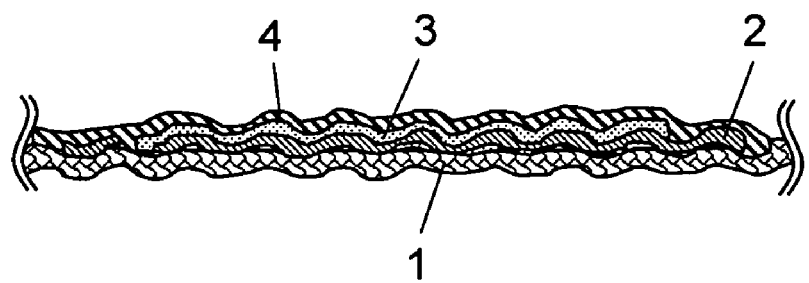
FIG. 9B is a cross sectional view at position 9B—9B of the PTC heating element in FIG. 9A.

FIGS. 9A, B are, respectively, a partially cut-away plan view and a cross sectional view of a PTC heating element according to an eleventh exemplary embodiment. In this embodiment, concave/convex shape 20 formed by engraving is provided over the entire PTC heating element. Engraving is a fabrication method of forming a concave/convex cross sectional shape by pressing using a hot plate having a concave/convex surface. In this embodiment, flexible substrate 1 may not always have an ink impregnating property. That is, it may be a flexible film including, for example, ethylene vinyl acetate resin, urethane resin, ester resin or ester urethane resin, or a substrate like in the first to fourth exemplary embodiments.

This constitution can provide the PTC heating element with flexibility, and margin to the elongation. By forming the concave/convex shape mechanically and thermally, the resistance value of the PTC resistor is stabilized in an early stage.

Twelfth Exemplary Embodiment

FIG. 10 is a partially cut-away plan view of a PTC heating element according to a twelfth exemplary embodiment. While the concave/convex shape is provided by engraving in the eleventh exemplary embodiment, stitching fabrication is used in this embodiment. Other constitutions are identical with those in the eleventh exemplary embodiment. By applying stitched portion 21, flexibility is applied to the PTC heating element in the same manner as in engraving. Since elongation of the PTC heating element is restricted by stitched portion 21, electrodes 2 and resistor 3 are protected. While seams are opened by stitching fabrication, electrodes 2 and resistor 3 are protected against external atmosphere by covering with the resin latex explained in the eighth exemplary embodiment.

As described above, according to the first to fifth embodiments and the eighth to twelfth embodiments, a portion of electrodes 2 and resistor 3 is arranged being impregnated into the flexible substrate. According to the sixth and seventh exemplary embodiments, the cross section of electrodes 2 and resistor 3 is formed into a concave/convex shape. Therefore, a flexible PTC heating element of high vibration durability and stable quality can be obtained.

By using the impregnation controlling non-woven fabric as the flexible substrate, a flexible PTC heating element exhibiting a reproducible PTC characteristic and suppressed with unnecessary increase in the cost can be provided.

Thirteenth Exemplary Embodiment

Figure 11A:
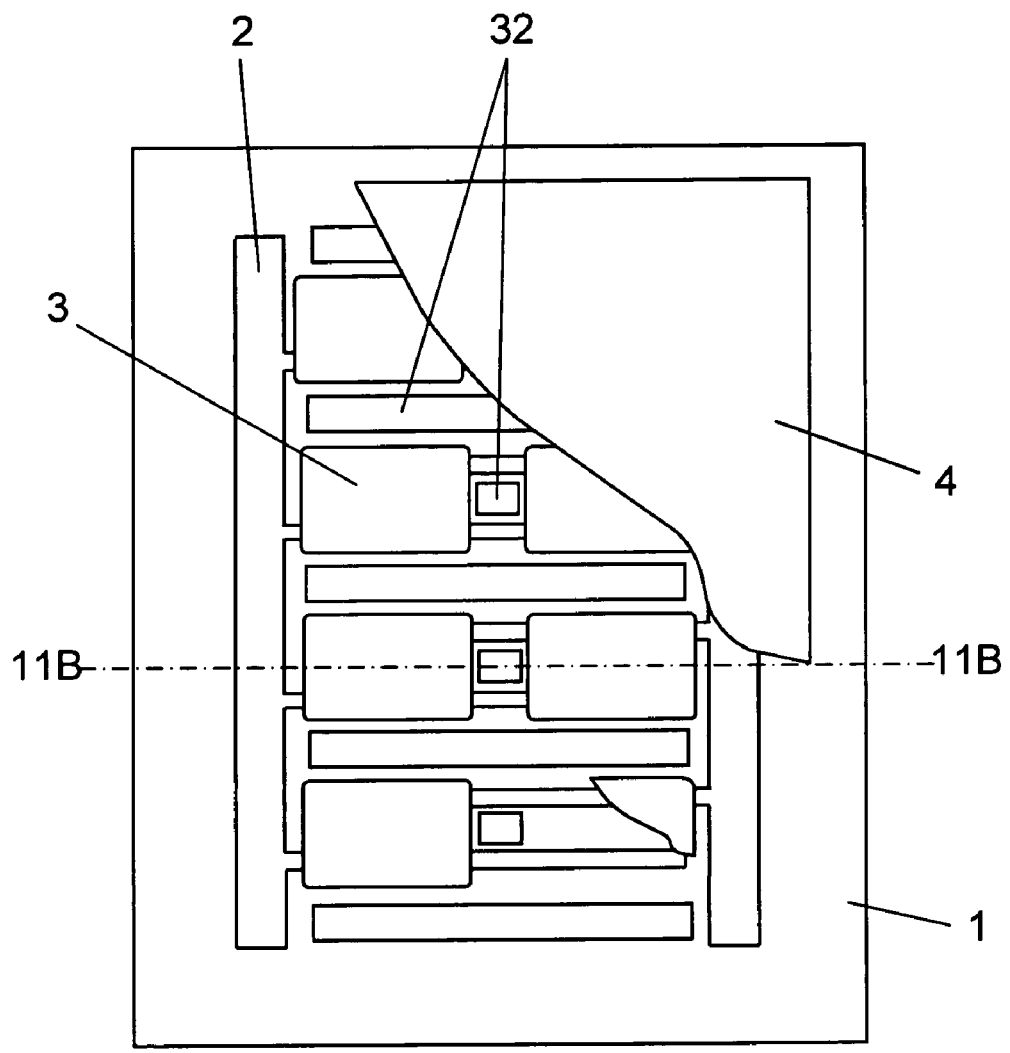
FIG. 11A is a partially cut-away plan view of a PTC heating element according to a thirteenth exemplary embodiment of the present invention.
Figure 11B:
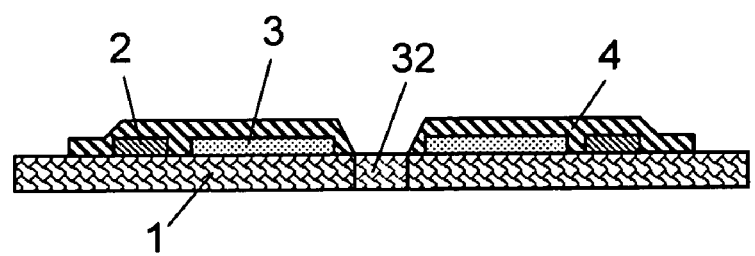
FIG. 11B is a cross sectional view at position 11B—11B of the PTC heating element in FIG. 11A.

FIG. 11A is a partially cut-away plan view showing a PTC heating element according to this embodiment and FIG. 11B is a cross sectional view at position 11B—11B. Flexible substrate (hereinafter as substrate) 1 is impregnated with a liquid such as an ink. For example, it is a polyester non-woven fabric including long fibers formed with openings 32. Resistors 3 are disposed not entirely but divisionally and each opening 32 is formed between resistors 3. Openings 32 can be prepared by previously punching out substrate 1. Resistor 3 is not disposed in opening 32 and flexibility is provided to the PTC heating element with openings 32 being as a bent portion. When such a PTC heating element is applied to a seat, feeling of attachment upon sitting and flexibility are improved. By blowing of cold blow from openings 32 in combination with a Peltier device or the like, confortability is enhanced.

In this embodiment, a recess may be formed to the main electrode of electrodes 2, or engraving may be applied to electrode 2 situated to the bent portion at opening 32 like in Embodiment 11. This can further improve the flexibility.

Fourteenth Exemplary Embodiment

Figure 12:
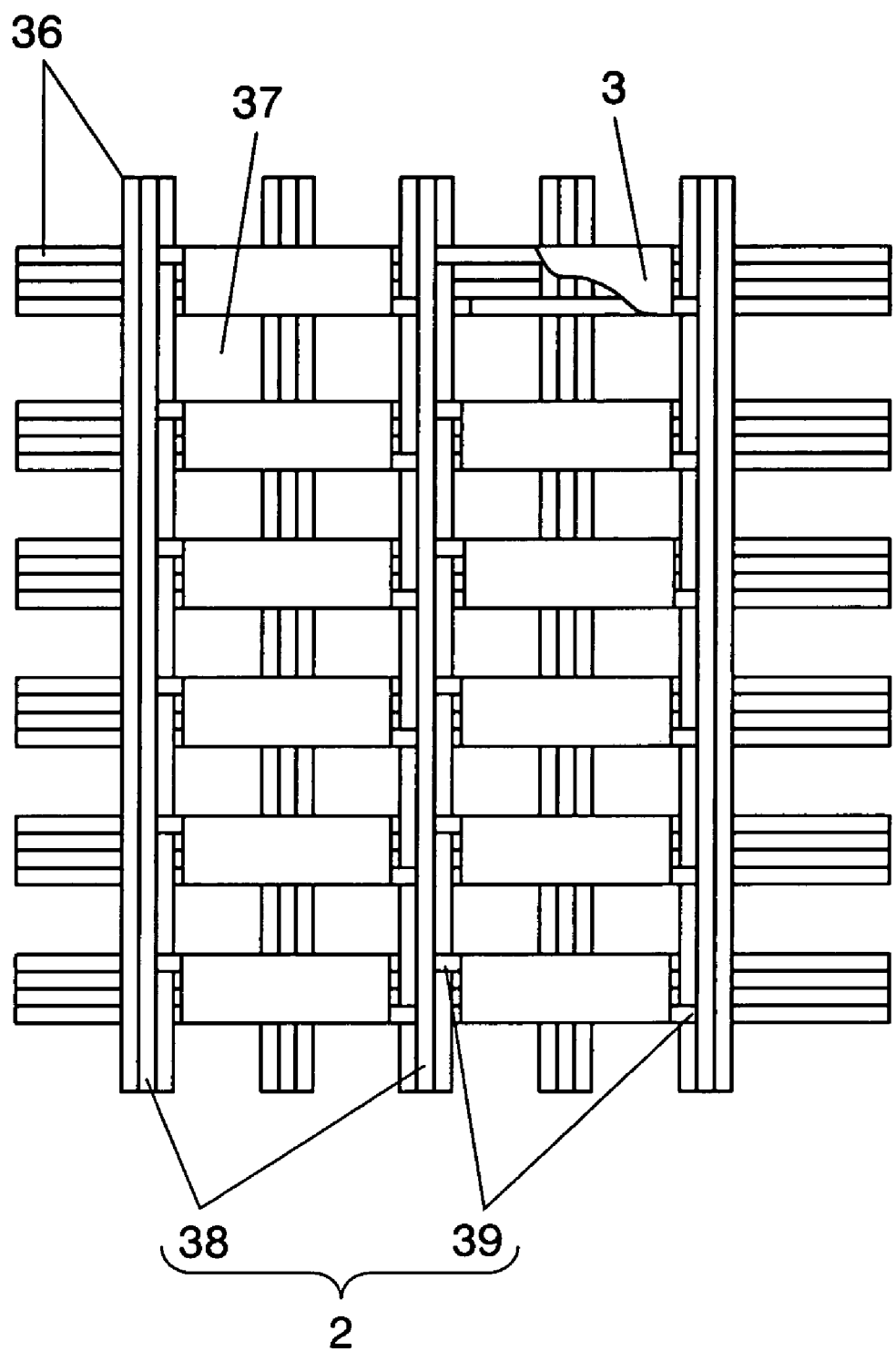
FIG. 12 is a partially cut-away plan view of a PTC heating element according to a fourteenth exemplary embodiment of the present invention.

A fourteenth exemplary embodiment of the present invention is to be described with reference to FIG. 12. Orthogonal fiber non-woven fabric (hereinafter as non-woven fabric) 36 constituting a flexible substrate includes polyester long fibers and has many openings 37. Comb-like electrodes (hereafter referred to as electrodes) 2 and PTC resistor (hereinafter as resistor) 3 are formed by printing on non-woven fabric 36 in accordance with the width of the fibers of non-woven fabric 36. Electrodes 2 and register 3 are formed in a state impregnated into the fibers of non-woven fabric 36, that is, in a state coated to individual polyester long fibers. Accordingly, non-woven fabric 36 has a structure excellent in the vibration durability to constitute a substrate having high tensile strength. It is preferred to increase the impregnation amount of a conductive paste for main electrode 38 of electrode 2 more than that of auxiliary electrode 39. In a case of a substrate with no liquid impregnating property such as polyester film, it is necessary to increase the printing width of main electrode 2 in order to prevent drop of potential in main electrode 2. In this embodiment, potential drop can be prevented by increasing the impregnation amount of the conductive paste without enlarging the printing width. A flexible cover material is not illustrated.

Required minimum amount of coating surface suffices for auxiliary electrode 39 and resistor 3. For this purpose, it is preferred to previously impregnate a resin latex to a printing portion of non-woven fabric 36 and drying the same to control the impregnation amount. As described above, the more the impregnation amount to the substrate is, the more the vibration durability is improved. However, as the impregnation amount increases, the coating amount of the conductive paste and the PTC ink is increased to increase the cost. Coating varies greatly to make it difficult to exhibit a reproducible PTC characteristic. Accordingly, in order to ensure an appropriate coating amount, it is preferred to control the impregnation amount. The method explained for the second or third exemplary embodiment can be used for this purpose.

Bonding at the intersections of non-woven fabric 36 is preferably conducted by an adhesive rather than by heating. When thermal fusion is conducted, the portion is integrated with increased thickness and crystallization proceeds to make the portion hard. In a case of using the adhesive, the flexibility of the material itself of non-woven fabric 36 can be developed by using a flexible adhesive, for example, of urethane or acrylic copolymer. In a case of a substrate having a self adhesion such as cotton fibers, the adhesive is not necessary. In a case of using such fiber materials, non-woven fabric 36 can be prepared by previously arranging fibers in orthogonal directions on a plane and then enlarging the space between fibers by water jet stream to form openings.

Fifteenth Exemplary Embodiment

Figure 13:
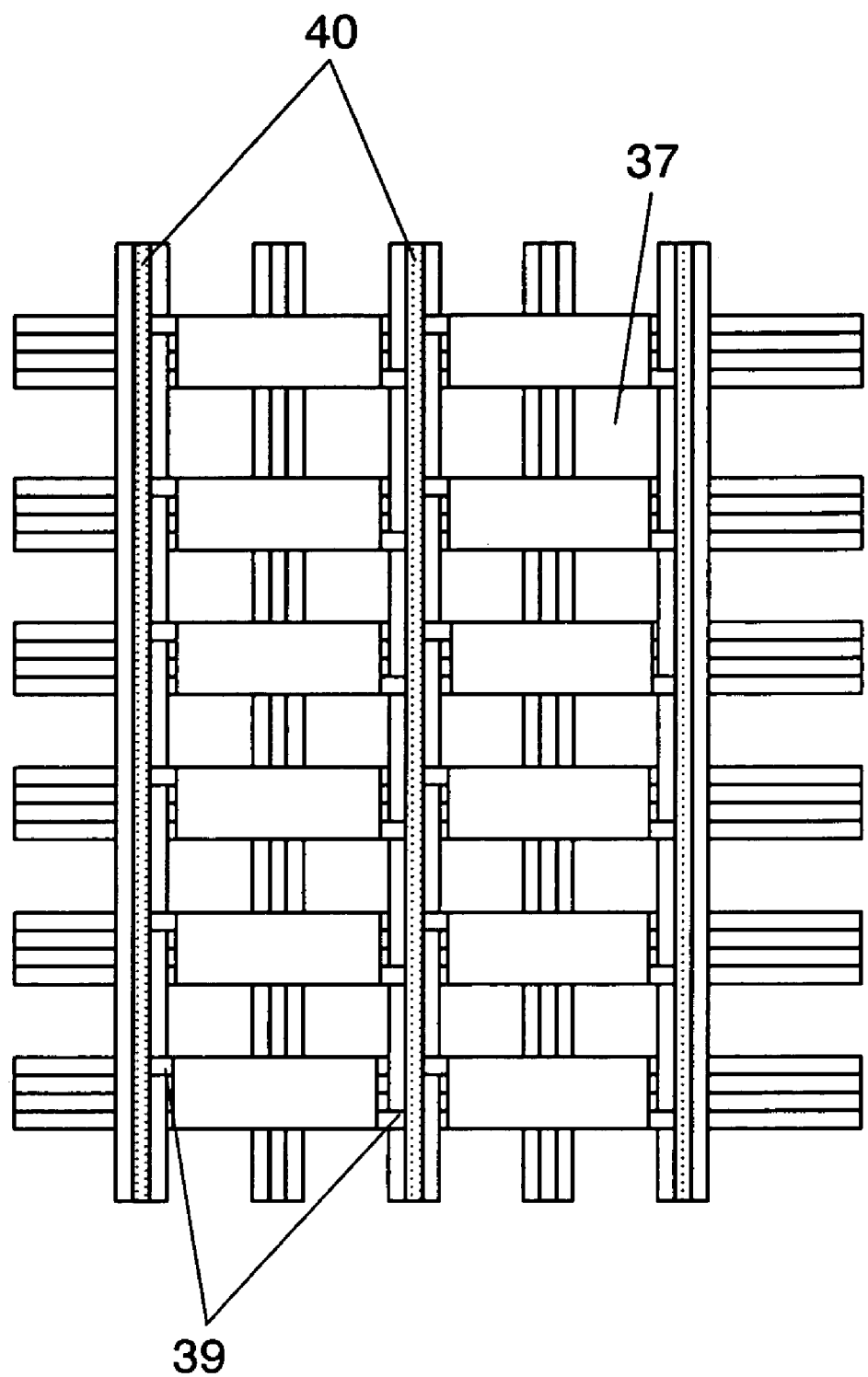
FIG. 13 is a plan view of a PTC heating element according to a fifteenth exemplary embodiment of the present invention.

A fifteenth exemplary embodiment of the present invention is to be described with reference to FIG. 13. This is different from FIG. 12 in that main electrode 38 in FIG. 12 is constituted with metal conductive wires 40 such as copper wires. Non-woven fabric 36 is prepared by incorporating conductive wires 40. Conductive wires 40 and auxiliary electrodes 39 are electrically conductive to each other by impregnating and securing a conductive paste in a non-woven fabric at the periphery of conductive wires 40.

As described above, main electrode 38 in the fourteenth exemplary embodiment is designed so as not to cause potential drop in the longitudinal direction thereof. Since main electrode 38 is constituted with a silver paste, the cost increase as the size of the heater is enlarged. By constituting the main electrode with conductive wire 40, the cost is decreased even in a case where the heater size is large.

In a constitution having such many openings 37, flexibility is impaired by using a cover material covering the entire portion, for example, a resin film. In view of the above, when a resin coating material such as a resin latex is used as the flexible cover material, the entire periphery of electrodes 2 and resistor 3 is covered while leaving openings 37. As described above, electrodes 2 and resistor 3 are shielded from external atmosphere to improve the reliability.

As the resin coating material, latex, for example, of acrylic resin, urethane resin, amide resin, ester resin, ester urethane resin or silicone resin is used. The kinds of latex described above are prepared by emulsifying and dispersing the resin ingredient in water or an organic solvent, which has good adhesion with the polyester non-woven fabric to provide flexibility and, when dried, have heat resistance and give no undesired effects on the PTC ink. Particularly, urethane, ester or silicone type resin latex has effect of improving the PTC characteristic and is effective.

In this embodiment, the long fiber polyester non-woven fabric is used for the flexible substrate but this is not limitative. Synthetic fibers such as polypropylene or nylon, or natural fibers such as cotton may also be used.

Sixteenth Exemplary Embodiment

Figure 14A:
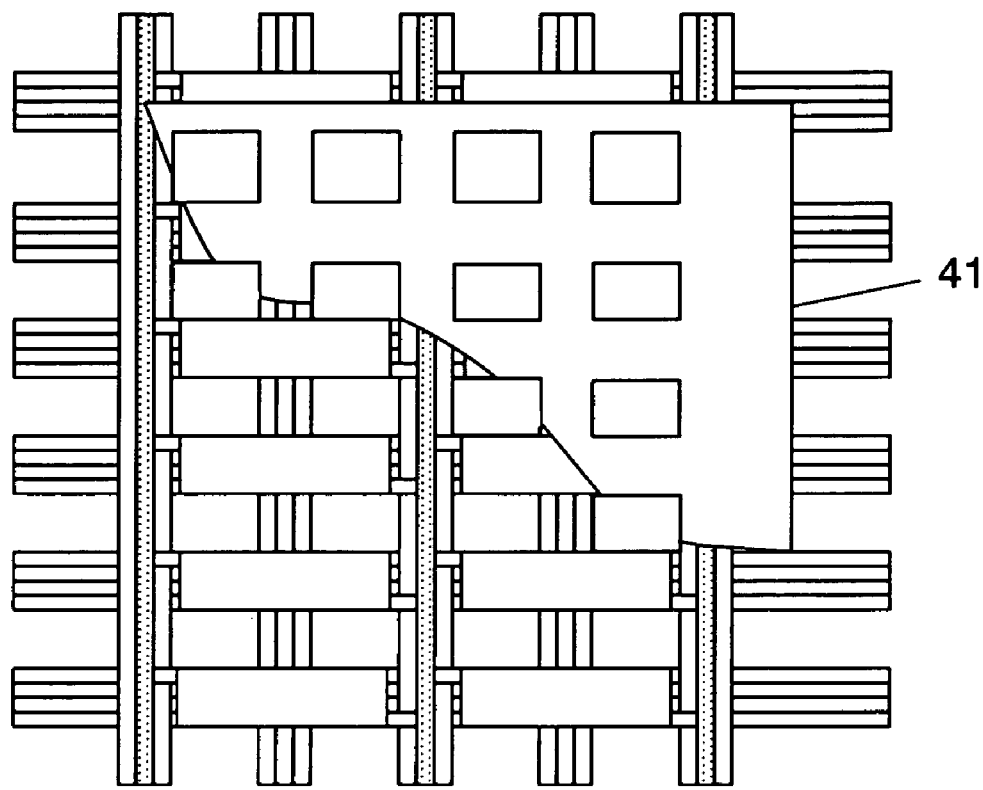
FIG. 14A is a partially cut-away plan view of a PTC heating element according to a sixteenth exemplary embodiment of the present invention.
Figure 14B:
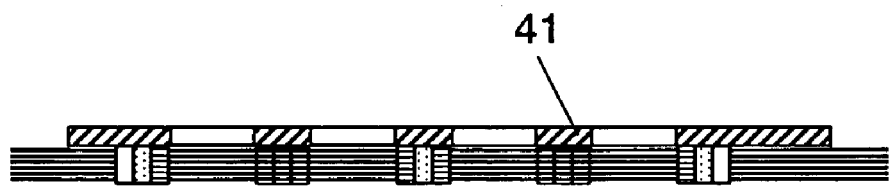
FIG. 14B is a cross sectional view at position 14B—14B of the PTC heating element in FIG. 14A.

A sixteenth exemplary embodiment of the present invention is to be described with reference to FIGS. 14A, B. They are different from FIG. 13 in that moisture absorber 41 having openings are disposed on a PTC heating element so as to be in thermal contact therewith.

Moisture absorber 41 absorbs moisture in a case where water vapor pressure in air is same as that at adsorption equilibrium or higher. When temperature rises, it releases moisture and is regenerated. In this embodiment, the PTC heating element is used for regeneration of moisture absorber 41. Moisture absorber 41 absorbs moisture again in a regenerated state. Moisture released upon regeneration is reutilized for humidification. The PTC heating element is thus utilized as the regeneration heat source for a humidifying/dehumidifying device. The heat generation temperature of the PTC heating element is set to the regeneration temperature of moisture absorber 41 as the PTC heating element is utilized. With this constitution, since moisture absorber 41 is not overheated, the reliability of moisture absorber 41 is improved to provide humidifying/dehumidifying device of high safety. When such a humidifying/dehumidifying device is incorporated into a seat such as a car seat, in addition to the warming effect like in the thirteenth to fifteenth exemplary embodiments, steaming can be eliminated and the effect can be regenerated repetitively.

Moisture absorber 41 is obtained by causing a water absorptive resin to be absorbed in the form of a solution to the heat resistant non-woven fabric having openings, followed by drying thereby depositing the water absorptive resin to the non-woven fabric and then causing an aqueous solution of moisture absorbing agent to be absorbed to the water absorptive resin, followed by drying. The heat resistant non-woven fabric includes a material having a liquid absorbing property such as polyester. The moisture absorbing agent includes inorganic salts such as calcium chloride.

Generally, silica gel, zeolite, calcium chloride, etc. are known as the moisture absorbing agent. While the moisture absorbing amount of silica gel and zeolite is about 50% of the self weight at the maximum, that of the inorganic salts such as calcium chloride amounts to three times as much as the self weight at the maximum. Inorganic salts are not used so frequently irrespective of such high moisture absorbing amount, because they are liquefied by moisture absorption. However, when the inorganic salts are retained in the absorptive resin, they are retained in a solid state by the water absorptive resin even when liquefied by moisture absorption.

As the absorptive resin, any one of polyvinyl alcohol copolymer, polyurethane copolymer and polyalkylene oxide copolymer is used preferably. While acrylic acid copolymers used generally absorb water, they scarcely absorb aqueous solutions of electrolytes such as aqueous solutions of inorganic salts. The copolymers described above sufficiently absorb even the aqueous solutions of electrolytes. As the inorganic salts, lithium chloride and calcium chloride are preferred having strong moisture absorbing property. Lithium chloride and calcium chloride may also be used in combination. The combination of the water absorptive resin and the inorganic salts can provide a moisture absorption amount 1.5 times as much as the self weight.

In other embodiment where the PTC resistor has openings, it may have a constitution having moisture absorber 41 like this embodiment.

Seventeenth Exemplary Embodiment

Figure 15A:
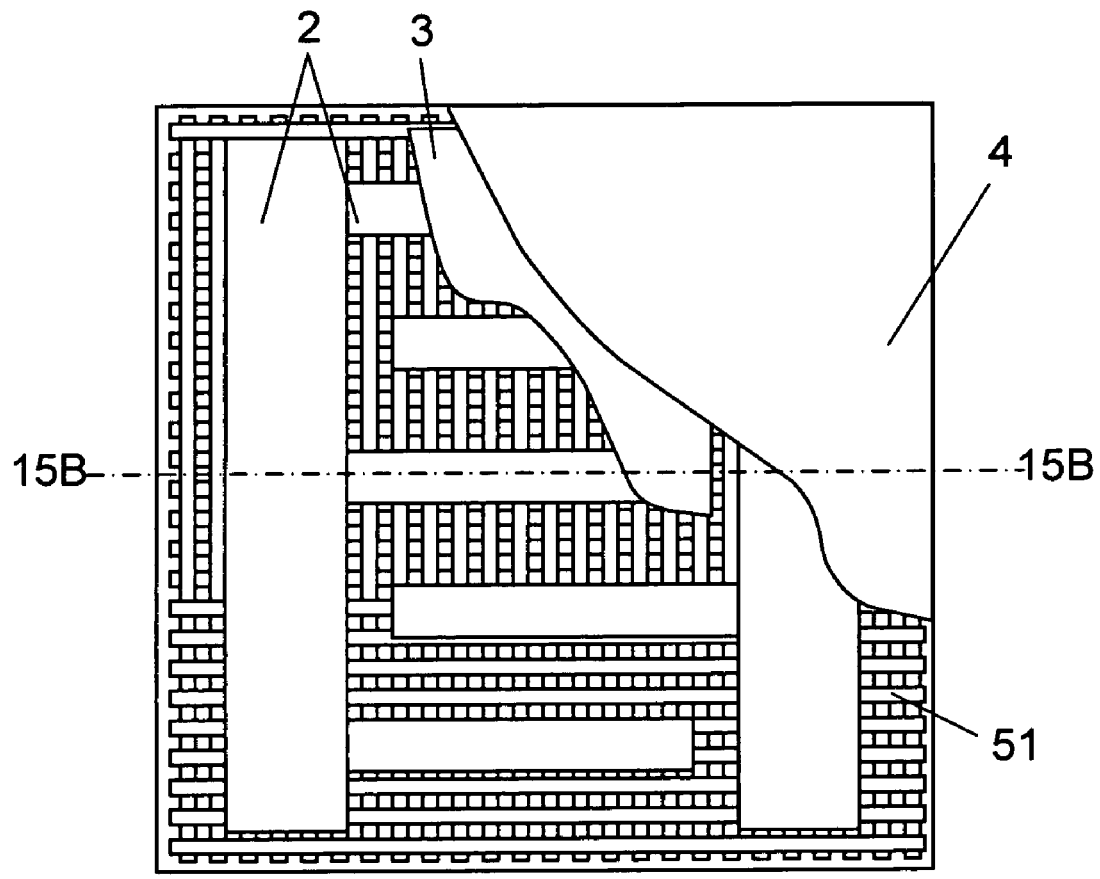
FIG. 15A is a partially cut-away plan view of a PTC heating element according to a seventeenth exemplary embodiment of the present invention.

FIGS. 15A and B are, respectively, a partially cut-away plan view and a cross sectional view showing a PTC heating element according to a seventeenth exemplary embodiment. Flexible mesh substrate (hereinafter as substrate) 51 has deformable openings, and an ink impregnating property. Substrate 51 consists of a material such as cotton or polyester in a mesh-like shape. Flexible support substrate (hereinafter as substrate) 52 has an ink impermeable property and bonded to substrate 51 by way of thermal fusion or adhesion. Substrate 52 has a function as a barrier material not permeating the ink and a function forming a skeleton of the PTC heating element. Substrate 51 and substrate 52 form a flexible substrate. Substrate 52 is formed by applying an ink-impermeable treatment by impregnating, for example, resin latex to a spun lace (non-woven fabric), a stretch material or foamed body such as foamed polyurethane. The spun lace has a small weight per unit area and has such a constitution that, even when an ink is impregnated, the ink is not secured in a plane-like shape but impregnated and retained along entanglements of fibers. The stretch material is formed by impregnating rubber latex into the spun lace and then squeezing and drying the same. Such substrate 51 and substrate 52 are combined, on which comb-like electrodes (hereinafter as electrodes) 2, PTC resistor (hereinafter as resistor) 3, and flexible cover material (hereinafter as cover material) 4 are constituted. Electrodes 2 and resistor 3 are identical with those in the first exemplary embodiment. Cover material 4 includes, like in the eighth exemplary embodiment, dried films such as of resin latex for example.

In this embodiment, substrate 52 is disposed below substrate 51 on which electrodes 2 and resistor 3 are printed. As the material for substrate 51, polyester or cotton, or a mixed spun product of them is used, and the materials themselves have the ink impregnating property although different in view of the extent. Polyester is oleophilic and cotton is hydrophilic. Through passage of ink is caused when substrate 51 is used alone. Substrate 52 prevents the through passage of ink to improve the screen printability. The main PTC characteristic is given by resistor 3 impregnated and retained in substrate 51.

Electrodes 2 and resistor 3 are mainly printed on substrate 51 corresponding to the mesh pattern thereof, to provide a state in which electrodes 2 and resistor 3 are properly immersed and retained in a three-dimensional manner within substrate 51. Accordingly, this can develop the flexibility like in the first exemplary embodiment, and change of the resistance value is minimized by the deformation of openings even in a state where elongation exerts on substrate 51. In a case where electrodes 2 and resistor 3 are printed in a planar shape as in the prior art, not only the flexibility cannot be developed but also the resistance value increases by one digit upon 5% deformation by elongation. On the contrary, in the PTC heating element according to this embodiment, change of the resistance value is kept within 30% upon 5% deformation by elongation.

The ink impermeable layer is formed by the spun lace non-woven fabric or the resin foam in which the ink is immersed and retained in a three dimensional manner as substrate 52. With the constitution as described above, the conductive paste and the PTC ink having passed through substrate 51 is retained not in a planar shape but being dispersed in a three dimensional manner. With the constitution as described above, the affection of the PTC ink impregnated and retained in substrate 52 on the PTC characteristics can be minimized and the flexibility can be maintained.

Now, the meaning for deformable openings in substrate 51 is to be described.

Lattice-like meshes in appearance include those in which fibers constituting the mesh are slackened, or those having three dimensional joining points. Such a mesh substrate tends to elongate by the deformation of openings. In addition, the elongation tendency has anisotropy.

In a case of applying a PTC heating element to a car seat, while elongation is required for the lateral direction of the seat, elongation is not required in the direction of the depth. This is because leather or fabric itself as the surface skin material for the seat has such a characteristic and, unless a PTC heating element has more flexibility, it causes the sense of discomfort such as stiffness upon sitting. Since the flexible PTC heating element of this embodiment uses substrate 51 having the property as described above, it can satisfy the condition. The shape for the opening is not limited to a square shape but may be any other shape such as a circular or elliptic shape. Among them, the shape of the opening is preferably a rhombic shape. With the constitution as described above, since apparent elongation is given by the deformation of the rhombic mesh with least stress on electrodes 2 and resistor 3 against deformation by elongation, stability for the resistance value is improved.

In this case, the paste and the ink for electrodes 2 and resistor 3 are deposited in a state being entangled to the periphery and the joining points of slackened fibers. Accordingly, joining between the materials constituting electrodes 2 or resistor 3 deposited to the fibers can be maintained easily upon deformation of the openings. That is, substrate 51 constituted with the spun lace non-woven fabric including, for example, cotton or mixed spun of cotton and polyester has gaps and slacks between the fibers. Electrodes 2 and resistor 3 printed and disposed there form printed matters not in a film-like shape but in a state with gaps or slacks. In a case where deformation by elongation exerts, electrodes 2 and resistor 3 per se do not elongate together with the mesh constitution but they elongate by deformation thereof.

The vibration durability and reliability against external degradation factors such as oxygen are favorable like those in the first exemplary embodiment.

Substrate 51 and substrate 52 are bonded each other by using a hot melting film including a material such as a polyurethane or polyester, an adhesive non-woven fabric (adhesion core), or adhesives. With the constitution as described above, substrate 51 and substrate 52 can be joined simply and conveniently. Since substrate 51 is in a mesh-like shape, it is naturally joined not entirely but partially even in a case of using the hot melting film. That is, since they have partial joining points corresponding to the mesh pattern of substrate 51, the flexibility is not spoiled. The flexibility is further enhanced in a case of partial joining using the adhesive non-woven fabric or adhesive material.

The ink impermeable layer of substrate 52 is prepared by forming the same in a film-like shape using a resin coating material, or attaching a hot melting film. With the constitution as described above, the ink impermeable layer can be formed specifically and easily. As the resin coating material, polyester resin, acrylonitrile butadiene rubber resin, polyester urethane resin, styrene butadiene rubber resin, ether type polyurethane resin and polyurethane resin are preferred. They have good compatibility with the conductive paste or the PTC ink and the inherent PTC characteristic of the PTC resistor can be developed. On the other hand, some resin coating materials such as acrylic or silicone type materials remarkably degrade the PTC characteristic.

A required minimum coating amount suffices for the conductive paste and the PTC ink. It is preferred to previously control the impregnation amount to substrate 51 by the method in the second or third exemplary embodiment.

Eighteenth Exemplary Embodiment

Figure 16:
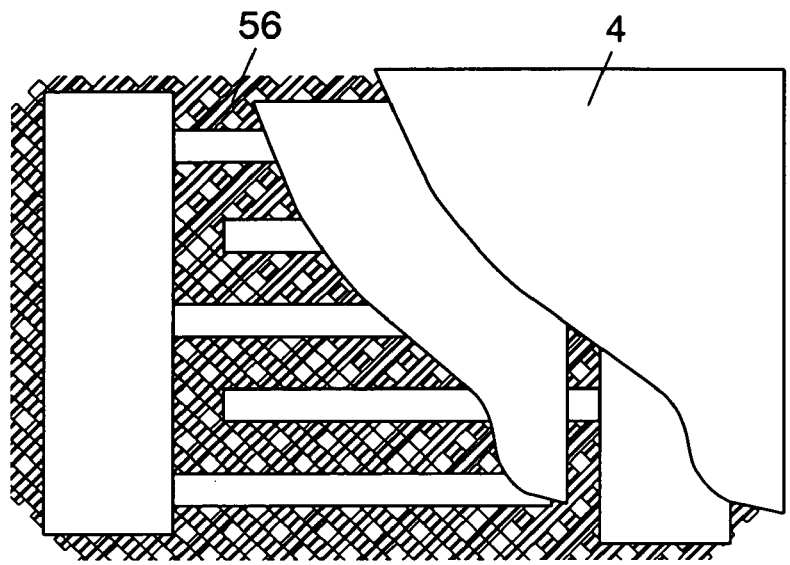
FIG. 16 is a partially cut-away plan view of a PTC heating element according to an eighteenth exemplary embodiment of the present invention.

FIG. 16 is a partially cut-away plan view of a PTC heating element according to an eighteenth exemplary embodiment of the present invention. Flexible mesh substrate (hereinafter as substrate) 56 is formed by bias-cutting (oblique-cutting) the orthogonal fiber type non-woven fabric made of polyester long fibers. Then, the opening has a rhombic shape. Other constitutions than described above are identical with those in the seventeenth exemplary embodiment. The orthogonal fiber type non-woven fabric used herein has micro square openings which is included in the category of the mesh-like substrate.

Even in a substrate with less elongation in the longitudinal and lateral directions such as the orthogonal fiber type non-woven fabric, elongation can be ensured by bias cutting as in this constitution. While the orthogonal fiber type non-woven fabric has micro square openings, the shape of the opening can be made rhombic by bias cutting. When lateral elongation exerts on the fabric, apparent elongation is developed by the deformation of substrate 56 without causing deformation by elongation to electrodes 2 and resistor 3 impregnated and retained therein. In a case of using a mesh substrate which is poor in the ink impregnating property and in which a three-dimensional network of electrodes 2 and resistors 3 is not formed, the network of electrodes 2 or resistor 3 is formed by clinging to the mesh substrate. In this case, change of the resistance value upon 5% deformation by elongation is suppressed within 30% by applying the constitution of substrate 56 of this embodiment. In a case of using the flexible mesh substrate having the ink impregnating property as described in the seventeenth exemplary embodiment, change of the resistance value is suppressed within about 10%.

Nineteenth Exemplary Embodiment

Figure 15B:
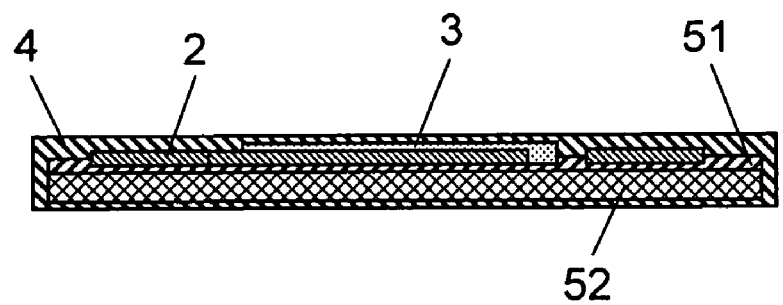
FIG. 15B is a cross sectional view at position 15B—15B of the PTC heating element in FIG. 15A.
Figure 17:
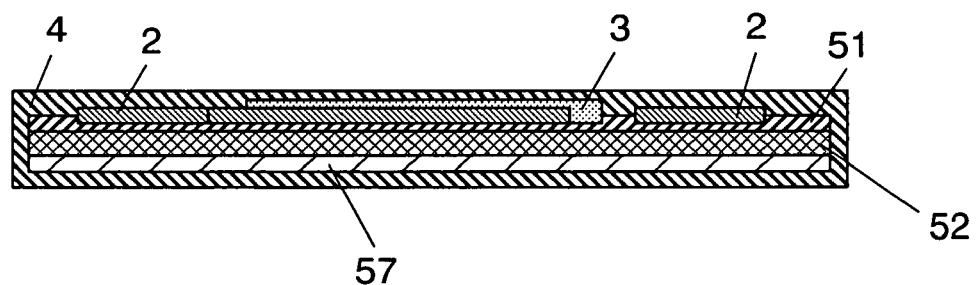
FIG. 17 is a cross sectional view of a PTC heating element according to a nineteenth exemplary embodiment of the present invention.

FIG. 17 is a cross sectional view for a PTC heating element according to a nineteenth exemplary embodiment of the present invention. The nineteenth exemplary embodiment is different from FIG. 15B of the seventeenth exemplary embodiment in that elongation control member 57 for controlling at least the elongation (longitudinal direction) of main electrodes of electrodes 2 is disposed below flexible support substrate 52. Elongation control member 57 is, for example, a knit-like resin net which functions as an elongation control portion. The main electrode for electrode 2 supplies a predetermined potential to branch electrodes and, in case where the potential for the portion changes, it is difficult to attain a uniform distribution of heat generation for the PTC heating element. It is necessary to minimize the change for the resistance value due to deformation by elongation of the main electrode. In a case where elongation control member 57 is constituted with a knit-like resin net, elongation in the longitudinal and the lateral directions is controlled depending on the way of knitting. This restricts elongation of the main electrode to 2% in the longitudinal direction and elongation of the branch electrode to 5% in the longitudinal direction, the resistance value is stabilized by using substrate 51, and insufficiency of the strength of substrate 51 is compensated to obtain a flexible PTC heating element which is flexible and has strong breaking strength. The values for the elongation as described above are practical guaranteed values of a leather in the longitudinal and the lateral directions and practical flexibility is ensured so long as the values are satisfied. Stitching fabrication of stitching threads may also be applied by replacing elongation control member 57 with a knit-like resin net.

As flexible cover material 4, a non-woven fabric impregnated with a resin coating material may be used. Specifically, a uniform coating film is prepared by coating a resin coating material after once adhering a non-woven fabric on electrodes 2 and resistor 3 by a hot melting material or adhesive material. With the constitution as described above, the coating amount of the resin coating material can be controlled by way of the non-woven fabric. Depending on the kind of the resin coating material, coating property to electrodes 2 and resistor 3 is sometimes poor to make it difficult to prepare a coating film. Also in such a case, a uniform coating film is obtained by interposing the non-woven fabric. As the kind of the resin coating material, those used for the flexible support substrate may be used alone or in combination.

Twentieth Exemplary Embodiment

Figure 18:
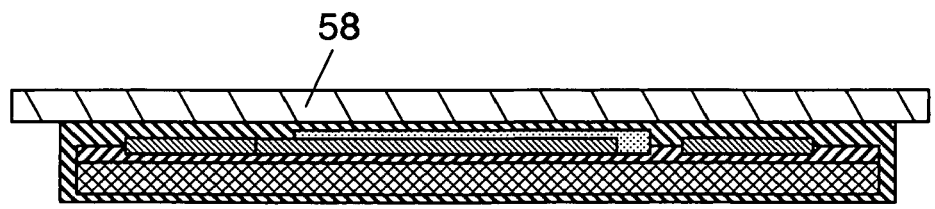
FIG. 18 is a cross sectional view of a PTC heating element according to a twentieth exemplary embodiment of the present invention.

FIG. 18 is a cross sectional view of a PTC heating element according to a twentieth exemplary embodiment of the present invention. This is different from that in FIG. 15B according to the seventeenth exemplary embodiment in that leather 58 is used as the flexible cover material. For example, electrodes 2 and resistor 3 are adhered directly to leather 58 by using an adhesive resin coating material. With the constitution as described above, resistor 3 and leather 58 are in thermally contact with each other and heat generated from resistor 3 is transmitted efficiently to leather 58. Accordingly, a flexible PTC heating element having a rapid heating property and an energy saving property is obtained. Since this can be handled integrally with leather 58, attachment to a seat or a handle is simplified.

Instead of leather 58, artificial leather can also be used.

Twenty-first Exemplary Embodiment

Figure 19A:
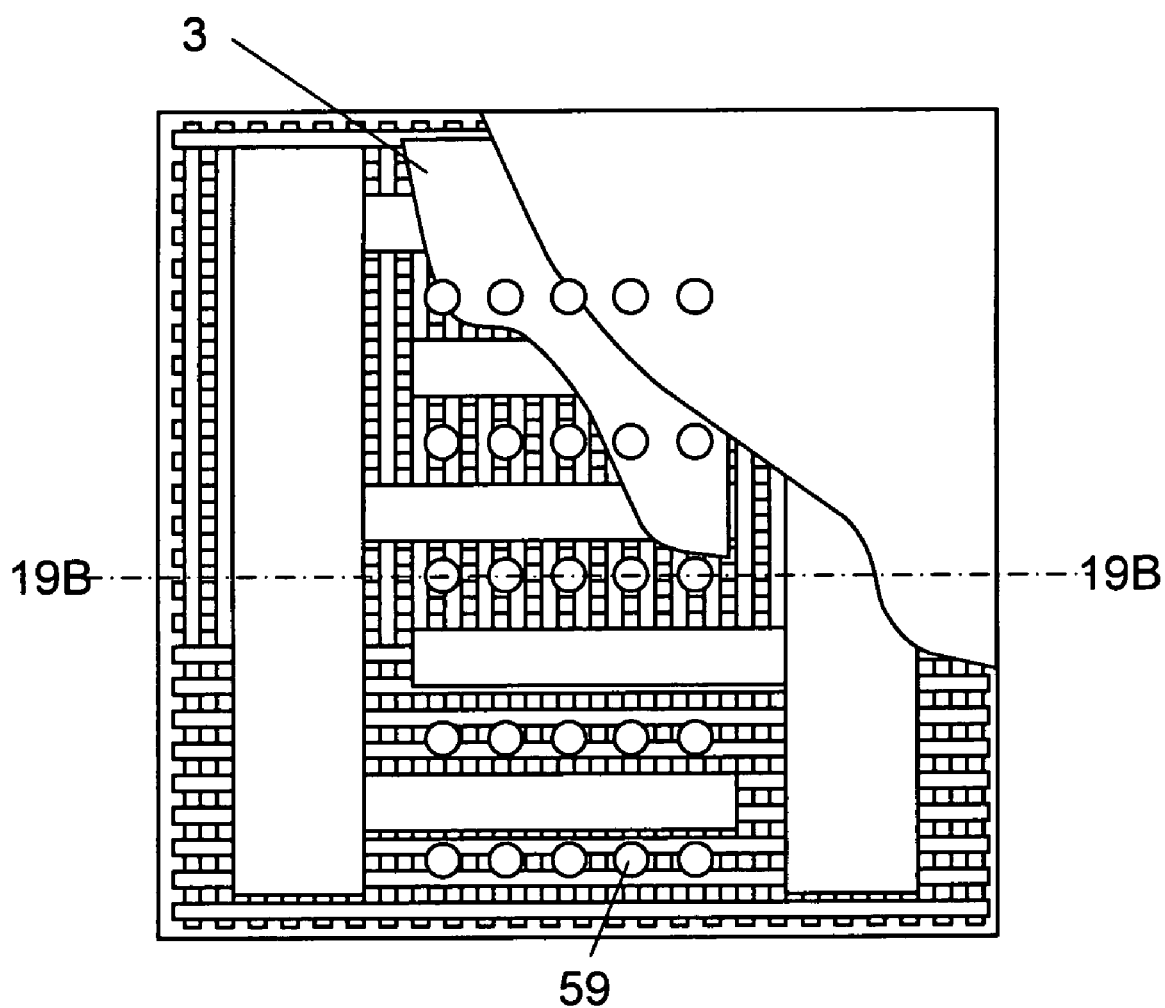
FIG. 19A is a partially cut-away plan view of a PTC heating element according to a twenty-first exemplary embodiment of the present invention.
Figure 19B:
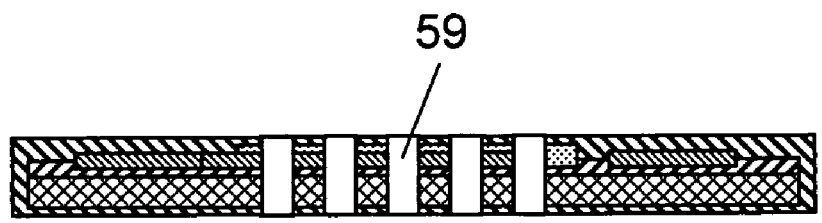
FIG. 19B is a cross sectional view at position 19B—19B of the PTC heating element in FIG. 19A.

FIGS. 19A, B are, respectively, a partially cut-away plan view and a cross sectional view showing a PTC heating element according to a twenty-first exemplary embodiment. This embodiment is different from the seventeenth exemplary embodiment in that through holes 59 are formed at a portion for disposing resistor 3. By the provision of through holes 59 to portions where resistor 3 is disposed, voltage concentration tending to occur in the portion for resistor 3 can be avoided. Since air can be transferred through through holes 59, steaming tending to occur in the case of use in close contact with a human body can be prevented to provide a flexible PTC heating element having comfortable feeling in use. The periphery for through holes 59 is covered, for example, with a resin coating material.

Twenty-second Exemplary Embodiment

Figure 20A:
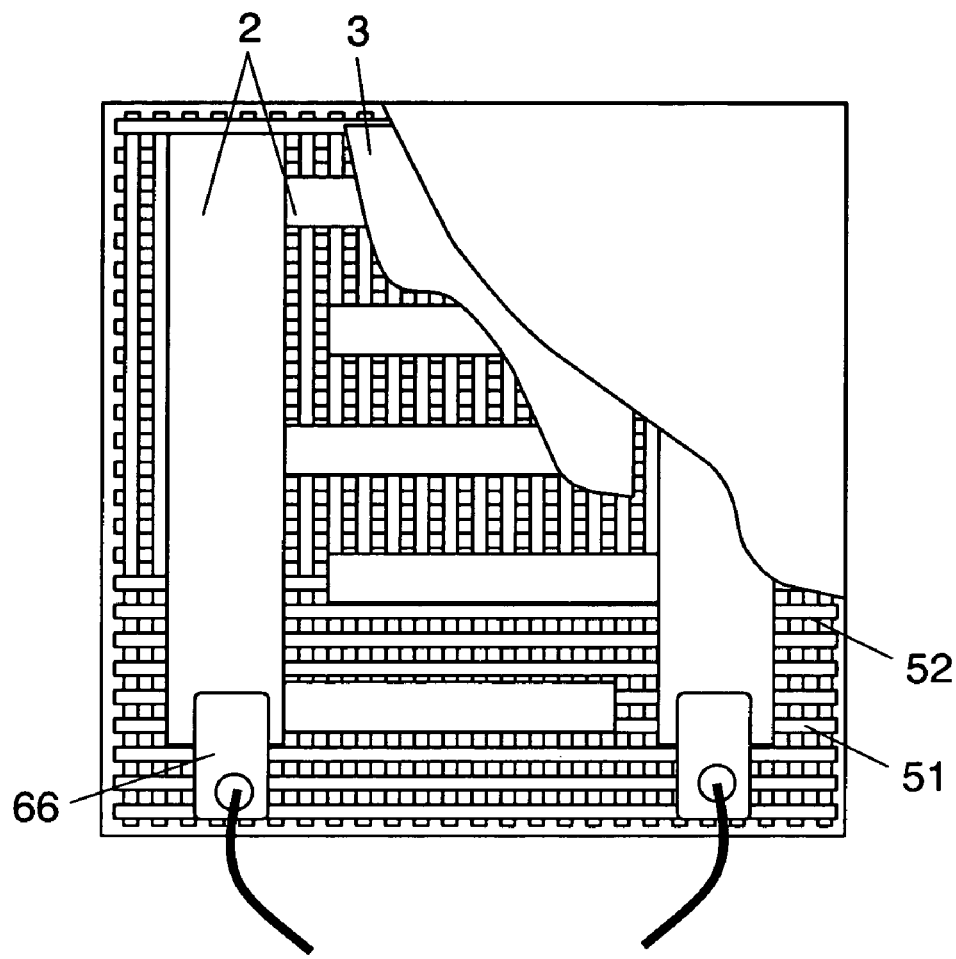
FIG. 20A is a partially cut-away plan view of a PTC heating element according to a twenty-second exemplary embodiment of the present invention.
Figure 20B:
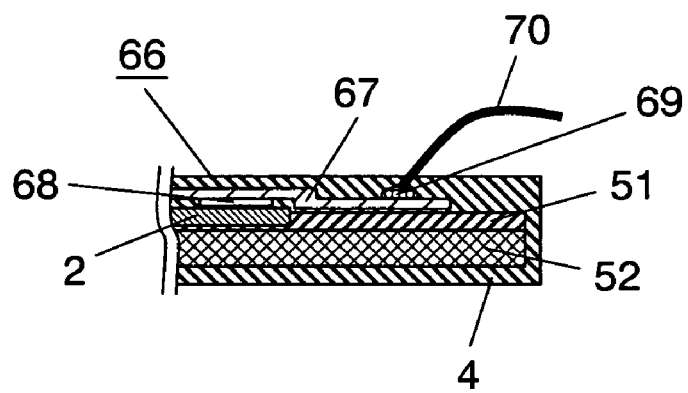
FIG. 20B is a cross sectional view for a main portion of the PTC heating element in FIG. 20A.

FIGS. 20A, B are, respectively, a partially cut-away plan view of a PTC heating element according to a twenty-second exemplary embodiment and a cross sectional view for a terminal portion. The PTC heating element according to this embodiment has a structure in which terminal portions 66 are disposed to the PTC heating element according to the seventeenth exemplary embodiment. Terminal portions 66 are electrically connected to comb-like electrodes (hereinafter as electrodes) 2 by adhering thin conductive material (hereinafter as thin material) 67 such as a copper foil with conductive adhesive (hereinafter as adhesive) 68. Lead wire 70 is connected at the other end of thin material 67 by solder 69. The periphery for terminal portions 66, electrodes 2 and PTC resistor (hereinafter as resistor) 3 is covered with flexible cover material 4. Since other constitutions are identical with those in the seventeenth exemplary embodiment, explanations therefor are to be omitted.

For example, a lead wire cannot be soldered directly to electrode 2 formed by drying a silver paste. Then, thin material 67 is once adhered with the end of electrode 2 by adhesive 68 to form terminal portion 66, and thin material 67 and lead wire 70 are soldered. In this way, electrode 2 and lead wire 70 are connected electrically. In this case, use of flexible mesh substrate (hereinafter as substrate) 51 provides a constitution in which electrode 2 is impregnated into substrate 51 and adhesive 68 is inserted into openings thereof. Adhesive 68 and thin material 67 are adhered along the surface. With the constitution as described above, electrode 2 and lead wire 70 are firmly connected electrically in addition to the effects described for the seventeenth exemplary embodiment. Preparation for terminal 66 can be conducted after preparation of electrodes 2 and resistor 3. Accordingly, in a case where printing is defective, it is no more necessary to prepare terminal portions 66 and the terminals can be prepared only to satisfactory products. Cover material 4 having a gas barrier property and waterproof property covers not only electrodes 2 and resistor 3 but also the entire periphery of terminal portions 66. This can reliably prevent contact with the external atmosphere such as oxygen, water vapor or moisture which are degradation factors, to obtain a highly reliable PTC heating element.

It is preferred to apply a roughening treatment on one surface of a copper foil used as thin material 67. This makes adhesion between adhesive 68 and thin material 67 more firm by way of the roughened surface. It is preferred to apply nickel plating to the surface opposite to the adhered surface. Nickel plating improves the corrosion resistance of thin material 67.

Terminal 66 in this embodiment is suitable in view of electrical connection when applied also to other embodiments.

Twenty-third Exemplary Embodiment

Figure 21:
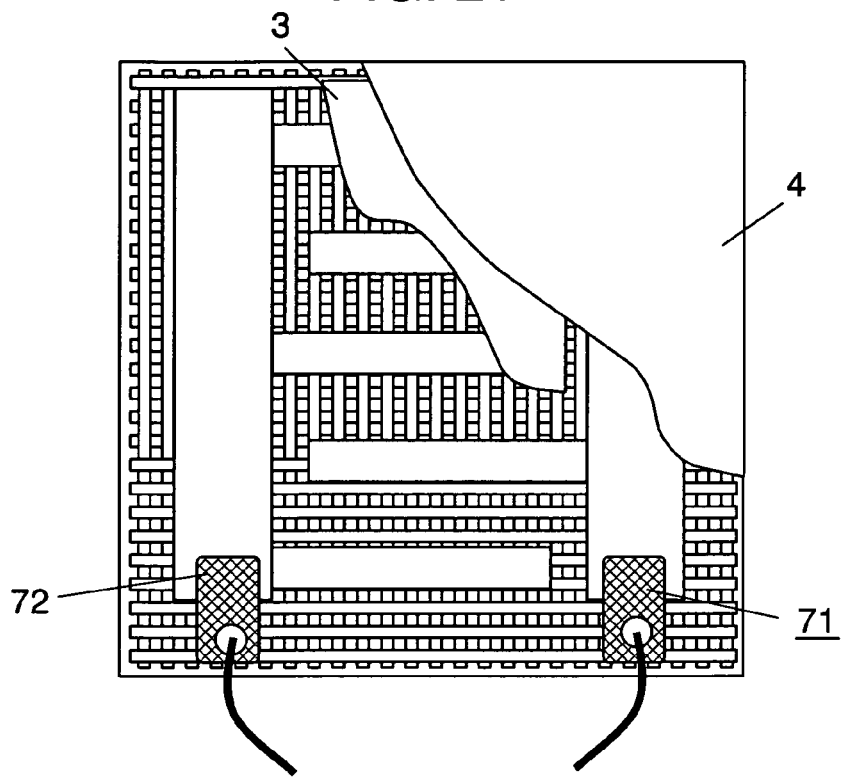
FIG. 21 is a partially cut-away plan view of a PTC heating element according to a twenty-third exemplary embodiment of the present invention.

FIG. 21 is a partially cut-away plan view of a PTC heating element according to a twenty-third exemplary embodiment of the present invention. For conductive thin material 71 of the PTC heating element according to this embodiment, an expanded metal of copper or nickel plated copper is used. Thin material 71 has through holes 72. Other basic constitutions than those described above are identical with those in the twenty-second exemplary embodiment.

With the constitution as described above, conductive adhesive 68 is present in through holes 72. Adhesive 68 and thin material 71 are thus integrated to have larger contact area. Therefore, the electrical connection is firm and the mechanical strength is improved.

For thin material 71, a copper foil mechanically formed with through holes may also be used instead of the expanded metal.

Twenty-fourth Exemplary Embodiment

Figure 22:
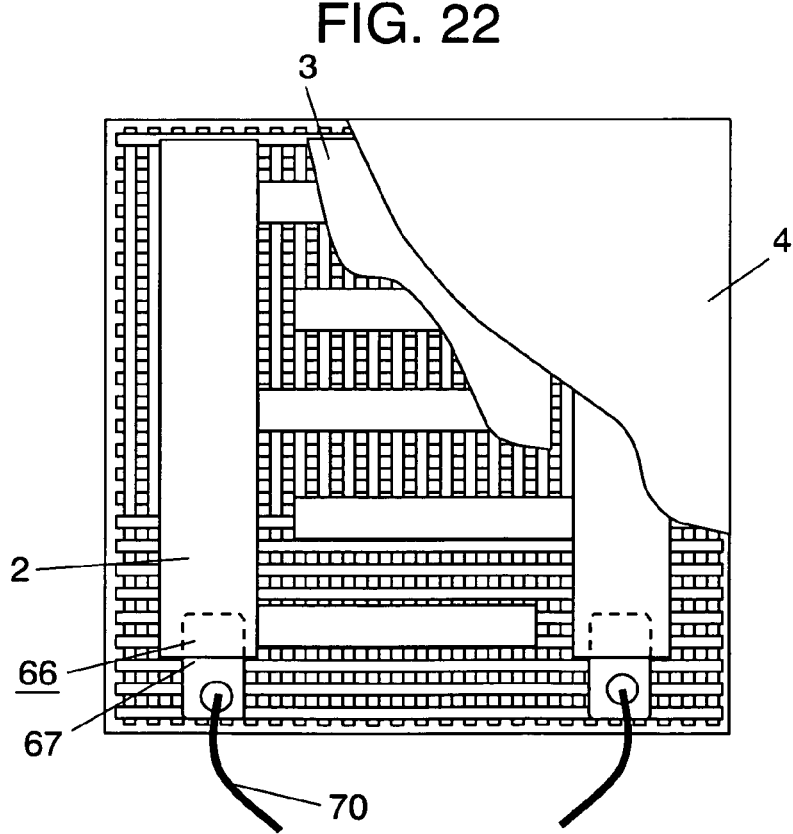
FIG. 22 is a partially cut-away plan view of a PTC heating element according to a twenty-fourth exemplary embodiment of the present invention.

FIG. 22 is a partially cut-away plan view of a PTC heating element according to a twenty-fourth exemplary embodiment of the present invention. In this embodiment, conductive thin materials 67 are previously fixed on substrate 51 by a joining method such as adhesion or stitching, electrodes 2 are printed so as to overlap the ends of thin materials 67 to electrically connect electrodes 2 and thin materials 67.

With the constitution as described above, electrode 2 and thin material 67 are connected electrically without using a conductive adhesive. Therefore, terminal portion 66 is prepared at a reduced cost. Other constitutions are identical with those in the twenty-second exemplary embodiment.

Thin material 67 may be put between an adhesive non-woven fabric having openings and substrate 51 and secured by thermal fusing, lead wire 70 may be attached by breaking through and melting the adhesive non-woven fabric and connected by soldering. With the constitution as described above, operability is improved upon preparation of terminal portion 66 by fixing thin material 67. In a case of using a coating material as a flexible cover material, a uniform coating film can be prepared. Those having a through hole as described in the twenty-third exemplary embodiment may also be used as thin material 67.

Twenty-fifth Exemplary Embodiment

Figure 23A:
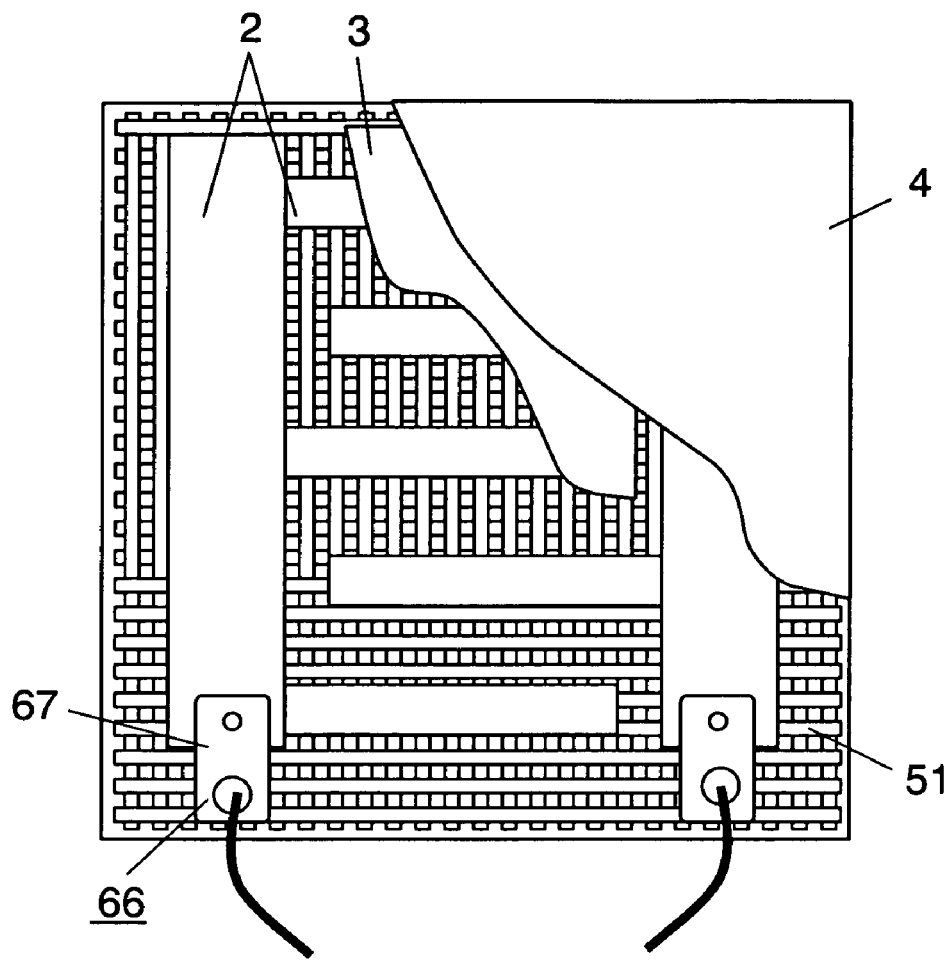
FIG. 23A is a partially cut-away plan view of a PTC heating element according to a twenty-fifth exemplary embodiment of the present invention.
Figure 23B:
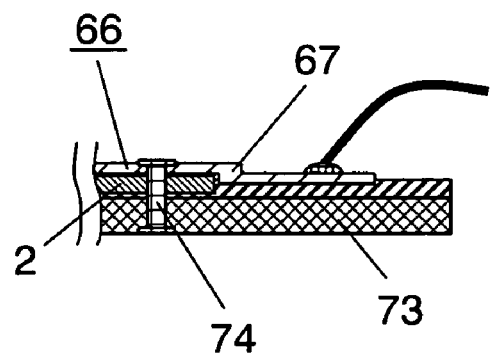
FIG. 23B is a cross sectional view at position 23B—23B of the PTC heating element in FIG. 23A.

FIGS. 23A, B are, respectively, a partially cut-away plan view and a cross sectional view showing a PTC heating element according to a twenty-fifth exemplary embodiment. In the drawings, a through hole penetrating from the surface of electrode 2 through flexible mesh substrate 51 and flexible support substrate (hereinafter as substrate) 73 is formed. Then, electrode 2 and thin material 67 are electrically connected through the through hole by squeezing with grommet 74. Substrate 73 is composed of a stretched material and has retractility. Other constitutions are identical with those in the twenty-second exemplary embodiment.

With the constitution as described above, since substrate 73 has a retractility, electrode 2 and thin material 67 are always kept in a press contact state to stabilize electrical connection.

Although not illustrated, the flexible cover material covers not only electrode 2 and resistor 3 but also the entire circumference for grommet 74.

Twenty-sixth Exemplary Embodiment

Figure 24:
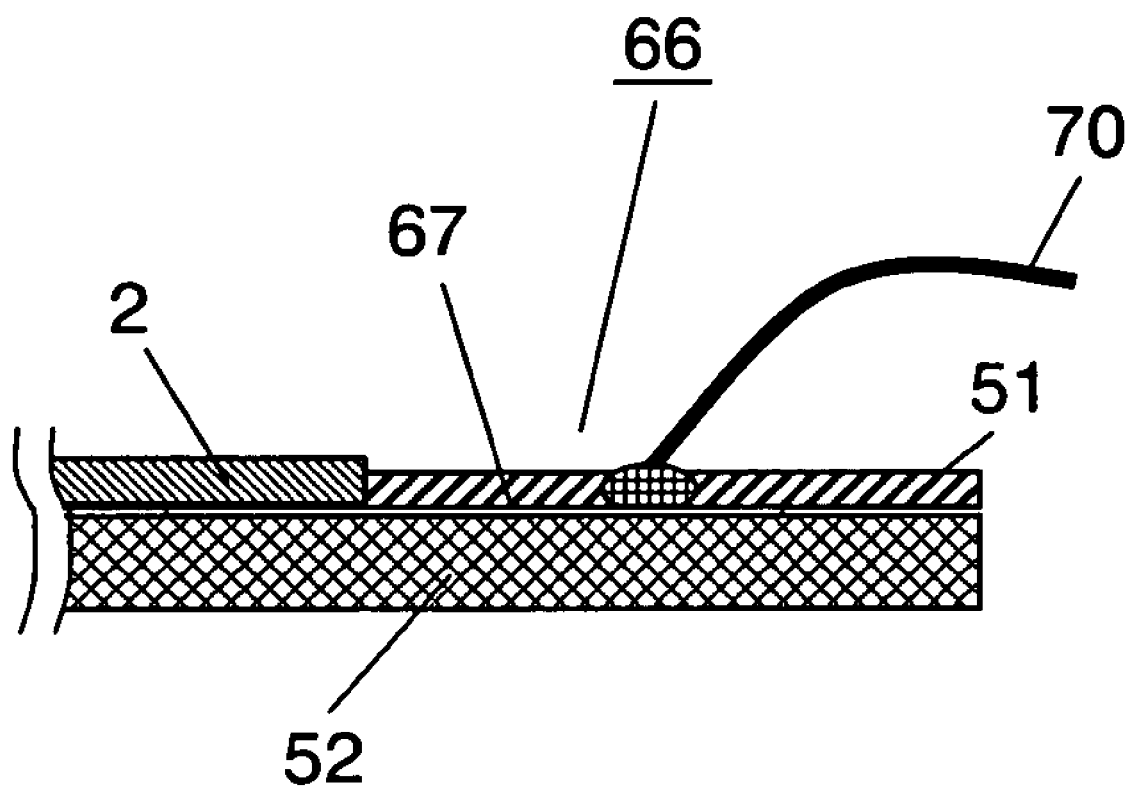
FIG. 24 is a cross sectional view for a main portion of a PTC heating element according to a twenty-sixth exemplary embodiment of the present invention.

FIG. 24 is a cross sectional view for a terminal portion of a PTC heating element according to a twenty-sixth exemplary embodiment of the present invention. In this embodiment, thin material 67 is previously interposed and secured between substrate 51 and substrate 52 at a position where the end of electrode 2 is printed upon joining of substrate 51 and substrate 52. Electrode 2 is prepared by adhering through the openings of substrate 51 to thin material 67. Lead wire 70 is attached breaking through and melting substrate 51 and connected by soldering. Other constitutions than described above are identical with those in the twenty-fourth exemplary embodiment.

With the constitution as described above, since fixing of thin material 67 is completed upon joining of substrate 51 and substrate 52 in the preparation of terminal portion 66, operability is improved. And firm and practical terminal portion 66 is prepared.

As thin material 67, any of a copper foil, a copper foil having through holes and an expanded metal may be used. Since more or less thickness thereof, if any, can be absorbed in substrate 52, stable screen printing can be conducted.

Twenty-seventh Exemplary Embodiment

Figure 25A:
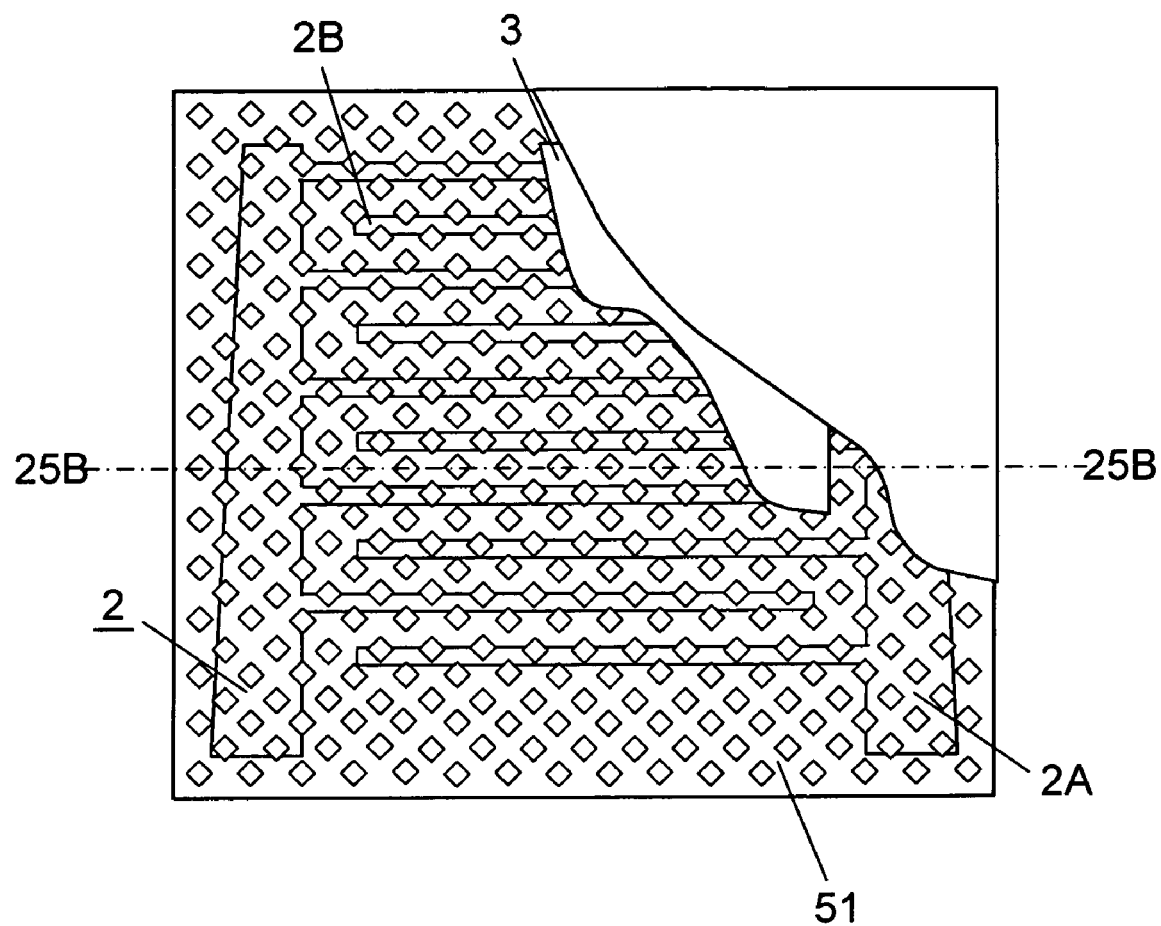
FIG. 25A is a partially cut-away plan view of a PTC heating element according to a twenty-seventh exemplary embodiment of the present invention.
Figure 25B:
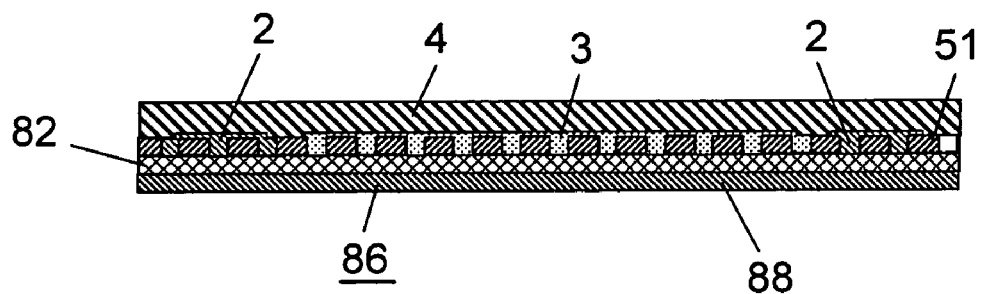
FIG. 25B is a cross sectional view at position 25B—25B of the PTC heating element in FIG. 25A.

FIGS. 25A, B are, respectively, a partially cut-away plan view and a cross sectional view showing a PTC heating element according to a twenty-seventh exemplary embodiment. The PTC heating element according to this embodiment has a structure in which elongation control member (hereinafter as member) 86 is disposed to the PTC heating element according to the seventeenth exemplary embodiment. Member 86 is joined to flexible mesh substrate (hereinafter as substrate) 51, for example, by adhesives to control elongation of substrate 51. It includes, for example, knit mesh 88. Flexible barrier material (hereinafter as barrier material) 82 is used instead of flexible support substrate 52. Barrier material 82 is joined to substrate 51 by thermal fusion or adhesion and impregnated and retained in the form of a film to substrate 51. In this embodiment, substrate 51 functions as a skeleton of the PTC heating element. Substrate 51 and substrate 82 form a flexible substrate. Barrier material 82 may be formed as a hot melting film to serve also as member 86, and knit mesh 88 and substrate 51 may be thermally fused. Since other constitutions are identical with those in the seventeenth exemplary embodiment, descriptions are to be omitted.

The PTC heating element according to this embodiment provides the same effect as described in the seventeenth exemplary embodiment. Since member 86 controls the elongation of substrate 51 printed with comb-like electrodes (hereinafter as electrodes) 2 or PTC resistor (hereinafter as resistor) 3 so as not to exceed predetermined elongation, a flexible PTC heating element of higher reliability can be obtained.

As barrier material 82, it is preferred to use a hot melting film having a heat resistance at least against the drying temperature or higher of the conductive paste for preparing electrode 2 and the PTC ink for preparing resistor 3. Barrier material 82 joins knit mesh 88 to substrate 51. Productivity is improved by conducting drying after screen printing of the conductive paste and the PTC ink each at 150° C. for 30 min. The materials can maintain the shape with no melting under such temperature condition. The hot melting film includes polyester and polyurethane resins, for example, an ether type or carboxyl type polyurethane resin having a melting point of from 170 to 180° C. Substrate 51 and knit mesh 88 are joined by barrier material 82 by interposing the polyurethane resin between substrate 51 and knit mesh 88 and then passing them between hot rolls. Barrier material 82 forms a film on substrate 51 and is in a state partially fused thermally and impregnated and retained in substrate 51. The polyurethane resin film is highly flexible to provide the PTC heating element with flexibility.

Barrier material 82 is not restricted to the hot melting film. Latexes of polyester resin, polyacryl resin, acrylonitrile butadiene rubber, polyester urethane resin, styrene butadiene rubber and polyurethane resin as the resin coating material may also be used alone or in combination. The latexes have flexibility and give no undesired effects on the PTC characteristic. They can control the ink impregnating property of substrate 51 more reliably. The hot melting film and the resin coating material may be used together.

As flexible cover material 4, it is preferred to use a multi-layered film in which a polyester hot melting film is disposed on the side in contact with electrodes 2 and resistor 3. For example, a multi-layered film in which a polyurethane resin or an ethylene vinyl acetate resin is laminated on a polyester hot melting film is used. This improves the flexibility, a gas barrier property for air or steams and waterproof property to obtain a flexible PTC resistor of high reliability. This constitution may be applied also to other embodiments.

It is preferred to previously attach a heat resistant hot melting film, for example, of polyurethane to a printing position for main electrodes 2A of electrodes 2 and then conduct printing.

Main electrode 2A is designed so as to keep a potential supplied to branch electrodes 2B to an equivalent potential level as much as possible. Meanwhile, there may be a possibility that the resistance value changes to some extent upon deformation by elongation and, as a result, this generates a potential gradient to cause uneven heat generation. Accordingly, when longer direction of main electrode 2A is arranged longitudinally and elongation is controlled within 3% by elongation control member 86 so as not to give deformation by elongation as less as possible, change of the resistance value is suppressed within 30%. It is considered that the value gives no practical problems. When a heat resistant hot melting film is attached to the printing position for main electrode 2A, change of the resistance value by repetitive elongation is suppressed within 15%. As described above, a PTC heating element with less change of resistance value due to deformation by elongation and having high long lasting reliability can be obtained. This constitution may also be applied to other embodiments.

Twenty-eighth Exemplary Embodiment

Figure 26:
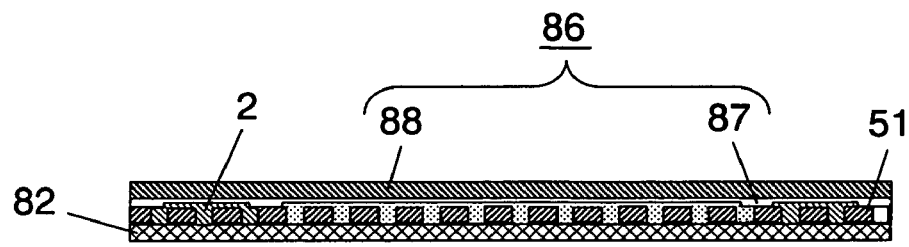
FIG. 26 is a cross sectional view of a PTC heating element according to a twenty-eighth exemplary embodiment of the present invention.

FIG. 26 is a cross sectional view of a PTC heating element according to a twenty-eighth exemplary embodiment of the present invention.

In the PTC heating element according to this embodiment, elongation control member (hereinafter as member) 86 includes joining member (hereinafter as member) 87 and knit mesh 88. Member 86 is disposed to substrate 51 on the side printed with electrodes 2 and resistor 3. Member 87 is composed, for example, of a hot melting film such as of polyester. Member 87 bonds knit mesh 88 to substrate 51. Other basic constitutions are identical with those in the twenty-seventh exemplary embodiment.

A knit mesh is a product formed by knitting polyester fibers into a predetermined pattern (knit product), which having various opening shapes can be prepared. A rhombic shape is preferred for use in member 86 in this embodiment in that elongation by displacement can be attained. While depending on the way of knitting, it has a function of controlling the elongation so as not to elongate beyond a predetermined elongation. On the other hand, a woven material is formed by extending fibers in the longitudinal direction and entangling wefts to the warps and various patterns can be prepared. Such a woven material often has cuboidal openings and concave/convex planes, and fibers per se often have fluffs. Accordingly, use of the woven material for substrate 51 involves a difficulty in view of screen printability. On the other hand, a knit mesh is formed by knitting fine resin fibers with no fluffs and exhibits flexibility due to sliding between each of the fibers. Since its surface has less unevenness and the ink impregnating property is poor compared with the woven material, this is excellent over the woven material in view of the screen printability. Accordingly, the knit mesh can also be served as substrate 51. In this case, the constitution is more simplified and the cost is reduced.

In the constitution as described above, member 86 joins knit mesh 88 to substrate 51 thereby adding a mechanical characteristic of knit mesh 88 to substrate 51. Knit mesh 88 with small elongation in the longitudinal direction and large elongation in the lateral direction may be selected. An adhesive material may also be used as member 87. In this case, use of knit mesh 88 maintains substrate 51 within the limit of elongation, and electrodes 2 and resistor 3 printed on substrate 51 are also maintained within a predetermined range of deformation by elongation.

Figure 27:
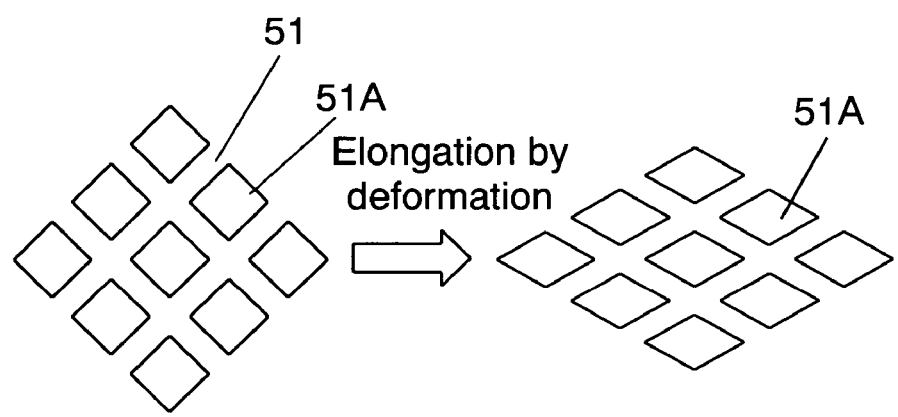
FIG. 27 is a modified image view of a PTC heating element according to the twenty-eighth exemplary embodiment of the present invention.

FIG. 27 shows an image for deformation of substrate 51. Since substrate 51 also has rhombic openings 51A, it elongates by deformation with no change of the inter-fiber distance by so much. Substrate 51 and knit mesh 88 have a constitution joined at restricted joining points. This can provide a PTC heating element of high flexibility.

Twenty-ninth Exemplary Embodiment

Figure 28:
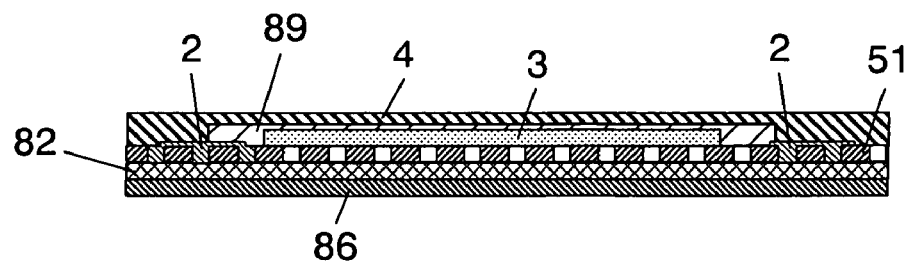
FIG. 28 is a cross sectional view of a PTC heating element according to a twenty-ninth exemplary embodiment of the present invention.

FIG. 28 is a cross sectional view of a PTC heating element according to a twenty-ninth exemplary embodiment of the present invention.

This embodiment has a constitution in which resistor 3 is printed on cushioning substrate (hereinafter as substrate) 89 having an ink impregnating property of dispersing and retaining the same in a non-film form and resistor 3 is brought into electrical contact with electrodes 2 disposed on substrate 51. Substrate 89 has a three dimensional fiber network constitution in which fiber entangling points are joined with a flexible resin such as an acryl resin or urethane resin. Resistor 3 printed on them is not in a film form but in a state dispersed in substrate 89 and impregnated and retained therein. Other constitutions are identical with those in the twenty-seventh exemplary embodiment.

In this constitution, since electrodes 2 and resistor 3 are disposed being impregnated into the separate substrates having flexibility, a heating element of high flexibility is obtained. Resistor 3 is in a state dispersed and retained in a non-film form in substrate 89 and has a high resistance value in this state. Accordingly, it scarcely generates heat even when it is in an electrical contact with electrodes 2. When a slight load is applied to compress substrate 89, resistor 3 takes a predetermined resistance value and generates heat by current supply. That is, when it is designed to have a predetermined resistance value at a predetermined load or more, it can be constituted so as to generate heat only at the portion applied with the load. Since resistor 3 has a self temperature control function, it is possible to design a heating element having a rapid heat generating property. So, a novel heating element having a rapid heating property and a load detection function together can be obtained. In a case of using it for a car seat heater, only the portion where a load is applied when a person sits thereon can generate heat to provide a heating element of excellent energy saving performance. Electrodes 2 may be formed as a metal foil and applied to a heater having a larger warming area, for example, an electric carpet. In this case, since it is possible to detect a human body and generate heat only from the portion, a heating element of higher energy saving performance can be provided.

Thirtieth Exemplary Embodiment

Figure 29A:
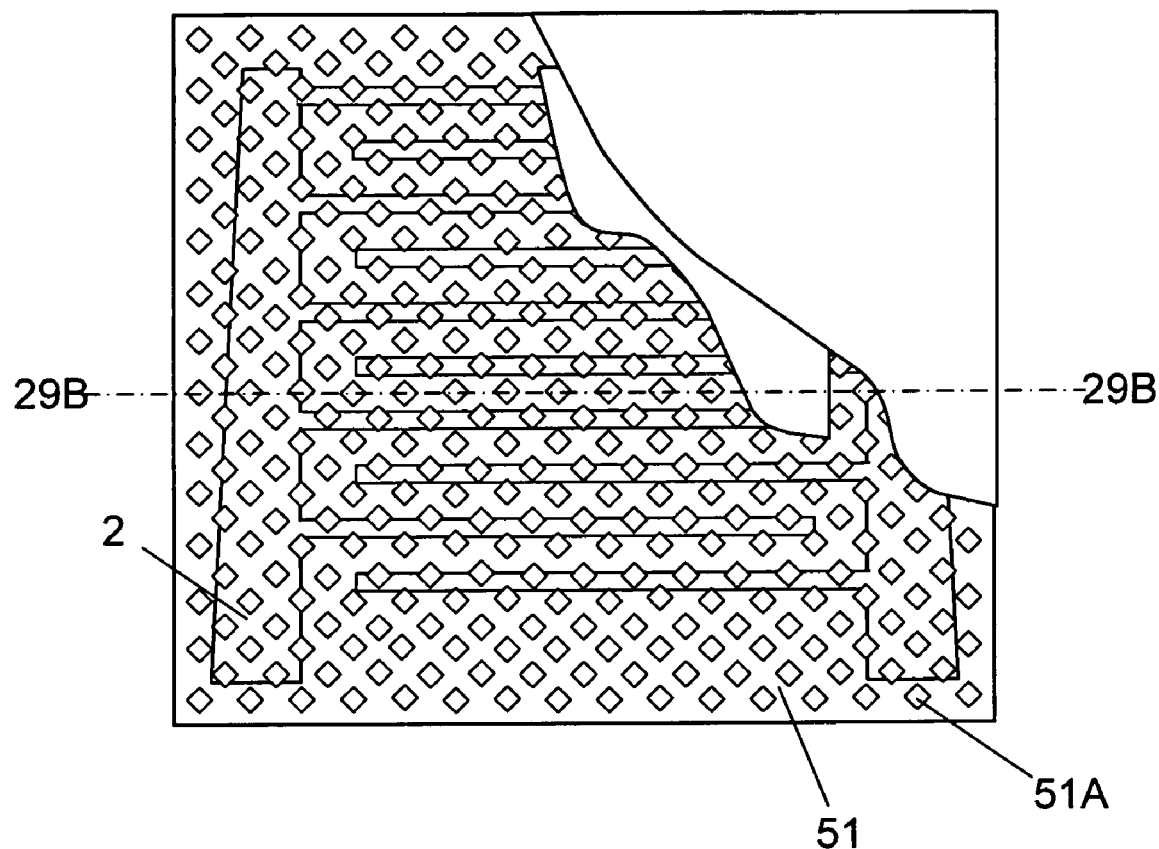
FIG. 29A is a partially cut-away plan view of a PTC heating element according to a thirtieth exemplary embodiment of the present invention.
Figure 29B:
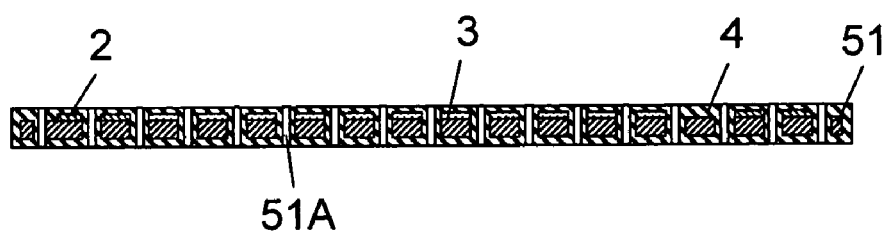
FIG. 29B is a cross sectional view at position 29B—29B of the PTC heating element in FIG. 29A.

FIGS. 29A, B are, respectively, a partially cut-away plan view and a cross sectional view showing a PTC heating element according to a thirtieth exemplary embodiment.

In this embodiment, substrate 51 is provided with electrodes 2 and resistor 3 impregnated and retained therein while leaving openings 51A. That is, electrodes 2 and resistor 3 are not disposed at openings 51A. Other constitutions are identical with those in the twenty-seventh exemplary embodiment.

With the constitution as described above, substrate 51, electrodes 2 and resistor 3 can be constituted integrally to obtain a heating element capable of attaining apparent elongation by deformation of substrate 51 and excellent in the stability of the resistance value for deformation by elongation. A novel heating element can be provided by leaving openings 51A in substrate 51 and using openings 51A, for example, as through holes for passing air.

As a specific manufacturing method, a hot melting film of water soluble or water disintegrating resin is thermally fused to substrate 51. Such a film, for example, includes polyvinyl alcohol or carboxymethyl cellulose. Electrodes 2 and resistor 3 are formed by printing on the back surface. They are immersed in water to remove the film and both surfaces are entirely covered with flexible cover material 4.

In a case of using a liquid coating material for cover material 4, it can provide a state of leaving openings 51A of substrate 51. With such a constitution, a heating element which is highly flexible and excellent in the stability of the resistance value can be obtained. In a case of using a flexible hot melting resin film for cover material 4, this can also be prepared with openings 51A being filled with a resin. Particularly, in a case of using a crystalline resin as the hot melting resin, a flexible PTC heating element having a novel PTC characteristic can be obtained by adding the thermal characteristic of the crystalline resin to the PTC characteristic of resistor 3.

All embodiments are preferred to have a constitution in which the longer side of the main electrode of electrode 2 is arranged longitudinally and the longer side of the branch electrode is arranged laterally. Still, it is preferred to design a flexible PTC heating element such that it has elongation from 0 to 3% in the longitudinal direction and elongation from 3 to 10% in the lateral direction under a load of 5 kgf, and a breaking strength of 15 kgf as a whole. This constitution can provide a heating element having a comfortable feeling of use when located inside a seat or the like on which a human body sits, that is, a satisfactory feeling of sitting and having high reliability.

In the embodiment provided with the flexible cover material, it is preferred to dispose the flexible cover material in a state of applying mechanical stress, for example, elongation. As described above, the flexible cover material is composed of a resin coating material or a hot melting film. By applying a mechanical stress to the flexible cover material as described above, the resistance value of the PTC heating element is lowered and the PTC characteristic is improved. Good PTC characteristic means that the degree of increment of the resistance value relative to temperature is large, for example, the ratio of the resistance value for 50° C. relative to that for 20° C. is high. Just after the preparation, orientations of the crystalline resin and conductive particles in the PTC resistor are at random. This is considered as a phenomenon attributable to the crystal orientation caused, when elongation is applied for instance, along the direction to develop a thermal characteristic inherent to the resin and also the orientation caused for the conductive particles due to crystal orientation. However, the state is released by heat cycle. In this case, the heating element once elongated resumes to its original size. For maintaining the improved state of the PTC characteristic, flexible cover material 4 as a resin is filled in openings 51A of substrate 51 formed by applying the mechanical stress. While substrate 51 tends to shrink, flexible cover material 4 inhibits this. Thus, mechanical stress remains as it is and a good PTC characteristic can be maintained. Improvement of the PTC characteristic has an important role for suppressing the heat generating temperature lower as a warming device situated near a human body in a case, for example, of a car seat.

As the flexible cover material, a polyester type hot melting film is excellent in view of long lasting reliability. For example, in a heat resistance test for evaluating the stability of the resistance value in an atmosphere at 80° C., resistance value tends to be lowered when the materials other than the hot melting film is used. On the contrary, in a case of using a polyester type material, while the resistance value shows a lowering tendency for a certain period of time, it transfers to a mode of increasing the resistance value after the period. The period is defined as a life ensuring period for the heating element. Due to the definition, the resistance value increases after life insurance. That is, this means that the safety is improved at the final period of the life for the heating element, which is an extremely important feature as the heating element.

In all embodiments, the heating element constitution is prepared by a screen printing method but a transfer method or ink jetting method may also be applied as the printing method. Different from the screen printing method, both methods can control the ink coating amount leading to the reduction of the cost or the improvement of the flexibility of the PTC heating element with the coating amount being kept at a required minimum. The variation of the resistance is suppressed.

Thirty-first Exemplary Embodiment

Figure 30A:
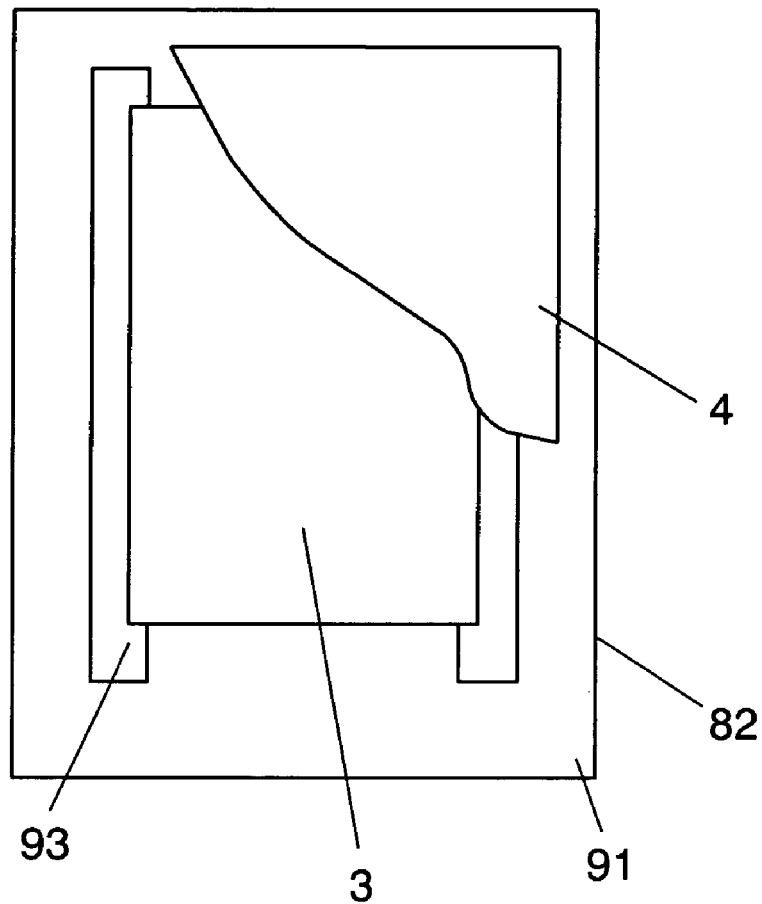
FIG. 30A is a partially cut-away plan view of a PTC heating element according to a thirty-first exemplary embodiment of the present invention.
Figure 30B:
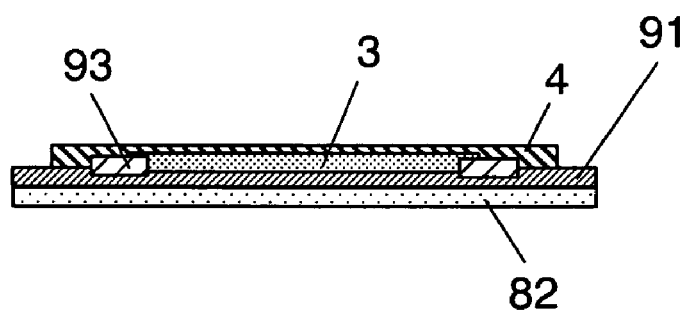
FIG. 30B is a cross sectional view at position 30B—30B of the PTC heating element in FIG. 30A.

FIGS. 30A, B are, respectively, a partially cut-away plan view and a cross sectional view of a PTC heating element according to a thirty-first exemplary embodiment.

Flexible fiber substrate (hereinafter as substrate) 91 has deformable openings and has an ink impregnating property. Substrate 91 is composed of a material such as cotton or polyester, which is spun bond mesh-like substrate formed by water jet entanglement. Flexible barrier material (hereinafter as barrier material) 82 is joined to substrate 91 by thermal fusion or adhesion and has ink impermeability. Electrodes 93 are disposed on both lateral ends on the shorter side of PTC resistor (hereinafter as resistor) 3. Substrate 91 and substrate 82 form a flexible substrate. Since other constitutions are identical with those in the seventeenth exemplary embodiment, explanations are to be omitted.

With the constitution as described above, the lower surface of substrate 91 is covered with barrier material 82 and has a constitution in which barrier material 82 is retained partially in substrate 91. Accordingly, through passage of an ink can be prevented during preparation of electrodes 93 and resistor 3, and the impregnating and coating amount of the ink is controlled. In a case of using a hot melting film having a melting point lower than the drying temperature of electrodes 93 and resistor 3 as barrier material 82, barrier material 82 is melted and retained in substrate 91 to provide a structure in which both of them are integrated.

Figure 31A:
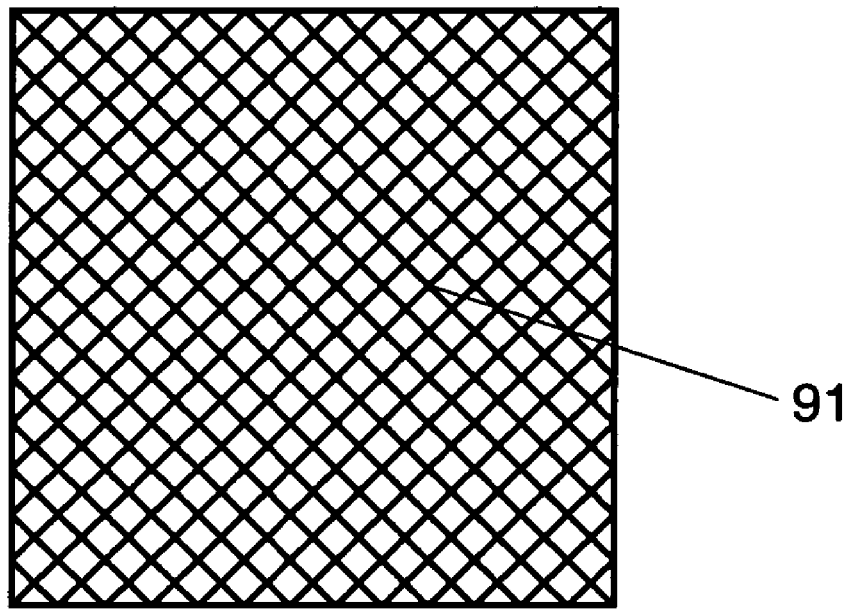
FIG. 31A is an image view for a flexible fiber substrate of a PTC heating element according to the thirty-first exemplary embodiment of the present invention.
Figure 31B:
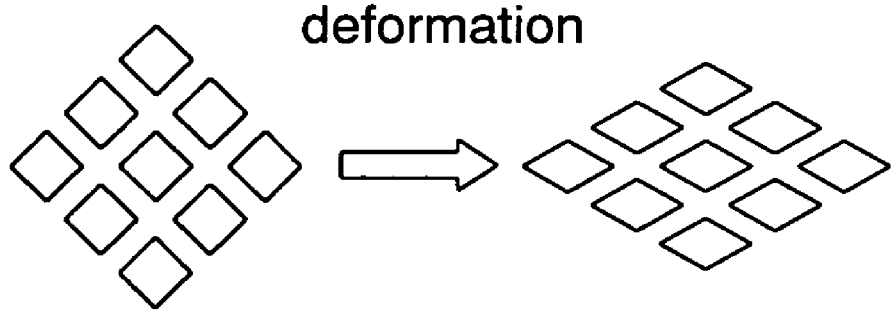
FIG. 31B is a view showing the state of change for the shape of openings upon deformation of the flexible fiber substrate in FIG. 31A.

Electrodes 93 and resistor 3 are printed on substrate 91 corresponding to the pattern for the openings thereof to provide a state in which electrodes 93 and resistor 3 are properly impregnated and retained in substrate 91. Therefore, the flexibility is maintained and, even in a case where elongation is applied to substrate 91, change of resistance value is minimized by the deformation of the openings. FIG. 31A shows openings in substrate 91 and FIG. 31B shows the change for the shape of openings upon deformation as images. This suppresses the change of the resistance value within 20% at 5% deformation by lateral elongation.

Substrate 91 in this embodiment is a spun bond non-woven fabric having cotton or polyester having openings formed by water jet entanglement. Substrate 91 has gaps and slacks between the fibers, and electrodes 93 and resistor 3 printed and disposed therein form a printed matter not in a film form but in a state also having gaps and slacks. Even in a state where deformation by elongation is applied, electrode 93 and resistor 3 per se do not elongate together with the mesh constitution but elongation is enabled by the deformation thereof. The effect is identical with that in the seventeenth exemplary embodiment.

Since the relation between the impregnation of the electrode and the resistor in substrate 91 and the vibration durability, etc. are identical with those in the seventeenth exemplary embodiment, explanations are to be omitted.

In this case, a mesh substrate having openings each of a certain size is used as substrate 91. However, an orthogonal fiber type non-woven fabric having small openings may also be used. While such a non-woven fabric lacks in elongation in the lateral direction as it is, lateral elongation can be ensured by appropriate bias (oblique) cutting. Provision of openings, whether they are large or small, to substrate 91 maintains the flexibility of substrate 91 by restricting the joining points with barrier material 82 to required minimum. Elongation is ensured by forming the shape of the opening into a deformable shape. Such a constitution provides a smooth printing surface suitable to printing and reliably retains barrier material 82. A rhombic shape is most preferred for the opening shape. Descriptions for the constitution are identical with those in the eighteenth exemplary embodiment.

Thirty-second Exemplary Embodiment

Figure 32A:
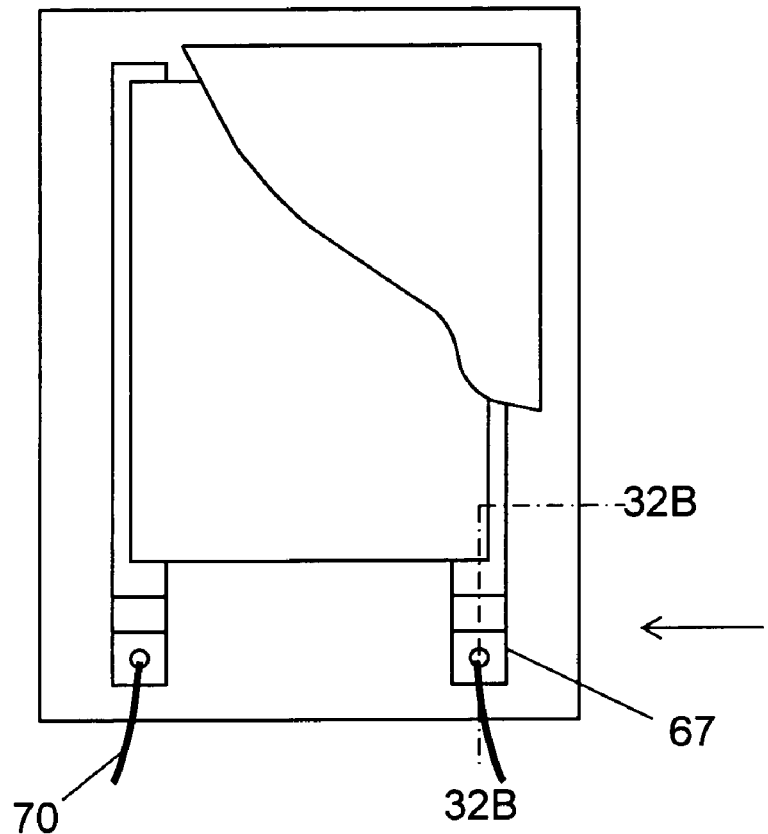
FIG. 32A is a partially cut-away plan view of a PTC heating element according to a thirty-second exemplary embodiment of the present invention.
Figure 32B:
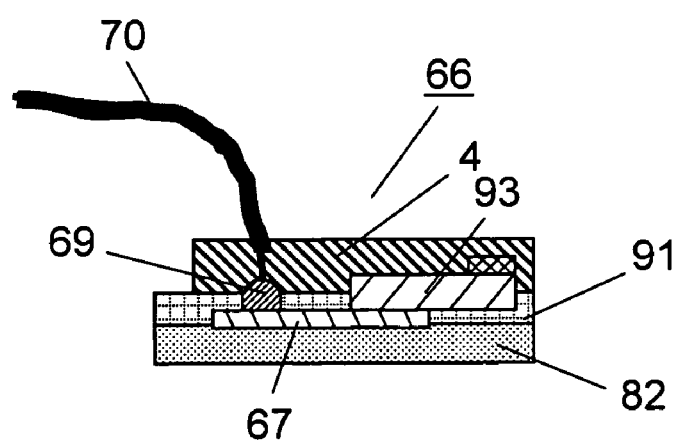
FIG. 32B is a cross sectional view at position 32B—32B of the PTC heating element in FIG. 32A.

FIGS. 32A, B are, respectively, a partially cut-away plan view of a PTC heating element according to a thirty-second exemplary embodiment of the invention, and a cross sectional view for a terminal portion taken along the direction of an arrow.

Conductive thin material (hereinafter as thin material) 67 is composed of a copper foil or the like applied with a roughening treatment for the surface in which solder 69 is previously joined to the end. Thin material 67 is interposed between substrate 91 and barrier material 82 when they are bonded to each other. The lower surface of thin material 67 is adhered and secured by barrier material 82. When a conductive paste for electrode 93 is printed from above in this state, the conductive paste passes through the openings present in substrate 91 and is in contact with thin material 67. In this way, electrode 93 and thin material 67 are connected electrically. Subsequently, they are covered with flexible cover material (hereinafter as cover material) 4 such as a polyester type hot melting film to prepare a heating element, after disposing resistor 3. For taking out lead wire 70, a solder is attached to the end of lead wire 70 and, while melting cover material 4 with a soldering iron, solder 69 on lower thin material 67 is melted by heating. This is immediately joined with lead wire 70. The joined portion is resin-molded (not illustrated in the drawing) to prepare terminal portion 66. Other basic constitutions are identical with those in the thirty-first exemplary embodiment.

This constitution has the same effect as that of the thirty-first exemplary embodiment. Thin material 67 forming terminal portion 66 is adhered and secured between substrate 91 and barrier material 82 with two surfaces, and its periphery is entirely shielded from external atmosphere. That is, it is covered at a lower portion with barrier material 82, at an upper portion with cover material 4, and at a periphery with a joined layer of barrier material 82 and cover material 4. This constitutes tough and highly reliable terminal 66. Electrode 93 and thin material 67 are electrically connected by way of openings in substrate 91. Since solder 69 is previously formed on thin material 67, thin material 67 is joined easily with lead wire 70.

Terminal 66 is constituted in the same manner as in the twenty-second to twenty-sixth exemplary embodiments.

Thirty-third Exemplary Embodiment

Figure 33A:
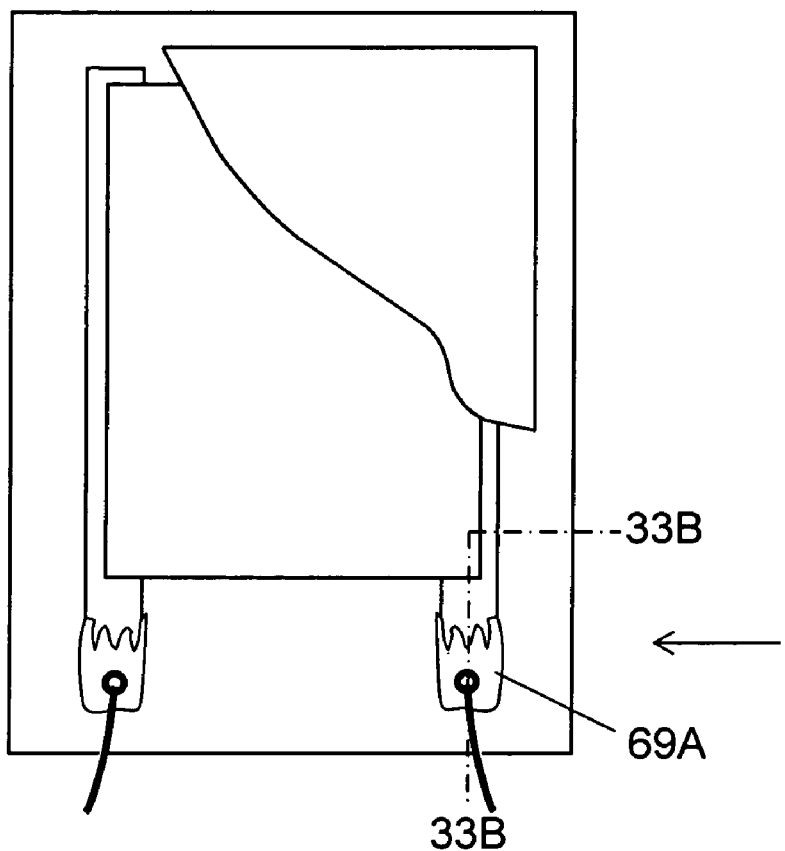
FIG. 33A is a partially cut-away plan view of a PTC heating element according to a thirty-third exemplary embodiment of the present invention.
Figure 33B:
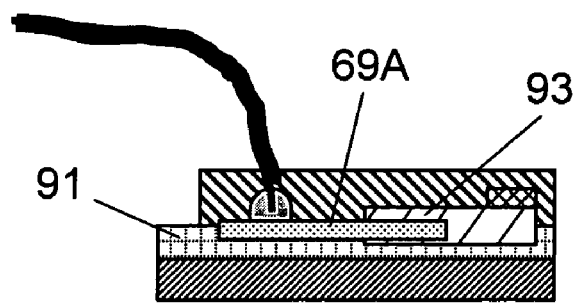
FIG. 33B is a cross sectional view at position 33B—33B of the PTC heating element in FIG. 33A.

FIGS. 33A, B are, respectively, a partially cut-away plan view of a PTC heating element according to a thirty-third exemplary embodiment of the present invention, and a cross sectional view for a terminal portion taken along the direction of an arrow.

In this embodiment, cream solder pattern (hereinafter as pattern) 69A is prepared by previously printing and drying a cream solder at a position where the end of electrode 93 is situated before preparing electrode 93 by printing. Then, electrodes 93 and resistor 3 are printed and dried and, further, flexible cover material 4 is disposed. The portion of pattern 69A overlapping with electrode 93 is made into a corrugated shape to increase joining points between both of them thereby making electrical connection reliable. Other constitutions are identical with those in the thirty-second exemplary embodiment.

In this construction, pattern 69A has a constitution impregnated properly into substrate 91 like electrode 93. Accordingly, pattern 69A is tough. Electrode 93 and pattern 69A, and pattern 69A and lead wire 70 are respectively connected electrically reliably. For improving the adhesion between substrate 91 and pattern 69A, a pretreatment such as an electroless plating treatment may also be applied previously to the printing surface for pattern 69A of substrate 91.

The cream solder pattern in this embodiment may be applied also to the twenty-second to twenty-sixth exemplary embodiments to obtain similar effects.

For barrier material 82, like in the twenty-seventh exemplary embodiment, a resin coating material may also be used in addition to the hot melting resin film. The hot melting resin film and the resin coating material may be used together.

As cover material 4, like in the twenty-seventh exemplary embodiment, in addition to the use of the polyester hot melting film, it may be used to constitute a multi-layered film as the innermost layer in contact with electrode 93 and resistor 3. It may be used being bonded with a separate non-woven fabric.

Thirty-fourth Exemplary Embodiment

Figure 34A:
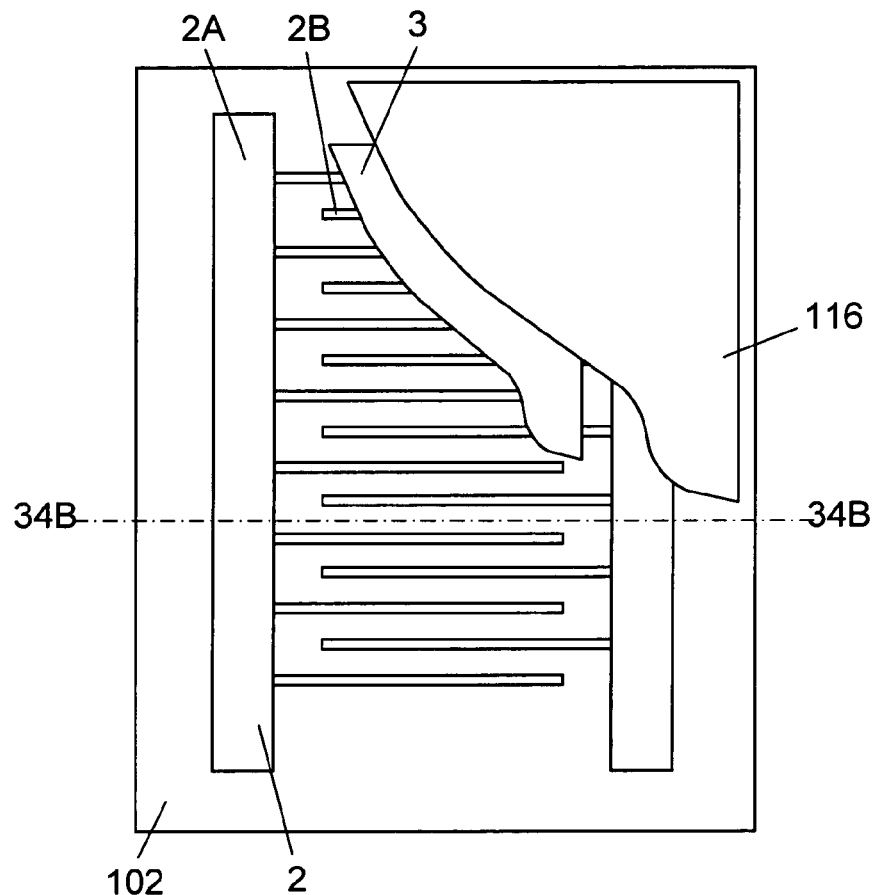
FIG. 34A is a partially cut-away plan view of a PTC heating element according to a thirty-fourth exemplary embodiment of the present invention.
Figure 34B:
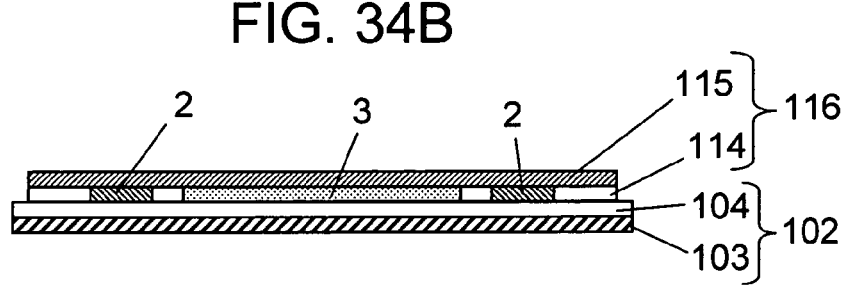
FIG. 34B is a cross sectional view at position 34B—34B of the PTC heating element in FIG. 34A.
Figure 34C:
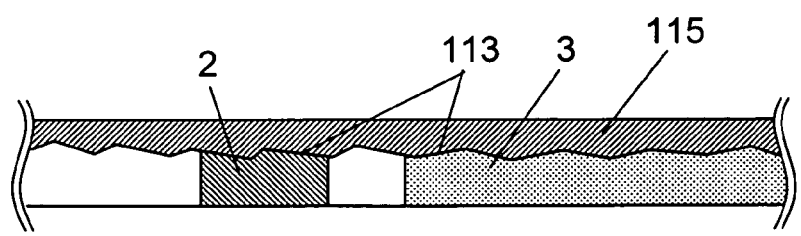
FIG. 34C is an enlarged cross sectional view for a main portion of FIG. 34B.

FIGS. 34A, B are, respectively, a partially cut-away plan view and a cross sectional view at position 34B—34B for a flexible PTC heating element according to a thirty-fourth exemplary embodiment. Flexible substrate (hereinafter as substrate) 102 has ink impermeability. Substrate 102 is formed by extruding film 104 consisting of a urethane resin (hereinafter as film) through a T-die and thermally fusing it simultaneously with fiber substrate (hereinafter as substrate) 103 including a non-woven fabric such as a spun lace or spun bond. The material for substrate 103 is polyester. A pair of comb electrodes (hereinafter as electrodes) 2 formed by printing and drying a conductive paste such as a silver paste are provided on the surface of film 104 of substrate 102. Each of electrodes 2 includes main electrode 2A and branch electrodes 2B and arranged such that the longitudinal direction of main electrode 2A is aligned with the roll take-up direction for substrate 103. PTC resistor (hereinafter as resistor) 3 is formed on branch electrodes 2B by printing and drying PTC ink. Flexible cover material (hereinafter as cover material) 116 covers electrodes 2 and resistor 3. Cover material 116 is formed by thermally fusing hot melting resin film (hereinafter as film) 114 and fiber substrate (hereinafter as substrate) 115 such as a knit having openings. Cover material 116 is thermally fused with electrodes 2, resistor 3 and film 104 of substrate 102 via film 114. That is, electrodes 2 and resistor 3 are completely covered at the periphery thereof. Since substrate 115 included in cover material 116 includes, for example, a knit having openings, its surface has unevenness. Accordingly, the surface of electrodes 2 and resistor 3 in contact with substrate 115 is transferred with unevenness of substrate 115 upon thermal fusion.

One of the conditions for the practical flexible PTC heating element is that it is flexible and ensured with elongation. An application example is a car seat heater used being incorporated in a car-mounted seat. The surface skin material for the car seat is constituted with a natural or synthetic leather or woven fabric with importance being attached to the design. A car seat heater is disposed so as to be in contact with the back surface of the surface skin material. For the car seat, it is extremely important that it gives no uncomfortable feeling for a person upon sitting in a state incorporated with the heater. The uncomfortable feeling includes herein, for example, stiffness and rugged feeling. For this purpose, it is necessary that the car seat heater can ensure flexibility and elongation equal with or superior to that of the surface skin material.

The natural skin at the highest ranking as the surface skin material tends to elongate in the lateral direction rather in the longitudinal direction. Specifically, elongation in the longitudinal direction is about 2% and elongation in the lateral direction is about 5% under a load of 7.5 kgf. The elongation characteristic is comparable with that of a human skin, so that the seat using the natural leather as the surface skin material is comfortable for a person to sit on. Synthetic leathers or fabrics imitate it.

In order to obtain the elongation characteristic in the longitudinal direction and the lateral direction described above with a PTC heating element, the form and the direction of arrangement of substrates 103, 115 are contrived in this embodiment.

Substrates 103, 115 used for substrate 102 and cover material 116 are composed of non-woven fabrics or knits and are generally manufactured in a roll form. Such substrate 103, 115 have a tensile strength to some extent in the take-up direction (hereinafter as longitudinal direction) in view of the requirement for fabrication. On the other hand, for the lateral direction perpendicular to the longitudinal direction, those profiled at dots by hot embossing such as spun bonds have a tensile strength about identical with that in the longitudinal direction. On the other hand, non-woven fabrics profiled by entanglement between fibers to each other by water jet entanglement such as spun laces have a significantly lower tensile strength in the lateral direction compared with the longitudinal direction.

Accordingly, by using the non-woven fabric or knit as substrate 103, 115, substrate 103, 115 function as an elongation control section in the longitudinal direction. They have a tensile strength to a certain extent in the roll take-up direction. Then, fiber substrates 103, 115 are arranged with the roll take-up direction being as the longitudinal direction. With the constitution as described above, it is possible to make the elongation characteristic with that in the longitudinal direction of the natural leather. When film 104 is bonded with substrate 103, film 104 functions as an elongation control portion in the lateral direction. That is, a non-woven fabric such as spun lace or a mesh-like non-woven fabric having openings is used for substrate 103. As film 104 is bonded, electrodes 2 and resistor 3 are formed and a cover material 116 is attached, the strength in the lateral direction increases gradually. With such a constitution, it is possible to make the elongation characteristic approximate to that of the natural leather in the lateral direction. That is, while the inherent elongation characteristic of substrate 103 in the longitudinal direction is utilized as it is, elongation in the lateral direction is restricted to some extent mainly by bonding film 104 and film 114.

Concave/convex portions 113 formed to electrodes 2 and resistor 3 on the surface in contact with substrate 115 in this embodiment function as elongation deformation portions. That is, in this embodiment, electrodes 2 and resistor 3 prepared by coating are not coated uniformly but coated unevenly to provide a distribution and form a deformable state. This minimizes the mechanical stress such as elongation applied on electrodes 2 and resistor 3 to attain elongation by the deformation of themselves. "Unevenly" means such that a not-printed portion is formed, the coating amount is increased locally, or the coating surface is formed from a planar surface to an uneven surface. In this embodiment, the coating surface of electrodes 2 and resistor 3 is formed as an uneven surface to provide an elongation margin compared with that in a planer surface to enhance the stability of the resistance value of resistor 3 against elongation.

It is also important that electrodes 2 and resistor 3 per se have flexibility and are adapted to cope with elongation. In this embodiment, it is preferred that electrodes 2 and resistor 3 contain a resin or an elastomer. That is, a resin and an elastomer are added as a binder to conductive paste or PTC ink forming them. As the conductive paste, it is preferred to use a silver paste blended with a carbon black. The binder contained in the conductive paste is preferably a saturated co-polyester resin with low crystallinity. This has a higher flexibility compared with the polyester of usual crystallinity. While the specific resistivity of conductive paste is usually increased by blending a carbon black, using silver not with a powdery shape but with a partially flaky shape or a short fiber shape prevents the specific resistivity from increase, and increase of the specific resistivity value is suppressed even when elongation is applied. Migration of silver caused by a DC current power supply is suppressed by mixing a carbon black.

The PTC ink as described above is prepared as below. At first, the carbon black is kneaded with an ethylene vinyl acetate copolymer (EVA) as a crystalline resin and chemically crosslinked. A pulverized product obtained by pulverizing them is formed into an ink under crushing by three rolls using a modified acrylonitrile-butadiene rubber (modified NBR) as a binder and using an organic high boiling point solvent as a liquid diluent. By kneading and then chemically crosslinking the carbon black with EVA, bonding force between EVA and carbon black is enhanced. Affinity of the pulverized product with the binder such as the modified NBR is enhanced. Accordingly, resistor 3 in a state where the crosslinked and pulverized products of EVA and carbon black are bonded with the binder is formed. Since the binder and the crosslinked and pulverized product have flexibility, resistor 3 is highly flexible. Since thermal expansion of both EVA as the crystalline resin and the binder are reflected to the PTC characteristic, resistor 3 has high PTC characteristic.

As substrate 102, substrate 103 bonded with film 104 is used. As cover material 116, substrate 115 in which hot melting film 114 thermally fusing with substrate 103 or film 104 is bonded is used. With such a constitution, film 104 prevents through passage of the ink during printing and enhances the strength of substrate 103, 115. Electrodes 2 and resistor 3 between film 104 and film 115 are shielded and sealed from atmospheric air. Accordingly, a PTC heating element of long lasting high reliability is obtained. Specifically, as the material for film 104, one of urethane, olefin and styrene thermoplastic elastomers or a mixture thereof is used. Since such elastomer elongates easily, it provides the PTC heating element with the flexibility. It is preferably to blend adhesive resin with the elastomer or to laminate the elastomer and adhesive resin. This enhances the adhesion between electrodes 2, resistor 3 and substrate 102 to improve the vibration durability. Olefin resin is used as the material for film 114. The adhesive resin is, for example, polyethylene introduced with a polar group such as a carboxyl group or ether group in the molecule skeleton. Specifically, this is maleic anhydride modified or acrylic acid modified polyethylene or thermoplastic elastomer modified in the same manner.

In this embodiment, while substrates 103 and 115 that function as the elongation control portion are disposed, only one of them may be used.

Thirty-fifth Exemplary Embodiment

Figure 35A:
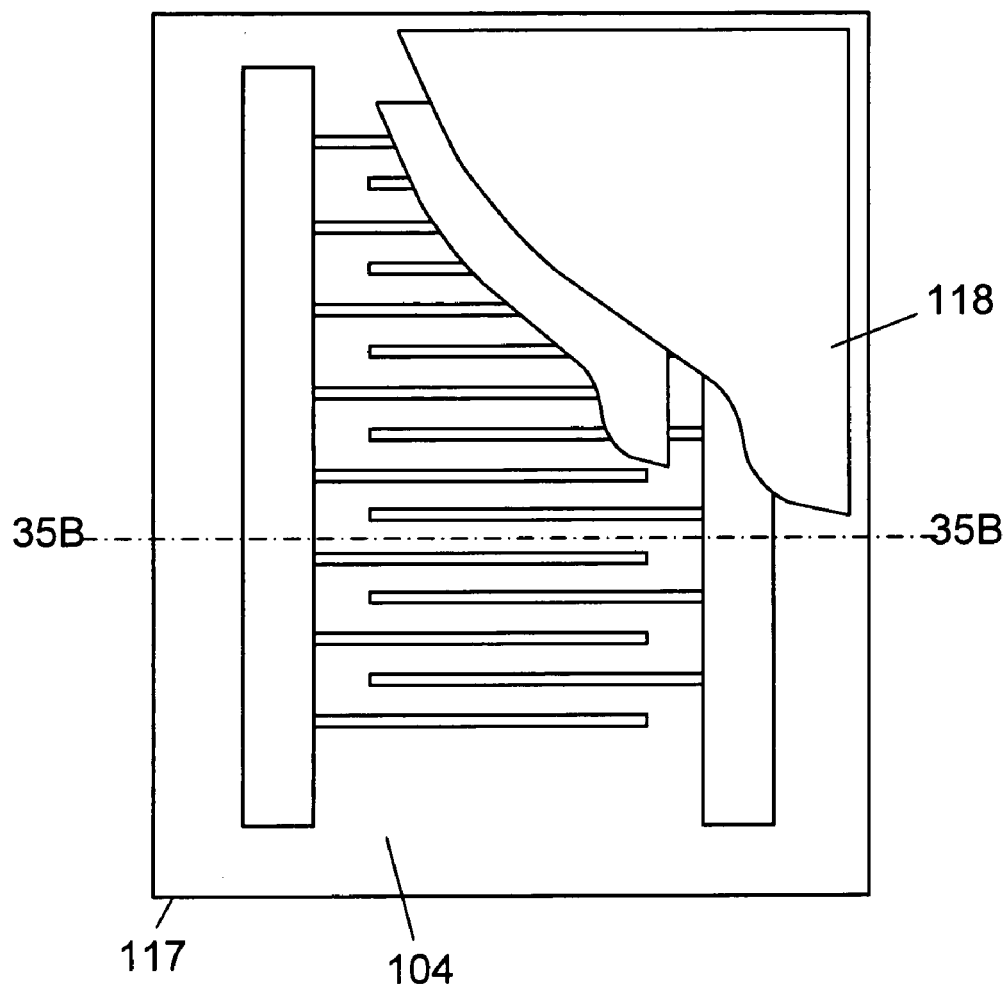
FIG. 35A is a partially cut-away plan view of a PTC heating element according to a thirty-fifth exemplary embodiment of the present invention.
Figure 35B:
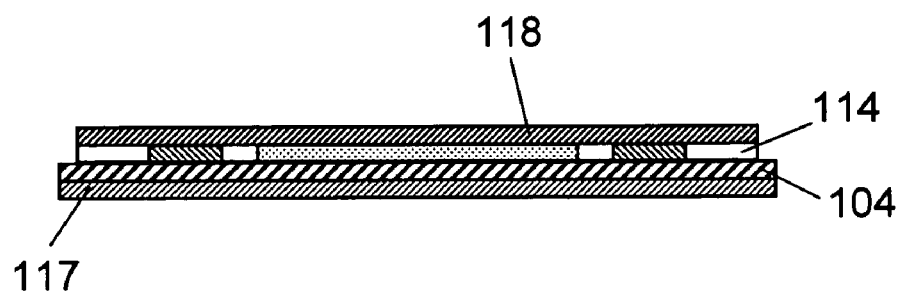
FIG. 35B is a cross sectional view at position 35B—35B of the PTC heating element in FIG. 35A.

FIGS. 35A, B are, respectively, a partially cut-away plan view and across sectional view at position 35B—35B showing a flexible PTC heating element according to a thirty-fifth exemplary embodiment. The PTC heating element of this embodiment has substrates 117, 118 instead of substrate 103, 115. Other constitutions are identical with those in the thirty-fourth exemplary embodiment. Substrate 117 is a fiber substrate including a non-woven fabric or a knit A with a load of 7.5 kgf or less for 5% lateral elongation and with a load of 7.5 kgf or more for 5% longitudinal elongation. Substrate 118 is a fiber substrate including a knit B with a load of 7.5 kgf or less for 5% elongation both in longitudinal and lateral directions and that has rhombic openings and elongating by deformation.

Substrate 117 including a non-woven fabric or the knit A tending to elongate more in the lateral direction rather than in the longitudinal direction with elongation characteristic in the longitudinal direction and film 104 or film 114 elongating both in the longitudinal and lateral directions are bonded to each other. This can attain the elongation characteristic comparable with or superior to that of the natural leather by utilizing the elongation characteristic in the lateral direction of substrate 118 including, for example, the knit B with lower elongation both in the longitudinal and lateral directions. While substrate 118 exhibits the flexibility by the displacement between fibers to each other, this utilizes the lowering of the elongation characteristic by restricting the displacement by bonding film 114. Thus, a practical PTC heating element with no uncomfortable feeling upon sitting and resistant to repetitive loads, for example, as a car seat heater is obtained as a heating element in contact with a human body.

Particularly, in a case of using a spun lace non-woven fabric having openings, or a non-woven fabric in which continuous fibers are arranged in the longitudinal direction as the non-woven fabric of substrate 117, control for elongation in the longitudinal direction is made more reliable. The non-woven fabric in which continuous fibers are arranged in the longitudinal direction is, for example, a spun bond formed by thermally fusing longitudinally continuous fibers to a spun lace by heat embossing. In the spun lace non-woven fabric, short fibers are oriented in the longitudinal direction and entangled to each other and this has a property tending to elongate inherently both in the lateral direction and the longitudinal direction. When film 104 is bonded thereto, short fibers oriented in the longitudinal direction are joined and behave as if they are continuous fibers. Accordingly, elongation strength in the longitudinal direction increases abruptly making it less elongating. On the other hand, in the spun bond non-woven fabric, short fibers are oriented at random and the short fibers are thermally fused to each other at dots by heat. This is referred to as heat embossing. In this state, even when film 104 is bonded, it does not provide a reinforcing effect comparable with that of the spun lace. In such a case, the strength in the longitudinal direction can be increased reliably by arranging continuous fibers in the longitudinal direction. Such a constitution may be applied to the spun lace to provide higher reinforcing effect. This may be applicable also to substrate 118.

In this embodiment, fiber substrate 117 is used on the side of substrate 102 and substrate 118 is used on the side of cover material 116, but they may also be used in an arrangement opposite thereto.

When main electrode 2A of electrode 2 is arranged in the longitudinal direction of substrate 117 constituting substrate 102, the reliability of main electrode 2A is enhanced to obtain a PTC heating element with less heat generation distribution.

Thirty-sixth Exemplary Embodiment

Figure 36:
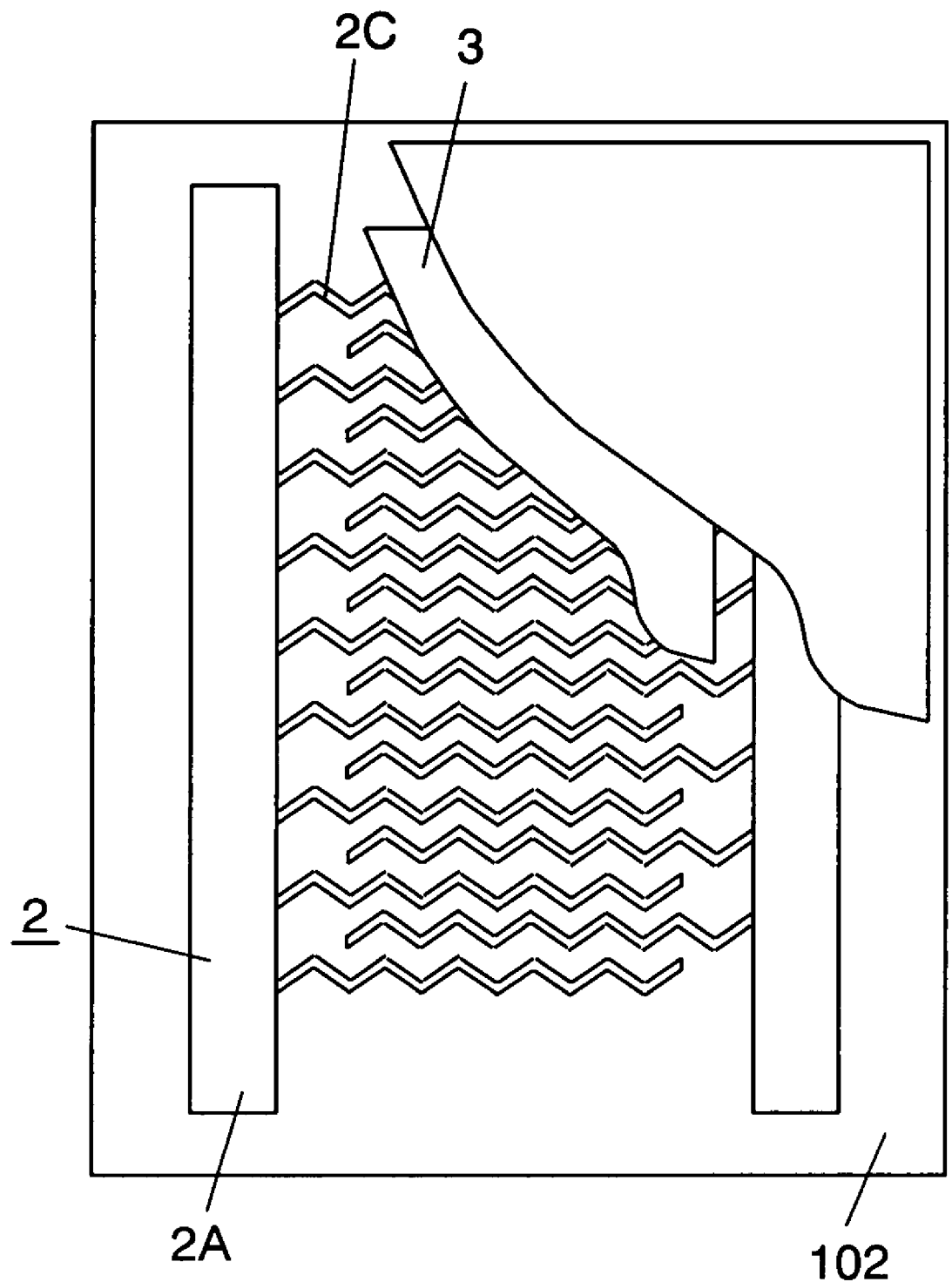
FIG. 36 is a partially cut-away plan view of a PTC heating element according to a thirty-sixth exemplary embodiment of the present invention.

FIG. 36 is a partially cut-away plan view showing the constitution of a PTC heating element according to a thirty-sixth exemplary embodiment of the present invention. In this embodiment, each of branch electrodes 2C has a corrugating shape in the lateral direction of substrate 102. Other constitutions are identical with those in the thirty-fourth exemplary embodiment. Branch electrodes 2C can be prepared easily by making the pattern for screen printing as corrugating shapes.

With such a constitution, the conduction path in PTC resistor 3 between each of branch electrodes 2C of the corrugating shape is in the oblique direction of one side of the rhombic shape that is the shortest route. Accordingly, the stress load to elongation is reduced in the conduction path, that is, the heat generation path. Branch electrode 2C of the corrugating shape has a margin to elongation till the corrugating shape becomes linear relative to the elongation. Accordingly, application of the stress to the elongation of branch electrode 2C is retarded. That is, branch electrodes 2C of the corrugating shape function as the elongation deformation portion. When this is designed within the range of the lateral elongation of substrate 102 or cover material 116, reliability of branch electrodes 2C to elongation is improved greatly.

Similar effects can be obtained also by applying the constitution of branch electrodes 2C to other embodiments.

Thirty-seventh Exemplary Embodiment

Figure 37:
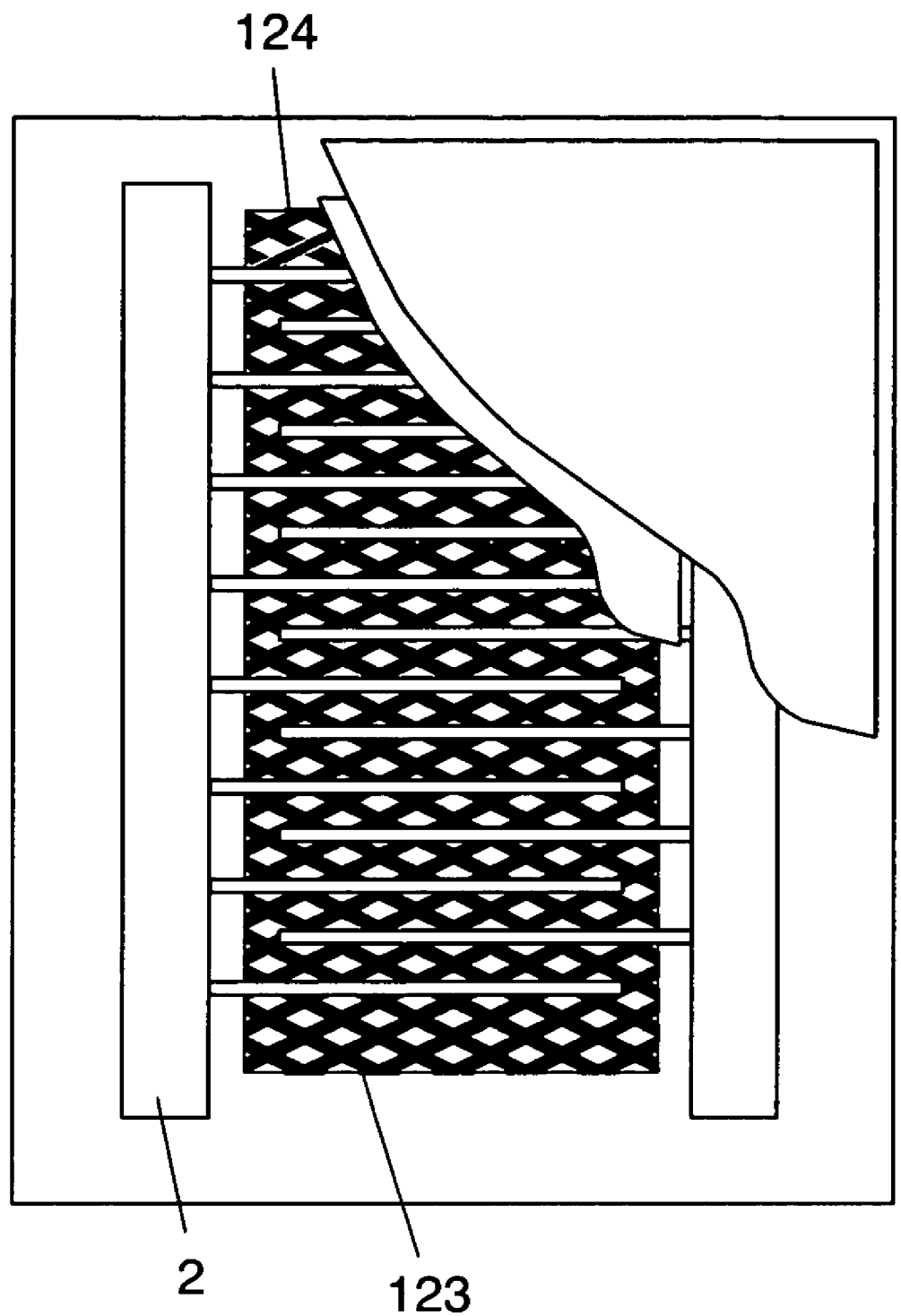
FIG. 37 is a partially cut-away plan view of a PTC heating element according to a thirty-seventh exemplary embodiment of the present invention.

FIG. 37 is a partially cut-away plan view showing the constitution of a PTC heating element according to a thirty-seventh exemplary embodiment of the present invention. In this embodiment, PTC resistor fiber body (hereinafter as fiber body) 124 obtained by previously impregnating and drying a PTC ink to fiber material 123 having openings and capable of deformation is provided instead of PTC resistor 3. Electrodes 2 and fiber body 124 are electrically connected as described below. At first, not yet cured electrodes 2 in a state where the solvent in the conductive paste forming electrodes 2 is evaporated and dried and fiber body 124 are in contact with each other. Then, they are pressed while hot to cure electrodes 2 and thermally fuse fiber body 124. Other constitutions are identical with those in the thirty-fourth exemplary embodiment.

With the constitution as described above, since elongation can be attained by the deformation of fiber body 124 in a state where the stress scarcely exerts on the PTC resistor itself, change of the resistance value relative to the elongation is minimized. That is, fiber body 124 functions as an elongation deformation portion.

Instead of fiber body 124, the printing pattern for the PTC resistor may be formed as a mesh pattern having a rhombic uncoated portion. Also with the constitution, the PTC heating element having the same stability for the resistance value as described above can be obtained.

Thirty-eighth Exemplary Embodiment

Figure 38A:
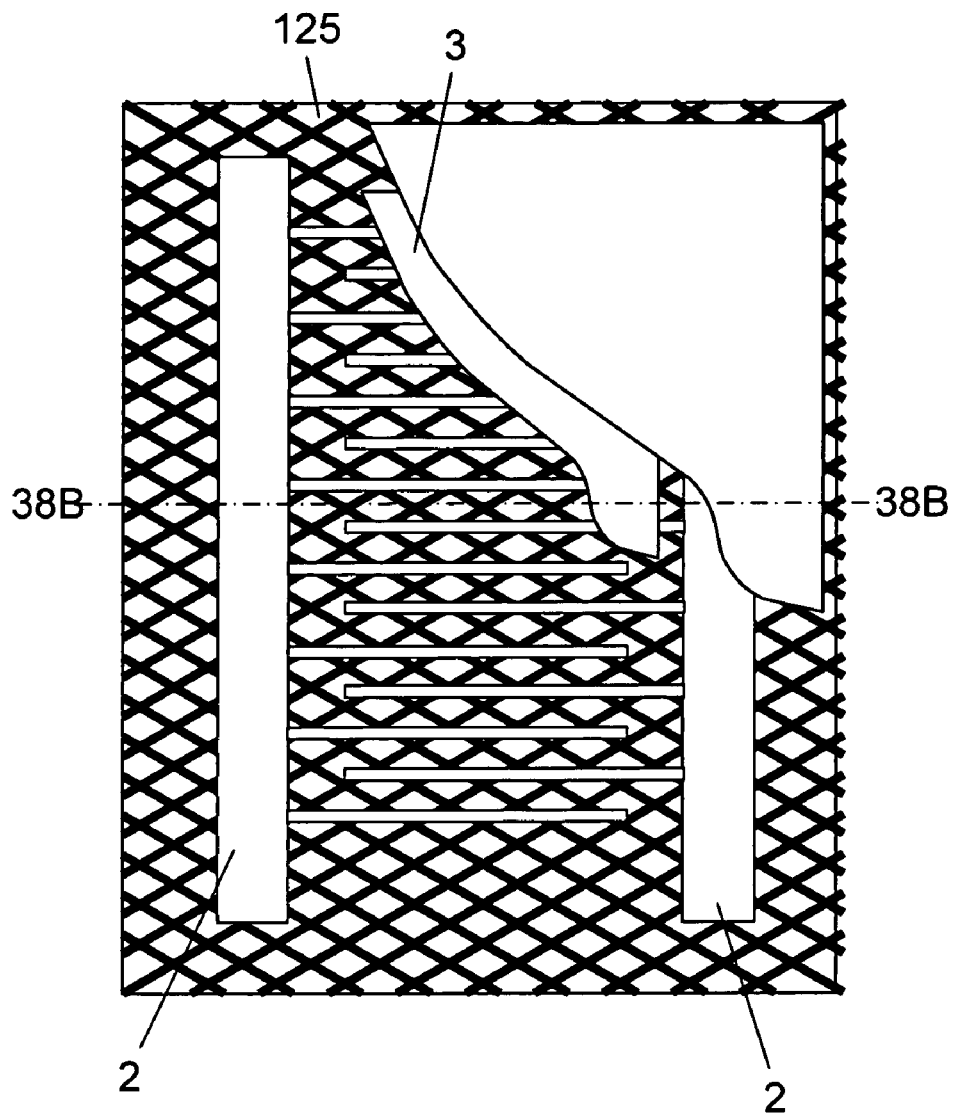
FIG. 38A is a partially cut-away plan view of a PTC heating element according to a thirty-eighth exemplary embodiment of the present invention.
Figure 38B:
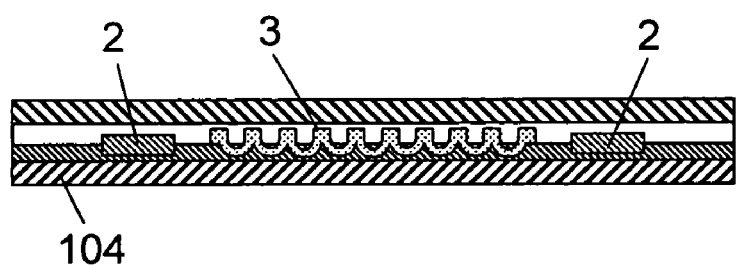
FIG. 38B is a cross sectional view at position 38B—38B of the PTC heating element in FIG. 38A.

FIGS. 38A, B are, respectively, a partially cut away plan view and a cross sectional view at a position 38B—38B showing a flexible PTC heating element according to a thirty-eighth exemplary embodiment. In this embodiment, mesh-like fiber substrate (hereinafter as substrate) 125 having openings joined with flexible resin film 104 at the back surface is used as a flexible substrate. Conductive paste and PTC ink are impregnated therein to form electrodes 2 and resistor 3 respectively. That is, this is a constitution similar with the seventeenth exemplary embodiment. In FIGS. 38A, B, a flexible cover material is not shown.

Compared with FIG. 15A for the seventeenth exemplary embodiment, substrate 125 has a coarser mesh in this constitution. Accordingly, in this constitution, in addition to impregnation of electrodes 2 and resistor 3 to substrate 125, electrodes 2 and resistor 3 are disposed on substrate 125 in a state partially impregnated at high concentration. Such an uneven distribution functions as an elongation deformation portion as described for thirty-fourth exemplary embodiment. Accordingly, it has identical function and effect with those in the thirty-fourth to thirty-seventh exemplary embodiments.

Thirty-ninth Exemplary Embodiment

Figure 39A:
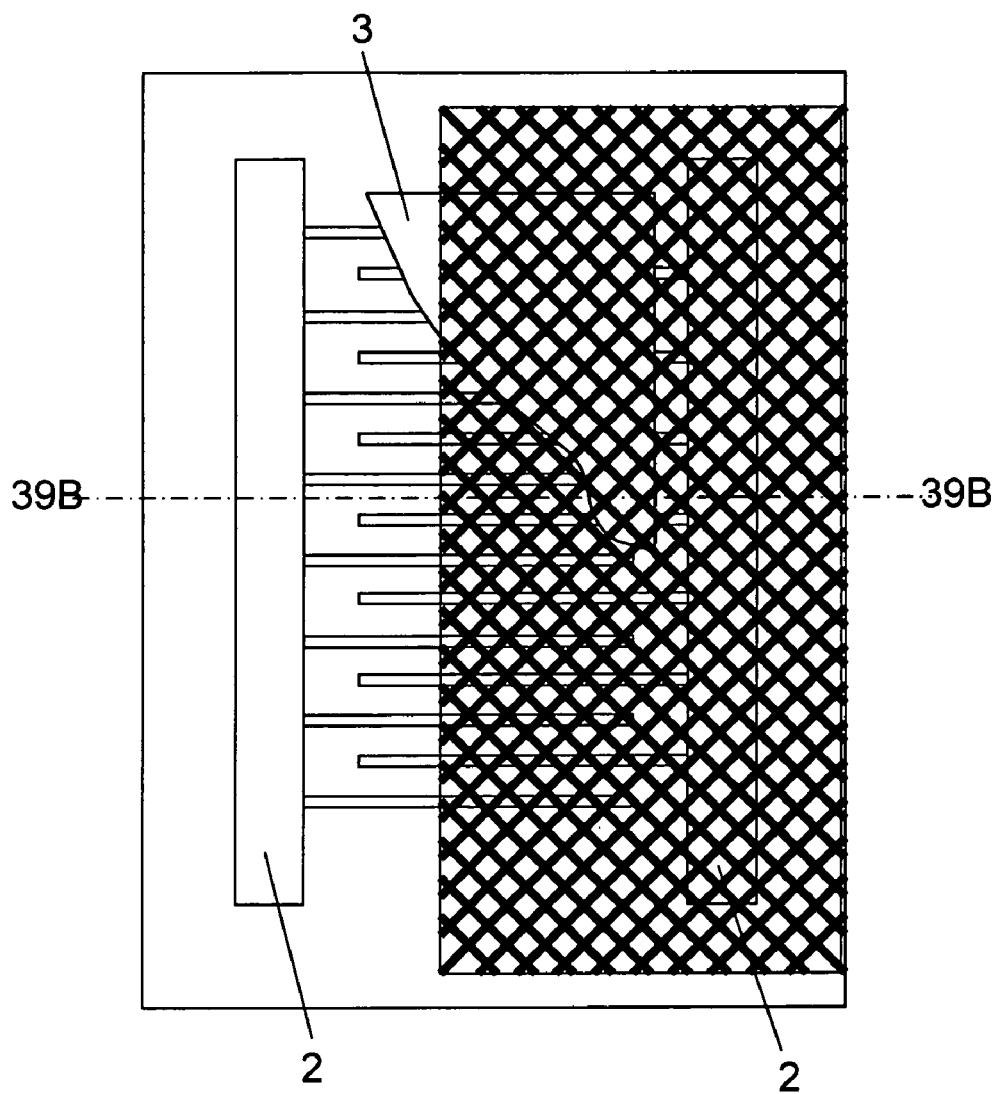
FIG. 39A is a partially cut-away plan view of a PTC heating element according to a thirty-ninth exemplary embodiment of the present invention.
Figure 39B:
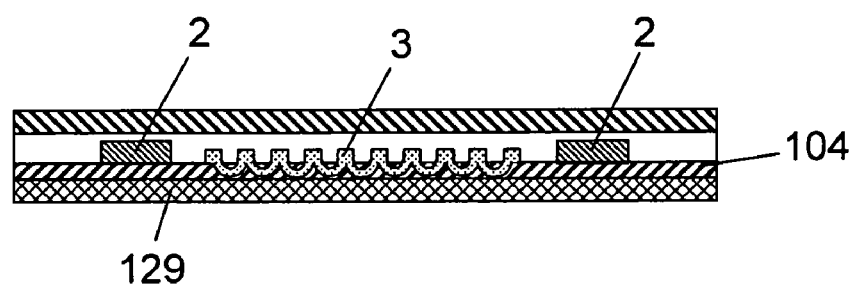
FIG. 39B is a cross sectional view at position 39B—39B of the PTC heating element in FIG. 39A.

FIGS. 39A, B are, respectively, a partially cut away plan view and a cross sectional view at a position 39B—39B showing a flexible PTC heating element according to a thirty-ninth exemplary embodiment. In this embodiment, film 104 is joined on fiber substrate (hereinafter as substrate) 129 having openings to constitute substrate 102, and electrodes 2 and resistor 3 are provided on film 104 of substrate 102. That is, the constitution materials for the flexible substrate in the thirty-eighth exemplary embodiment are used in an arrangement opposite to that described above.

In this embodiment, since substrate 129 includes fibers having openings, substrate 129 functions as an elongation deformation portion like in the seventeenth exemplary embodiment. Accordingly, this has an identical function and an effect with those in the thirty-fourth to thirty-eighth exemplary embodiments.

Film 104 used in this embodiment is different from hot melting film 8 in the fourth exemplary embodiment. Since hot melting film 8 includes a highly crystalline and dense and hard film such as a polyester film, this scarcely undergoes an effect of the solvent used for the conductive paste or the PTC ink. Thus it has a barrier function to the ink or the like. On the other hand, film 104 in this embodiment has no so high crystallization degree although it is crystalline. Then, it is not dense as a film and the solvent easily penetrates into film 104. Considering that the drying temperature for the conductive paste or the PTC ink is about from 130° C. to 150° C., film 104 is influenced by the organic solvent at the temperature condition. A most general phenomenon is swelling.

In a state before printing electrodes 2 and resistor 3, film 104 thermally fused with substrate 129 has a portion thermally fused with substrate 129 and a free portion not thermally fused therewith. Since substrate 129 is extremely effective for the promotion of diffusion and evaporation of the solvent, film 104 at a portion thermally fused with substrate 129 is less influenced by the solvent of the conductive paste and the PTC ink. On the other hand, the free portion of film 104 thermally unfused is influenced by the solvent of the conductive paste and the PTC ink till it is dried. The free portion is at a position corresponding to the opening in substrate 129. For example, in a case where swelling occurs, electrodes 2 and resistor 3 at the portion have a convex cross sectional shape. Electrodes 2 and resistor 3 are applied with elongation at the portion by the formation of the convex portion and the thickness of the coating film is smaller compared with a portion thermally fused with substrate 129.

Meanwhile, in a PTC heating element, a process of removing thermal strain during fabrication or controlling the degree of crystallization of the crystalline resin as the ingredient of the PTC resistor thereby stabilizing the resistance value is generally applied being referred to as thermal aging. Mechanical aging of orienting the crystalline resin as the ingredient of the PTC resistor and causing re-arrangement of conductive particles by mechanical stress such as elongation may sometimes be applied. Thermal and mechanical aging are extremely similar with each other in view of the obtained results although their aging processes are different. That is, the resistance value is stabilized. It is considered that the formation of the convex portion by the solvent in the constitution as described above has the same effect as the aging. While the resistance value is lowered to about ½ by thermal aging in a PTC heating element having a PTC resistor printed on the polyester film surface, a PTC heating element of the constitution as described above has a nearly one-half resistance value from the initial stage and cause less change of resistance value even by applying thermal aging.

The nonuniformity for the thickness of the coating film also functions as the elongation deformation portion as descried in the thirty-eighth exemplary embodiment.

In this way, a flexible PTC heating element excellent in the stability of the resistance value also for elongation or heat can be obtained.

In this embodiment, film 104 may be constituted by mixing a flexible resin A undergoing chemical change by the solvent of the conductive paste and the PTC ink and a flexible resin B not undergoing such change.

In this embodiment, description is made for the use of fiber substrate 129 having openings. In a case of using a non-woven fabric such as a spun lace in which fibers are arranged relatively densely and have no large openings as substrate 129, it is effective to use film 104 constituted as described above in view of providing the nonuniformity. That is, in film 104 constituted as described above, the flexible resin A is in the state as it is, while the flexible resin B swells or partially solves with the solvent resulting in the change of volume or improvement in close adhesion. With this change of state, uneven coating is caused for electrodes 2 and resistor 3 to provide a flexible PTC heating element having the same effect as in the thirty-eighth exemplary embodiment.

The flexible resin A is mainly a resin having functional groups and, specifically, it includes, for example, copolyester, maleic anhydride modified polyethylene, EVA (ethylene vinyl acetate copolymer) and EEA (ethylene ethyl methacrylate copolymer).

The flexible resin B is mainly a highly crystalline resin and includes, for example, polyethylene, polypropylene and linear polyester.

Fortieth Exemplary Embodiment

Figure 40A:
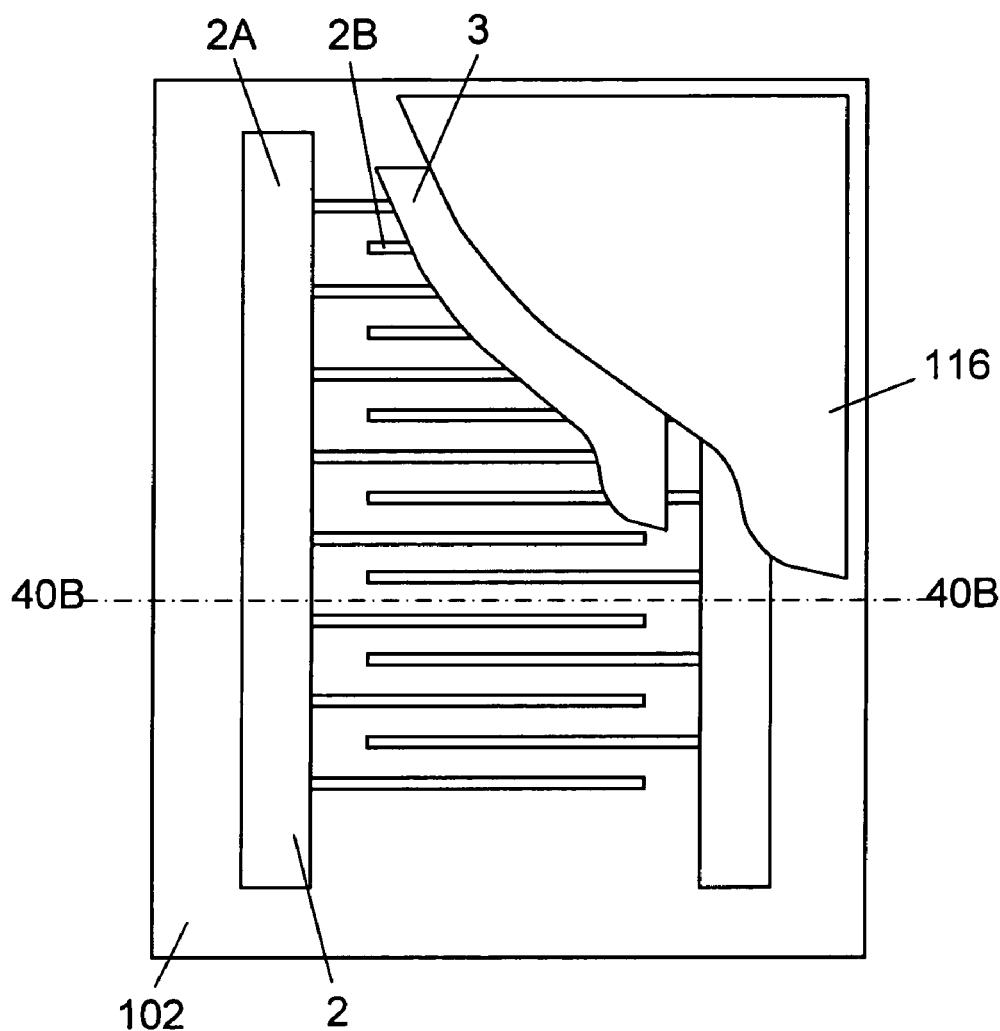
FIG. 40A is a partially cut-away plan view of a PTC heating element according to a fortieth exemplary embodiment of the present invention.
Figure 40B:
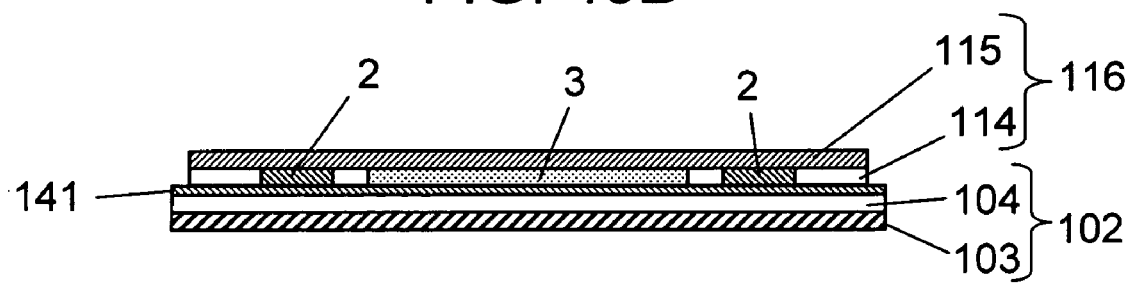
FIG. 40B is a cross sectional view at position 40B—40B of the PTC heating element in FIG. 40A.

FIGS. 40A, B are, respectively, a partially cut away plan view and a cross sectional view at position 40B—40B showing a flexible PTC heating element according to a fortieth exemplary embodiment. This embodiment has a constitution substantially identical with that in the thirty-fourth exemplary embodiment. In the thirty-fourth exemplary embodiment, electrodes 2, resistor 3 and concave/convex portion 113 formed on the surface in contact with substrate 115 function as the elongation deformation portion. In this embodiment, such an elongation deformation portion is not disposed but adhesive resin 141 is disposed between film 104, and electrode 2 or resistor 3. Alternatively, an adhesive resin may be incorporated in film 104. The adhesive resin includes the material as described in the thirty-fourth exemplary embodiment. Substrate 103 or substrate 115 functions as an elongation control portion. Substrate 103 and/or substrate 115 are constituted, for example, with a non-woven fabric or knit. This improves close adhesion between electrodes 2 or resistor 3, and substrate 102, and then vibration durability is improved, since excess elongation than necessary is not caused.

The flexible PTC heating elements according to the exemplary embodiments of the invention are explained variously, the constitution inherent to each of the embodiments can be practiced in combination with other embodiments and such combinations are within the scope of the invention.

Forty-first Exemplary Embodiment

Figure 41:
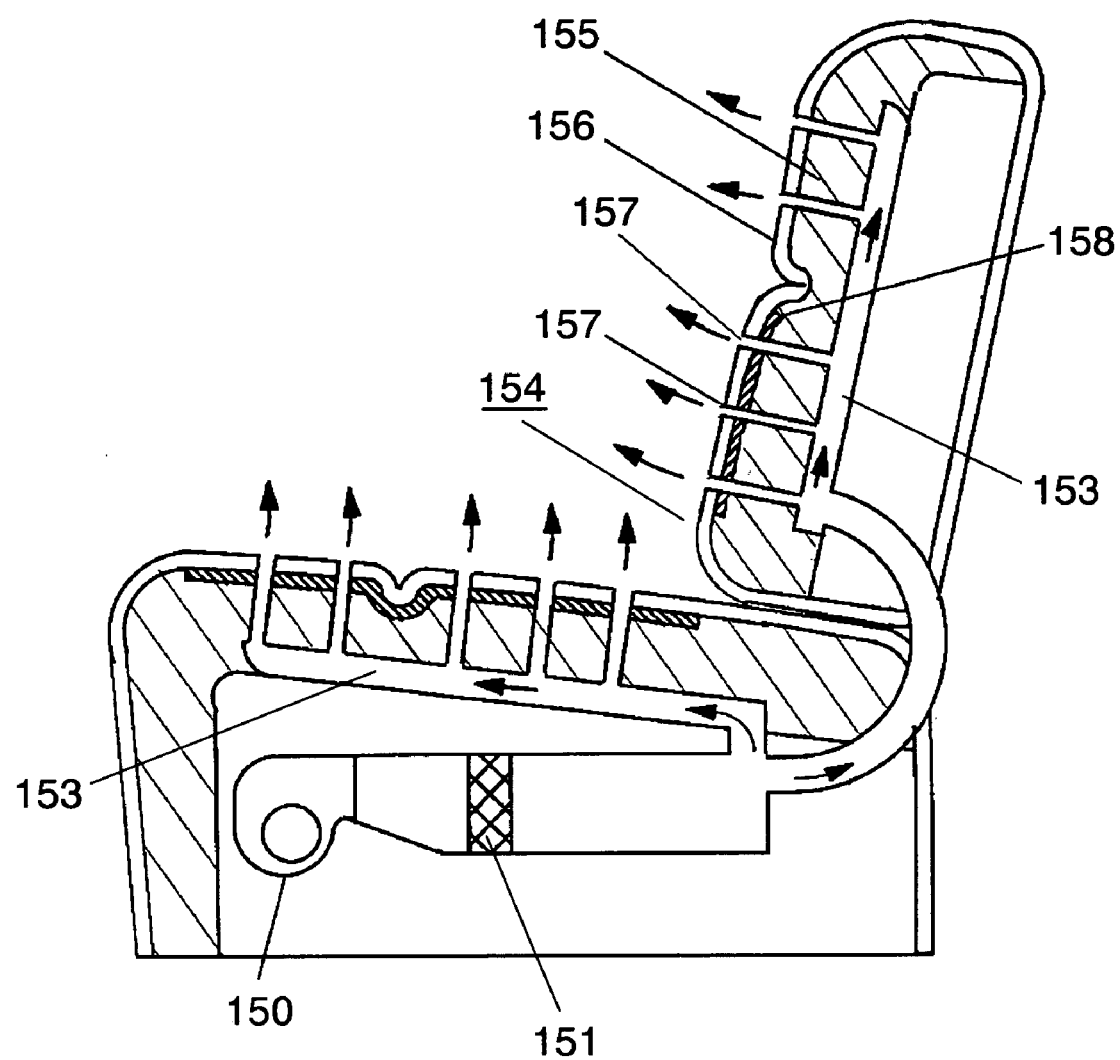
FIG. 41 is a cross sectional view of a seat assembled with the flexible PTC heating element in the forty-first exemplary embodiment of the present invention.
Figure 42A:
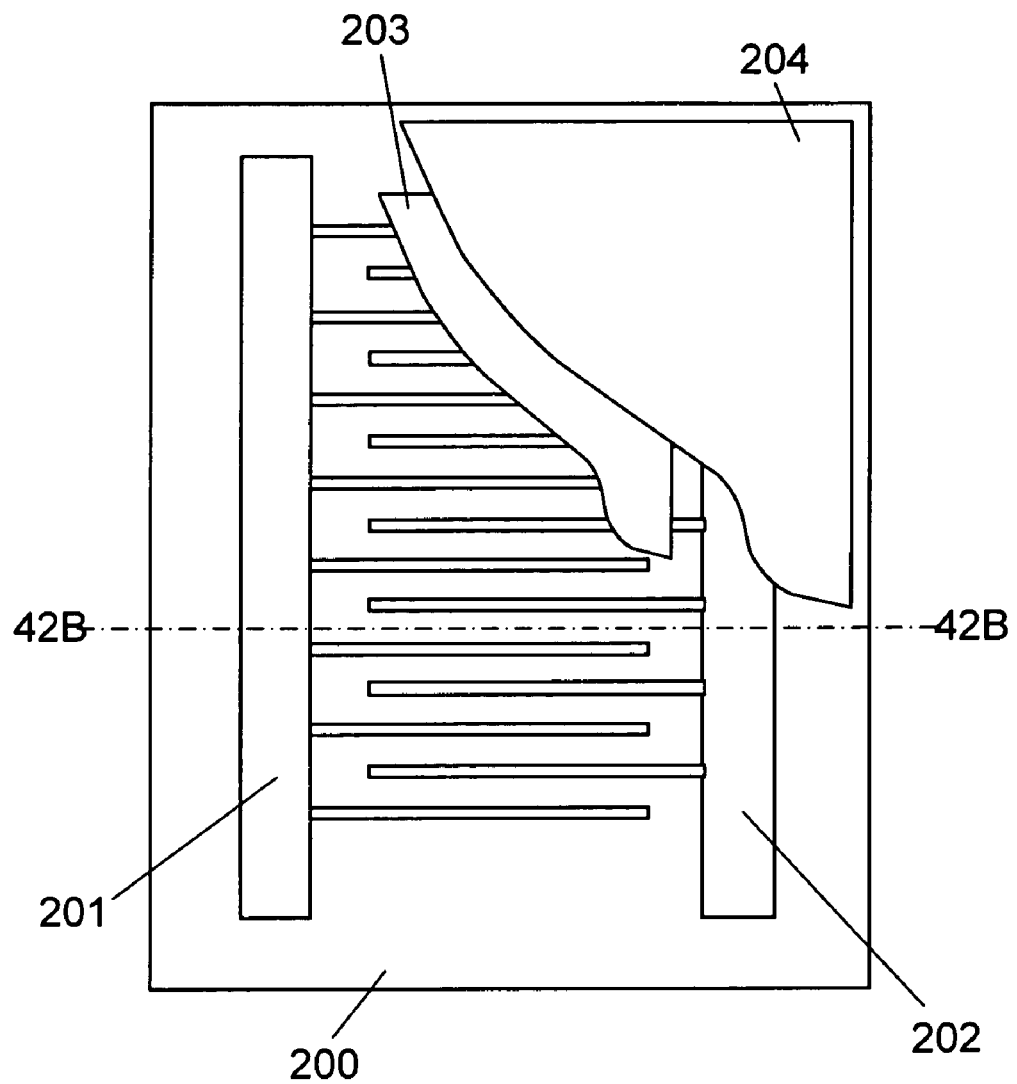
FIG. 42A is a partially cut-away plan view of a conventional PTC heating element.
Figure 42B:
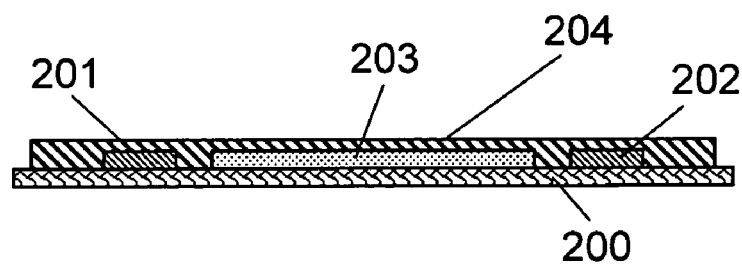
FIG. 42B is a cross sectional view at position 42B—42B of the PTC heating element in FIG. 42A.

FIG. 41 is a constitutional view for a seat device incorporated with a flexible PTC heating element in a forty-first exemplary embodiment of the present invention. Flexible PTC heating element (hereinafter as heater) 158 is disposed between surface skin 156 and pad 155. In the warming operation during winter, when electric current is supplied to heater 158 to generate heat, the heat is conducted to surface skin 156 to warm surface skin 156. When surface skin 156 is warmed, a person sitting is also warmed by heat conduction and radiation.

In this constitution, heater 158 has any of constitutions described in the first to fortieth embodiments. Since they are highly flexible, they maintain a good characteristic even when a bending load is applied repetitively by the sitting of the person. Since it is constituted with the PTC resistor, temperature is controlled automatically.

When the PTC heating element described in the twenty-ninth exemplary embodiment is applied, this provide excellent energy saving.

As shown in FIG. 41, humidity removing blower (hereinafter as blower) 150 and moisture removing portion 151 may be disposed to seat main body (herein after as seat) 154. Blower 150 includes, for example, a sirocco fan. Moisture removing portion 151 has an absorbent material such as, for example, zeolite, silica gel, titanium silicate or activated alumina. As a heater 158 in this case, those having through holes as described in the thirteenth to fifteenth exemplary embodiments or the twenty-first exemplary embodiment are applied. Moisture removing portion 151 removes moisture in air sent by blower 150. Blowing channel 153 introduces moisture-removed air into pad portion 155 made of a urethane foam resin or the like of seat 154. Surface skin 156 covers pad portion 155 and is formed with blowing holes (hereinafter as holes) 157 for jetting out dehumidified air supplied from blowing channel 153.

With the constitution as described above, moisture removing portion 151 removes moisture in air blown from blower 150 during operation. The dehumidified air passes from moisture removing portion 151 through blowing channel 153 and pad portion 155 and blows out from holes 157 of surface skin 156. A person sits on seat 154 and moisture-removed air blows from the back to the hip and further lower legs of the person. In this way, moisture-removed air blows to a region in contact with the body surface. Accordingly, sweat is vaporized and dried to deprive the heat of evaporation from the skin surface, gives a feeling of cooling even in a state where the temperature of surface skin 156 rises by the sunshine during summer and the person can sit comfortably by the elimination of steaming feeling of sweat.

In the seating device of this embodiment, air blown from blowing channel 153 is passed through heater 158 and then blows out above surface skin 156. With the constitution, the temperature of the surface skin is higher compared with a case of warming using a warm blow. The temperature elevation rate is also increased to improve comfort. Heater 158 gives no hindrance for the passage of blow during dehumidification. After reaching a steady state, a high temperature and low humidify blow blows from holes 157 and body sweats caused partially by heater 158 are dried to conduct warming with no feeling of steaming.

Blowing channel 153 is preferably constituted with a nonhygroscopic material such as a urethane resin. With the constitution, high temperature and low humidity air generated from the moisture removing portion blows to a human body with no moisture absorption in the blowing channel. Accordingly, sweats on the body surface are evaporated to deprive the heat of evaporation thereby giving feeling of cooling to a human body and also increasing the effect of preventing feel of steaming.

Blowing channel 153 is preferably branched at pad potion 155 as shown in FIG. 41. With this constitution, moisture-removed air is supplied uniformly over a wide range for back and hip of the person to enhance comfort.

INDUSTRIAL APPLICABILITY

The flexible PTC heating element according to the invention has one of the following constitutions.

1) A portion of an electrode and a PTC resistor is impregnated into a flexible substrate.

2) A flexible substrate includes resin foam or rubber material having a concave/convex shape formed on the surface.

3) It has an elongation deformation portion disposed to at least one of an electrode and an PTC resistor.

4) A flexible substrate has adhesiveness and either a flexible substrate or a flexible cover material has an elongation control portion.

Accordingly, it is highly flexible and excellent in vibration durability. The heating element as described above is suitable, for example, to a car seat heater.

The invention claimed is:

1. A flexible PTC heating element comprising:
a flexible fibrous material having a surface;
first and second conductive materials disposed on at least a part of the surface of the fibrous material in a pattern in which the first and second conductive materials at least partially overlap each other, wherein one of the first and second conductive materials has a PTC property, and at least one of the first and second conductive materials contains a flexible binder which enables the at least one conductive material to flex with the fibrous material; and
a control material provided on at least a part of the surface of the fibrous material to control impregnation of the first and second conductive materials into the fibrous material;
wherein the first and second conductive materials are configured to receive electric current to heat the conductive material which has the PTC property.

2. A flexible PTC heating element according to claim 1, wherein the control material forms a control layer on the surface of the fibrous material, and the first and second conductive materials are printed on the control layer.

3. A flexible PTC heating element according to claim 1, wherein the control material comprises one or more materials selected from the group consisting of urethane thermoplastic elastomer, olefin thermoplastic elastomer and styrene thermoplastic elastomer.

4. A flexible PTC heating element according to claim 1, wherein the control material further comprises an adhesive resin and an elastomer material.

5. A flexible PTC heating element according to claim 1, wherein the fibrous material is non-woven fabric.

6. A flexible PTC heating element according to claim 1, wherein the flexible binder comprises an elastomer material.

7. A flexible PTC heating element according to claim 1, both first and second conductive materials comprise the flexible binder.

8. A flexible PTC heating element according to claim 1, further comprising at least one hole formed through the fibrous material.

* * * * *